US010029199B2

(12) United States Patent
Scott et al.

(10) Patent No.: US 10,029,199 B2
(45) Date of Patent: *Jul. 24, 2018

(54) AIR CLEANER; REPLACEABLE FILTER CARTRIDGES; AND, METHODS

(71) Applicant: Donaldson Company, Inc., Minneapolis, MN (US)

(72) Inventors: James R. Scott, Chanhassen, MN (US); Carolyn Finnerty, Bloomington, MN (US); Steven Gieseke, Richfield, MN (US); Douglas Iddings, Waconia, MN (US); William Juliar, Coon Rapids, MN (US); Gregory LaVallee, Monticello, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/166,861

(22) Filed: May 27, 2016

(65) Prior Publication Data
US 2016/0271546 A1 Sep. 22, 2016

Related U.S. Application Data

(63) Continuation of application No. 14/506,864, filed on Oct. 6, 2014, now Pat. No. 9,353,657, which is a
(Continued)

(51) Int. Cl.
*B01D 47/00* (2006.01)
*B01D 46/24* (2006.01)
(Continued)

(52) U.S. Cl.
CPC ..... *B01D 46/2414* (2013.01); *B01D 46/0001* (2013.01); *B01D 46/0002* (2013.01);
(Continued)

(58) Field of Classification Search
CPC ......... F01M 13/0033; F02M 35/02483; B01D 46/0001; B01D 46/0002; B01D 46/0004;
(Continued)

(56) References Cited

U.S. PATENT DOCUMENTS 4,135,899 A * 1/1979 Gauer ................ B01D 46/0024
210/338
4,950,317 A * 8/1990 Dottermans ....... B01D 46/0002
29/235
(Continued)

OTHER PUBLICATIONS

Pending claims of U.S. Appl. No. 14/717,251.
(Continued)

*Primary Examiner* — Frank Lawrence
(74) *Attorney, Agent, or Firm* — Merchant & Gould P.C.

(57) ABSTRACT

The disclosure concerns air cleaners. Preferred air cleaners are shown which include a housing and a removable and replacement primary filter cartridge. Optional and advantageous features are shown. The preferred primary filter cartridge is conical in shape. A preferred optional safety or secondary filter cartridge is shown. Preferred methods of assembly and use are provided.

11 Claims, 31 Drawing Sheets

Related U.S. Application Data continuation of application No. 13/914,042, filed on Jun. 10, 2013, now Pat. No. 8,852,309, which is a continuation of application No. 13/195,382, filed on Aug. 1, 2011, now Pat. No. 8,460,425, which is a continuation of application No. 12/657,279, filed on Jan. 15, 2010, now Pat. No. 7,988,757, which is a continuation of application No. 11/447,638, filed on Jun. 6, 2006, now Pat. No. 7,662,203, which is a continuation of application No. 10/691,856, filed on Oct. 23, 2003, now Pat. No. 7,070,642.

(60) Provisional application No. 60/453,737, filed on Mar. 6, 2003, provisional application No. 60/421,882, filed on Oct. 28, 2002.

(51) Int. Cl.
*B01D 46/00* (2006.01)
*B01D 46/52* (2006.01)
*F02M 35/024* (2006.01)
*F01M 13/00* (2006.01)

(52) U.S. Cl.
CPC ....... *B01D 46/0004* (2013.01); *B01D 46/008* (2013.01); *B01D 46/0024* (2013.01); *B01D 46/2403* (2013.01); *B01D 46/521* (2013.01); *F01M 13/0033* (2013.01); *F02M 35/02483* (2013.01); *B01D 2265/021* (2013.01); *B01D 2265/022* (2013.01); *B01D 2265/028* (2013.01); *B01D 2265/06* (2013.01); *B01D 2271/02* (2013.01); *B01D 2271/027* (2013.01); *B01D 2275/201* (2013.01)

(58) Field of Classification Search
CPC .............. B01D 46/0024; B01D 46/008; B01D 46/2403; B01D 46/2414; B01D 46/521; B01D 2265/021; B01D 2265/022; B01D 2265/028; B01D 2265/06; B01D 2271/02; B01D 2271/027; B01D 2275/201
USPC ...... 55/459.1, 482, 498, 499, 501–503, 521, 55/337; 210/282, DIG. 17
See application file for complete search history.

(56) References Cited

U.S. PATENT DOCUMENTS

| | | | | |
|---|---|---|---|---|
| 6,004,366 A * | 12/1999 | Engel | ................ | B01D 46/0002 55/428 |
| 6,652,614 B2 * | 11/2003 | Gieseke | ............ | B01D 46/0004 55/482 |
| 7,070,642 B2 * | 7/2006 | Scott | .................. | B01D 46/0001 55/498 |
| 7,524,349 B2 | 4/2009 | Schrage et al. | | |
| 7,537,631 B2 * | 5/2009 | Scott | .................. | B01D 46/0001 55/498 |
| 7,662,203 B2 * | 2/2010 | Scott | .................. | B01D 46/0001 55/498 |
| 7,981,186 B2 | 7/2011 | Schrage et al. | | |
| 7,988,757 B2 * | 8/2011 | Scott | .................. | B01D 46/0001 55/498 |
| 8,038,756 B2 | 10/2011 | Iddings et al. | | |
| 8,066,791 B2 | 11/2011 | Baseotto et al. | | |
| 8,216,355 B2 | 7/2012 | Scott et al. | | |
| 8,273,143 B2 | 9/2012 | Coulonvaux et al. | | |
| 8,292,984 B2 | 10/2012 | Baseotto et al. | | |
| 8,394,166 B2 * | 3/2013 | Scott | .................. | B01D 46/0005 55/385.3 |
| 8,414,675 B2 * | 4/2013 | Iddings | .............. | B01D 46/0001 55/498 |
| 8,460,425 B2 * | 6/2013 | Scott | .................. | B01D 46/0001 55/498 |
| 8,480,778 B2 | 7/2013 | Baseotto et al. | | |
| 8,545,588 B2 | 10/2013 | Iddings et al. | | |
| 8,702,831 B2 * | 4/2014 | Scott | .................. | B01D 46/0005 55/385.3 |
| 8,784,523 B2 | 7/2014 | Coulonvaux et al. | | |
| 8,814,973 B2 | 8/2014 | Baseotto et al. | | |
| 8,852,309 B2 * | 10/2014 | Scott | .................. | B01D 46/0001 55/498 |
| 9,039,802 B2 | 5/2015 | Scott et al. | | |
| 9,221,004 B2 | 12/2015 | Iddings et al. | | |
| 9,238,189 B2 | 1/2016 | Baseotto et al. | | |
| 9,353,657 B2 * | 5/2016 | Scott | .................. | B01D 46/0001 |
| 9,586,166 B2 | 3/2017 | Coulonvaux et al. | | |
| 9,718,019 B2 | 8/2017 | Baseotto et al. | | |
| 2003/0094408 A1 * | 5/2003 | Schuyler | .............. | B01D 29/232 210/232 |
| 2015/0251123 A1 * | 9/2015 | Scott | .................. | B01D 46/0005 55/497 |

OTHER PUBLICATIONS

Pending claims of U.S. Appl. No. 15/450,625.
Pending claims of U.S. Appl. No. 14/996,491.
Pending claims of U.S. Appl. No. 15/663,997.
Pending claims of U.S. Appl. No. 14/977,930.

* cited by examiner

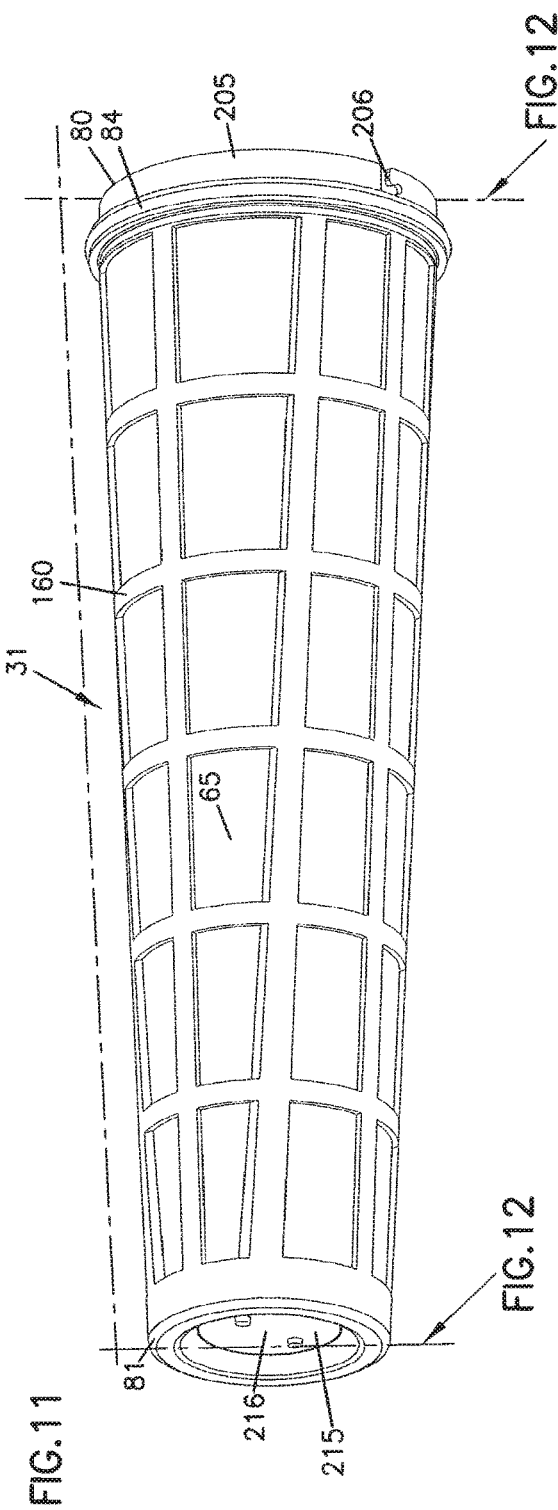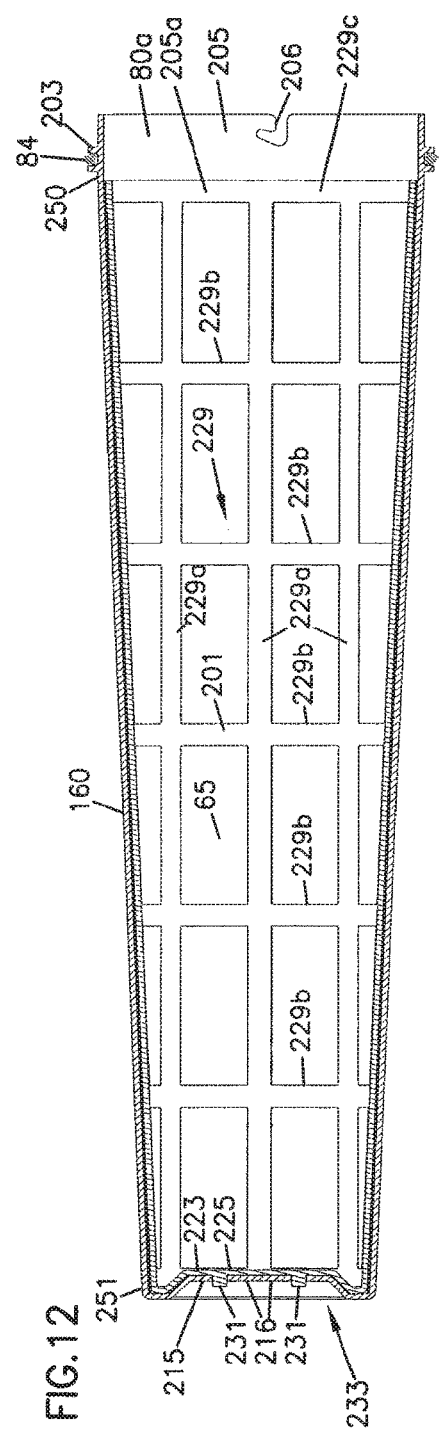

AIR CLEANER; REPLACEABLE FILTER CARTRIDGES; AND, METHODS

CROSS-REFERENCE TO RELATED APPLICATIONS AND PRIORITY FILINGS

This application is a continuation filing of U.S. Ser. No. 14/506,864, filed Oct. 6, 2014 which issued as U.S. Pat. No. 9,353,657 on May 31, 2016. U.S. Ser. No. 14/506,864 is a continuation of U.S. Ser. No. 13/914,042, filed Jun. 10, 2013, and issued as U.S. Pat. No. 8,852,309. U.S. Ser. No. 13/914,042 is a continuation of U.S. Ser. No. 13/195,382, filed Aug. 1, 2011 and issued as U.S. Pat. No. 8,460,425; U.S. Ser. No. 13/195,382 is a continuation of U.S. Ser. No. 12/657,279, filed Jan. 15, 2010 and issued as U.S. Pat. No. 7,988,757; U.S. Ser. No. 12/657,279 is a continuation of U.S. Ser. No. 11/447,638, filed Jun. 6, 2006 and issued as U.S. Pat. No. 7,662,203; and, U.S. Ser. No. 11/447,638 is a continuation of U.S. Ser. No. 10/691,856, filed Oct. 23, 2003 and issued as U.S. Pat. No. 7,070,642. U.S. Ser. No. 10/691,856 claims priority to U.S. Provisional Application No. 60/421,882, filed Oct. 28, 2002; and, U.S. Provisional Application No. 60/453,737 filed Mar. 6, 2003.

Each of U.S. Ser. No. 14/506,864; U.S. Ser. No. 13/914,042; U.S. Ser. No. 13/195,382; U.S. Ser. No. 12/657,279; U.S. Ser. No. 11/447,638; U.S. Ser. No. 10/691,856; U.S. Ser. No. 60/421,882 and U.S. Ser. No. 60/453,737 are incorporated herein by reference. A right of priority, to the extent appropriate, is claimed to each of U.S. Ser. No. 14/506,864; U.S. Ser. No. 13/914,042; U.S. Ser. No. 13/195,382; U.S. Ser. No. 12/657,279; U.S. Ser. No. 11/447,638; U.S. Ser. No. 10/691,856; U.S. Ser. No. 60/421,882; and, U.S. Ser. No. 60/453,737.

FIELD OF THE DISCLOSURE

The present disclosure concerns air cleaners. It particularly concerns air cleaners with removable and replaceable (i.e., serviceable) filter cartridges. The particular arrangement disclosed uses a first stage separator or precleaner, to facilitate operation. Methods of assembly and use are also provided.

BACKGROUND

Air filtering is used in a variety of arrangements. A typical application is as an air cleaner for intake air to internal combustion engines. After a period of use, filter media within the cleaner requires servicing, either through cleaning or complete replacement. Typically, for an air cleaner used with an internal combustion engine such as on a vehicle, filter media is contained in a removable or replaceable (i.e., serviceable) component, element or cartridge. Examples are shown in U.S. Pat. Nos. 4,211,543; 4,135,899; 3,672,130; B1 5,445,241; 5,700,304; 6,051,042; 6,039,778; 5,547,480; 5,755,842; and 5,800,581; and PCT publication WO 89/01818; the complete disclosures of all of these references being incorporated herein by reference. U.S. application Ser. No. 09/729,033 filed Dec. 4, 2000, issued as U.S. Pat. No. 6,652,614 also shows such an element, with a unique interaction shown between the element and an end cover. The disclosure of U.S. Pat. No. 6,652,614 is also incorporated herein by reference.

Improvements in filter arrangements relating to assembly and use, are desirable.

SUMMARY

The present disclosure concerns improvements in air cleaners. The techniques are particularly developed for use with air cleaners for cleaning engine air intake for an internal combustion engine, such as used with a vehicle such as a bus, truck or mobile equipment such as a tractor or construction equipment, or a stationary generator. The improvements generally relate to air cleaners in which filter media is part of a removable and replaceable (i.e., serviceable) component.

A number of improvements are brought forward by the present disclosure, and in the figures embodiments depicting examples of the various improvements described, are provided. However, it is not necessary that all of the possible improvements described be incorporated in any given air cleaner system or component; and, variations from the embodiments described are possible.

Many of the improvements relate to unique possible constructions of primary filter element cartridges. Examples of these optional improvements, described in detail below, include:

1a. An improved construction that, among other things, allows optional use of an outer support in the primary filter cartridge; and, no inner support that extends the entire length of the element, for pleated media;

2a. Improved constructions relating to a manner in which the primary filter cartridge is secured to, and is sealed to, an air cleaner housing;

3a. An improvement in an outer support framework of such a cartridge, relating to: (a) a shielded area for use in connection with a dust evacuator; and, (b) a porous area, for permitting air flow to the media in a preferred manner;

4a. An improved shape, to accommodate certain housing features;

5a. An improved interlock at a closed end of the filter, to inhibit rotational movement of the filter during use; and 6a. Improvement in an outer framework structure to facilitate cartridge manufacture and assembly.

Optional improvements provided herein also relate to structure circumscribed by the primary filter cartridge during use. Some of these optional improvements relate, for example, to the following:

1b. A preferred support, separately mountable within the air cleaner assembly from the primary filter cartridge, to operate as an inner support for pleated media;

2b. Optional incorporation of the support identified at 1b above, as a support, for example as an outer support, for a preferred safety filter cartridge;

3b. Improved and advantageous arrangements for securing the support and/or secondary filter cartridge to an air cleaner housing;

4b. An improved optional interaction between inner and outer liners of a safety element cartridge; and, 5b. An optional improved shape/fit relation between a safety element or inner support, and a primary filter cartridge.

In addition, improvements described herein are also provided with respect to an air cleaner housing. Some of the improvements, for example, relate to the following:

1c. Features in the housing to facilitate preferred independent mounting of a primary filter cartridge and inner support (or optional safety filter cartridge);

2c. An optional jointed housing sidewall, to permit change in orientation of housing components, such as an inlet angular orientation relative to a dust flow outlet;

3c. Preferred locations of inlet, outlet and dust ejector tubes;

4c. An improved optional end cover mountable through a non-rotational lock fit arrangement that does not necessarily require added latches or similar constructions;

5c. An improved precleaner arrangement optionally secured to an end cover;

6c. An improved, optional, cover which is mounted circumscribed by a portion of the housing, as opposed to having a portion of the cover overlapping a portion of the housing;

7c. An improved, optional, rotational, indexing between the cover and the housing; and, 8c. A cover which can include an improved member of a projection/receiver mechanism, to inhibit undesired rotation of an associated primary filter cartridge, during use.

Herein, improvements in a housing end cover, associated with an air cleaner housing sidewall, are also provided. Some of these optional improvements, for example, relate to the following:

1d. Provision of a closed end cover which optionally includes a precleaner permanently mounted thereon;

2d. A closed end cover with an optional integrally molded latch mechanism for non-rotational engagement with a housing sidewall, during use;

3d. A particular optional flexible tab/latch mechanism engageable with an end cover through a tongue/slot interference fit;

4d. An improved, optional, indexing arrangement for securing an end cover to a housing sidewall;

5d. An improved, optional, mounting arrangement in which an end cover is mounted with a portion of the housing sidewall circumscribing the end cover and without a portion of the end cover circumscribing the housing sidewall; and 6d. An improved, optional, interlock arrangement on the end cover, for engaging a portion of an associated primary filter cartridge, in use.

Also provided herein are improvements in use.

It will also be apparent from the detailed discussion, that the preferred components can be configured to facilitate manufacture and assembly. Examples of some of these optional improvements include the following:

1e. An improved, optional, outer support for a primary filter cartridge that facilitates manufacture;

2e Preferred optional housing components, including features as described above, in configurations that can be readily manufactured using plastics molding techniques;

3e. Preferred optional techniques of mounting and sealing a primary filter cartridge in a housing;

4e. Preferred optional techniques of mounting and sealing a secondary filter or safety filter cartridge, in a housing; and, 5e. Improved and preferred, optional, techniques for supporting media in a primary filter cartridge.

6e. Improved and preferred (optional) techniques for supporting media in a secondary or safety filter cartridge.

Specific examples of features that provide for the above, are shown in the drawings and are described in the detailed description below. In general, individual ones are usable, to provide improvement. In the preferred embodiments depicted, selected one of the various features are coordinated together, in a unique, improved, air cleaners and in unique air cleaner componentry arrangements.

BRIEF DESCRIPTION OF THE DRAWINGS

FIG. 11 is a side elevational view of a safety element component of the assembly of FIG. 1;

FIG. 12 is a side cross-sectional view of the safety element component of FIG. 11 taken along line 12-12, FIG. 11;

DETAILED DESCRIPTION

The present disclosure concerns an air cleaner configuration. A variety of enhancements to prior art air cleaners is provided. Various ones, or selected ones, of the enhancements can be used to provide a useful air cleaner. The particular air cleaner depicted in FIGS. 1-13, and the alternates of FIGS. 14-33 show or demonstrate examples of many of the various enhancements described herein. There is no requirement that in any and all practices of the techniques and principles of the present enclosure, all of the enhancements described need to be used.

I. General Air Cleaner Configuration and Operation

Figure 1:
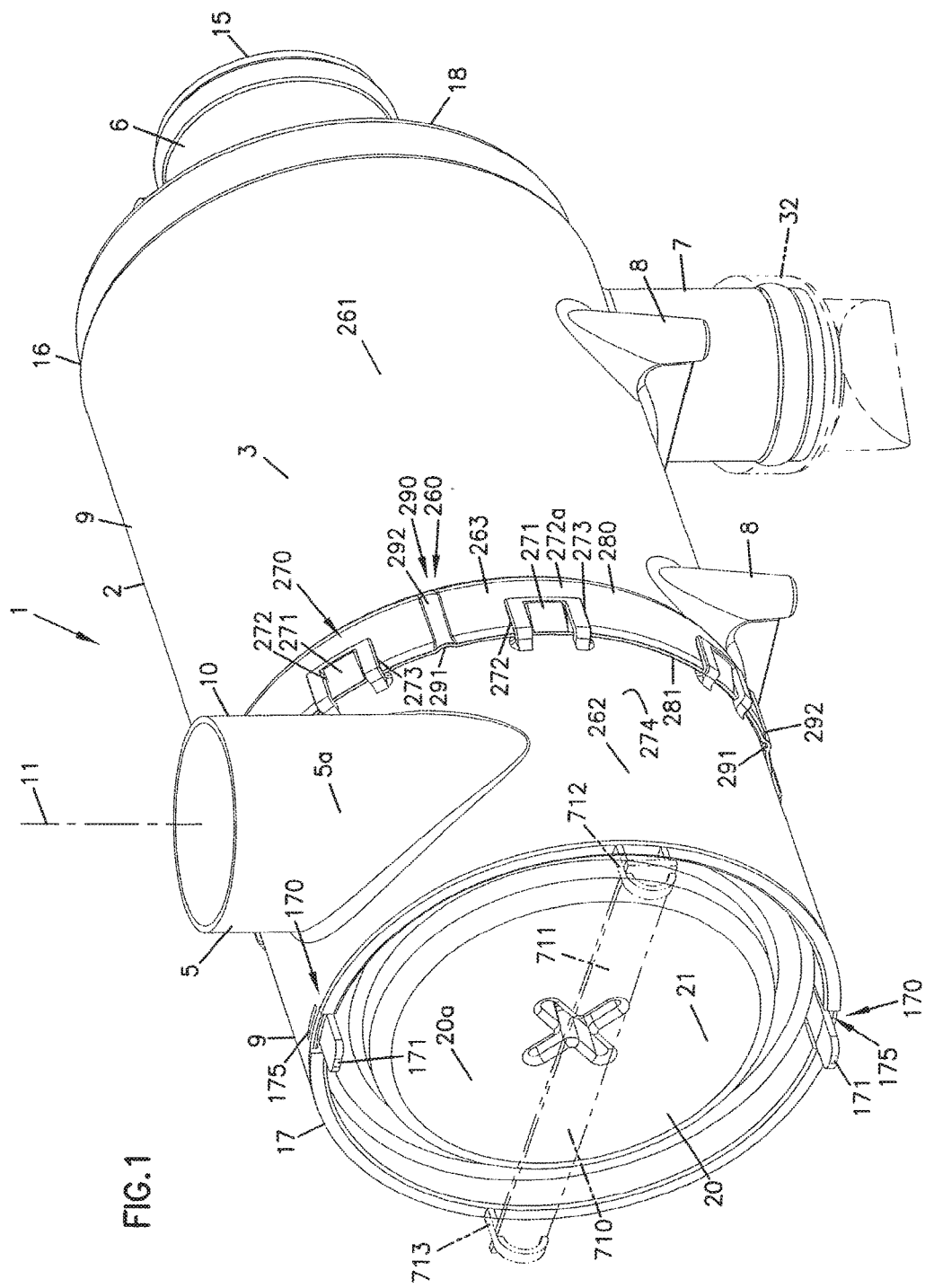
FIG. 1 is a side perspective view of a filter assembly according to the present disclosure.

The reference numeral 1, FIG. 1, generally represents an air cleaner assembly according to the present disclosure. The particular air cleaner assembly 1 depicted, is an engine combustion air intake air cleaner assembly 2. Many of the techniques described herein can be applied in the filtering or cleaning of a variety of gases. However, the details disclosed were particularly developed for application in an air cleaner assembly, for example for use to clean engine intake air for an internal combustion engine, such as the engine of a vehicle such as a truck, bus, tractor or construction equipment; or for a generator.

Referring to FIG. 1, air cleaner assembly 2 generally comprises a housing 3 having: an air inlet 5; an air outlet 6; and, a dust ejector or drop tube 7. The air cleaner assembly 2 also includes optional mounting legs or supports 8 thereon to facilitate mounting. (Alternatively, the assembly 2 could be mounted with a separate mounting band or bracket.) It is anticipated that the typical orientation for the housing 2 depicted in FIG. 1, in use, will be generally horizontal (i.e., with tube 6 extending horizontally, as generally shown in FIG. 1, with drop tube 7 pointing down). However, many of the principles and techniques described herein can be applied to air cleaner assemblies mounted in other orientations.

The particular housing 2 depicted has a generally cylindrically shaped outer housing sidewall 9; i.e., sidewall 9 is generally circular in cross-section. The air inlet 5 for the embodiment shown is a side entry 5a, i.e., entry 5a goes through sidewall 9. Specifically, inlet 5 is a circular, tangential, inlet 10. The term "tangential" in this context is meant to indicate that a center line 11 of the circular inlet 10 is not directed toward a center axis 12, FIG. 3, of the housing 3, but rather, center line 11 is directed more tangentially. This will cause the air entering through tangential inlet 10 (and thus directed into region 14, FIG. 3), to begin movement in a swirling pattern. The swirling pattern is facilitated by the preferred, generally cylindrical, shape to sidewall 9.

Still referring to FIG. 1, air outlet 6 is a circular, axial, outlet 15. By "axial" in this context, it is meant that a center line of outlet 15, FIG. 3, extends parallel to a center line or axis 12, FIG. 3, of housing 3. In the particular instance shown, the center line of outlet 15 is coaxial with the center line 12 of housing 3, because the preferred housing sidewall 9 has a circular cross-section and the outlet 6 is not eccentrically positioned. Of course, alternate configurations are feasible, but this particular one is convenient. The reference to outlet 15 being circular, is a reference to the general shape of the interior air flow conduit.

Figure 3:
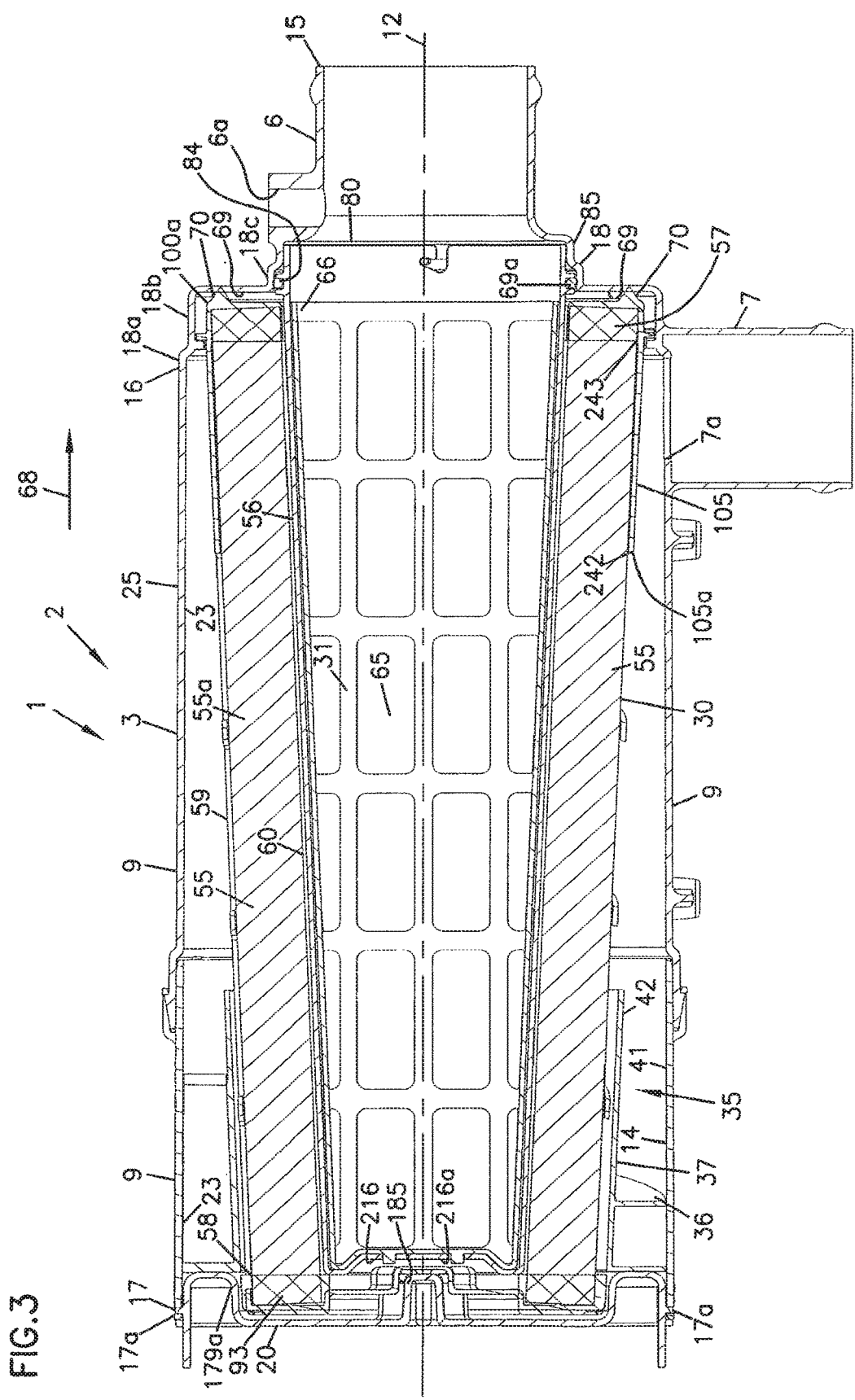
FIG. 3 is a side cross-sectional view of the assembly of FIGS. 1-2 depicted without a removable dust evacuator valve.

Referring to FIG. 3, the sidewall 9 has first and second opposite ends 16 and 17 respectively. First end 16 is closed by cover 18 having outlet 6 projecting therefrom. Referring to FIG. 3, cover 18 is integral with, and is not separable from, end 16, and, in the preferred configuration shown cover 18 has at least two, in this instance at least three regions or steps of different diameter, indicated at 18a, 18b and 18c. The corresponding internal diameters or steps decrease with 18a>18b>18c. The function of these steps will be understood from further discussions.

Tap 6a, in outlet tube 6, is for attachment of optional pressure or restriction indicators or other equipment.

For the particular embodiment shown, dust drop tube 7 is adjacent first end 16.

End 17, FIG. 1, defines an open end, and air cleaner 2 includes inlet 5 adjacent thereto. The open end 17 in the sidewall 19 is closed to passage of air therethrough by cover 20.

In general, cover 20 has no aperture therethrough in the end region 20a, and is a removable access or service cover 21 mounted on sidewall 9 to close end 17. Service cover 21 is periodically opened or removed, to provide service access to an interior 23, FIG. 3, of housing 3, for inspection, service or mounting of componentry contained therein. For the particular embodiment depicted, the service cover 21 is completely removable from sidewall 9, for service access to interior 23. The cover 21 can be secured to a remainder 25 (FIG. 10) of housing 3, in a variety of ways, for example through the use of latches, bolts or other constructions. Several, convenient, mounting mechanisms are shown and are discussed in detail below.

Figure 2:
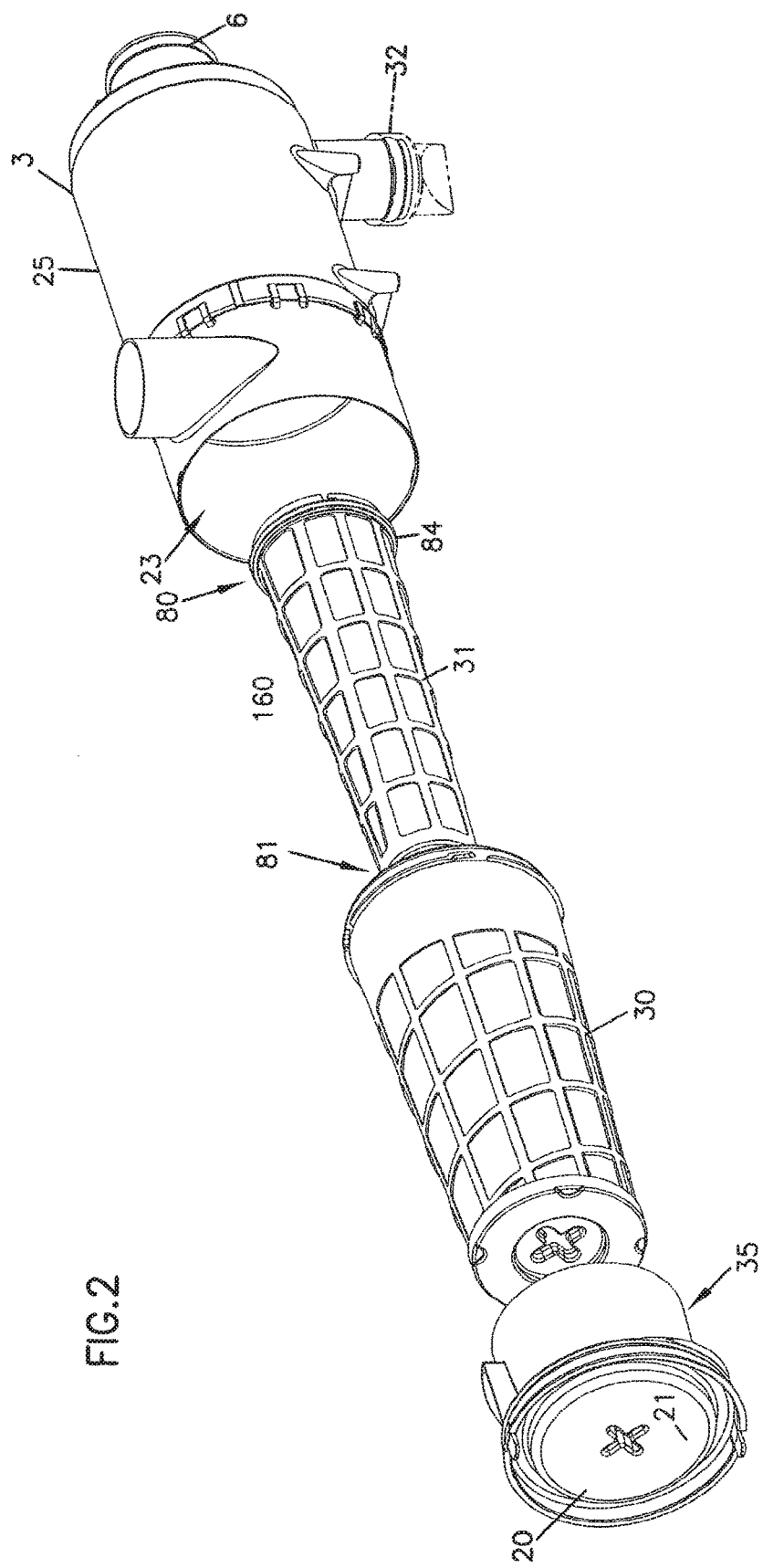
FIG. 2 is an exploded perspective view showing removable componentry, from the assembly of FIG. 1.

Attention is now directed to FIG. 2. In FIG. 2, air cleaner assembly 2 is depicted in exploded perspective view, so that certain separable componentry is viewable. Referring to FIG. 2, the componentry depicted includes: housing section 25 (i.e., the housing 3 without the cover 20); service cover 21; a removable and replaceable primary filter element or filter cartridge 30; optional removable and replaceable secondary safety filter element or cartridge 31; and, dust evacuator valve 32 (shown in phantom and not shown removed). Primary cartridge 30 is depicted in side elevational view in FIG. 6; and, safety cartridge 31 is depicted in side elevational view in FIG. 11. The dust evacuator valve 32 is removable, but in normal use of air cleaner 2, once installed valve 32 is not removed unless it becomes damaged.

Still referring to FIG. 2, the air cleaner assembly 2 further includes a precleaner 35. In general, a precleaner such as precleaner 35, operates to remove certain particulate material from an air stream, before the air stream is passed into media of the primary air filter element or cartridge 30. An advantage from this, is that it provides for longer operational life of the primary filter cartridge 30. For the particular arrangement depicted, the precleaner 35 is secured to the service cover 21, and in normal, preferred, operation is never separated and indeed is not separable without causing damage to the cover 20. In an alternate embodiment, discussed below in connection with FIG. 21, the precleaner is mounted on, and is secured to, the primary filter element or cartridge.

Figure 5:
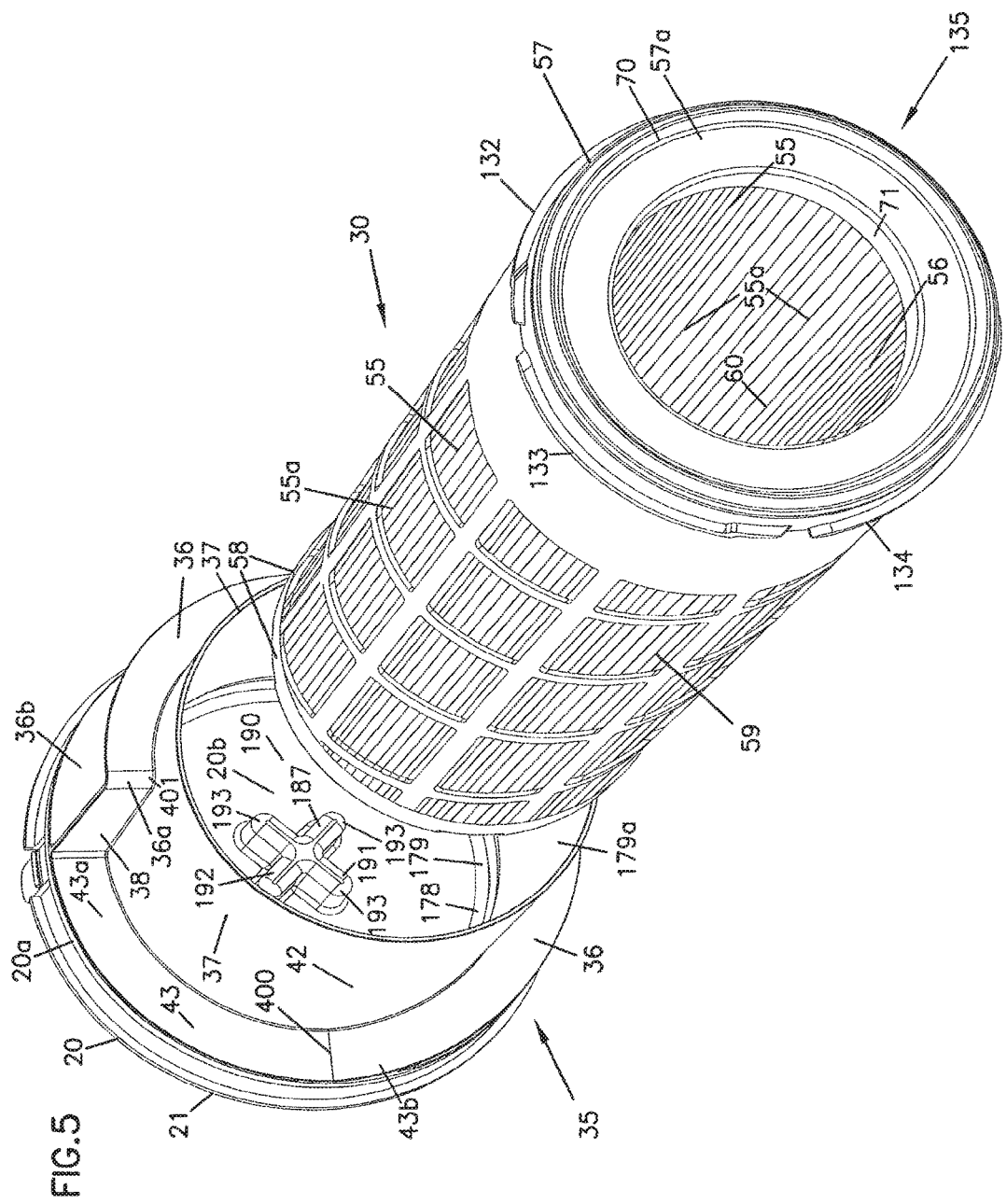
FIG. 5 is an enlarged, exploded inside perspective view of the components depicted in FIG. 4.

Referring to FIG. 5, the precleaner 35 includes: a cyclonic ramp component 36; and, a generally cylindrical shield component 37; with the ramp 36 positioned on an outer surface 42 of the shield 37. In the embodiment shown, ramp 36 and shield 37 are integral with one another, the two being molded together as a single plastic piece. At end 36a, region 36b behind ramp 36 (i.e., between ramp 36 and end 20a of cover 20) ramp 36 is closed by end 38. Operation of components 36, 37 (and thus precleaner 35) will in part be understood by reference to general operation of the air cleaner assembly 2.

During normal operation, air to be filtered enters air cleaner assembly 2 through tangential inlet 10, FIG. 1 into space 14, FIG. 3. The space 14 is generally defined as being between inside surface 41 (of housing sidewall 9), and outside surface 42 (of shield 37). The entrance into space 14 is preferably into one of regions 43a, 43b, FIG. 5, where ramp 36 has not progressed away from end 20a substantially. Because of the preferred tangential entry, the air flow directed into space 14 is generally directed into a circular, circumferential or cyclonic flow. For the particular embodiment shown, and referring to the general view point of FIG. 1, when looking toward cover 20 from the outside of air cleaner 2, this flow would be clockwise. Of course the air cleaner assembly 2 could be configured for an opposite direction of flow.

Referring again to FIG. 3, upon entering space 14, the air is directed into the precleaner 35. Cyclonic ramp 36 is positioned to help impart a spiral or cyclonic moment to the air and dust carried therein spiraling toward end 16, as the air circles around shield 37. In general the ramp 36 coils around shield 37 less than one full turn, preferably no more than 340°, typically less than 320°, for example an amount within the range of 150° to 280°. A typical shield 37 would project at least 35 mm. (millimeters) and typically 44 mm. to 170 mm. along the side of the element cartridge 30. A typical ramp 36 would project at least 5 mm. and typically 7 mm.-20 mm. outwardly from shield 37.

The shield 37 prevents the air, carrying particles, from immediately impacting the media in cartridge 30, before spiraling (and thus precleaning) occurs. In general, as a result of the cyclonic spin, a substantial portion of the dust particles carried within the air stream will be directed toward inside wall 41 of housing 15, eventually to be ejected through dust drop tube 7. In a typical arrangement, dust drop tube 7 would be covered by an ejector valve 32, shown in phantom in FIGS. 1 and 2. Such ejector valves are well known. Some examples are described in U.S. Pat. No. 3,429,108, the complete disclosure of which is incorporated herein by reference.

In a typical embodiment, the ramp 36 spirals at a rate providing about 2 mm. to 4 mm. linear movement or distance away from end 43, per 10° of turn.

Referring to FIGS. 3 and 5, in general the primary element or cartridge 30 comprises an extension of media 55 which circumscribes and defines a central clean air volume 56. For the particular embodiment depicted, the media 55 is arranged in pleats 55a which extend longitudinally between ends 57, 58 of the cartridge 30.

Referring again to FIG. 3, after exiting precleaner 35 the air passes through primary cartridge 30 from upstream side 59 to downstream side 60, and then enters clean air region 56. The air at this point is typically sufficiently clean to be passed on through outlet tube 6, to the engine/air intake of an internal combustion engine.

As mentioned above, the particular air cleaner assembly 2 depicted, includes an optional secondary or safety element or cartridge 31, FIG. 2. The safety element or cartridge 31 comprises media 65 positioned in region 56, FIG. 3, such that air exiting media 55 must pass through media 65 on the way to outlet 6. Media 65 for a typical application, is not pleated, but rather comprises a sheet of non-woven fibrous media which circumscribes open central area 66, FIG. 3.

From the above description, general operation of the air cleaner assembly 2 will be understood to be as follows:
1. Air to be filtered first enters the assembly 2 through inlet 5.
2. Through a combination of tangential entry, the circular housing sidewall 9, shield 37 and the precleaner ramp 36, the air stream is directed into a cyclonic or spiral flow pattern. This drives some of the dust material against the inside surface 41 of the housing sidewall 9, providing a precleaning effect. The precleaned dust is eventually ejected through down tube 7.
3. The air passes through the media 55 of the primary filter cartridge 30, and is filtered thereby.
4. If the optional safety or secondary filter cartridge is used, the filtered air then passes through media 65 of the safety or secondary filter cartridge 31, into clean air region 66.
5. The air is then directed axially outwardly from air cleaner 2, through end cover 18, i.e., through outlet duct 6.

Also, certain general structural features of the preferred air cleaner assembly 2 are as follows:
1. The access cover 20 is located at opposite end 17 of the housing 3 from the air flow outlet tube 6.
2. The inlet 5 is a side entry inlet, and the outlet 6 is an axial airflow outlet.
3. The inlet 5 is located adjacent end 17 of the housing, and the outlet tube 6 is located adjacent opposite end 16 of the housing 3.
4. The down tube 7 for the dust is located adjacent outlet tube 6 and end 16 of the housing.
5. Precleaner 35 is located adjacent inlet tube 5 at end 17 of the housing, and thus adjacent cover 20.
6. For the particular embodiment of FIG. 3, the precleaner 35 is permanently mounted on cover 20.

II. Sealing of the Primary Filter Cartridge 30 within Air Cleaner 2

As discussed above, primary filter cartridge 30 is a removable and replaceable (i.e., serviceable) component. That is, primary filter cartridge 30 is constructed to be removable for servicing (for example by replacement). In order to ensure proper operation of air cleaner assembly 2, it is thus necessary that the primary cartridge 30 be constructed for appropriate sealing within housing 3, once installed, so that air does not bypass the media 55 during operation. The air cleaner assembly 2 can be configured to provide for this seal in a variety of manners.

For example, a radial seal between either an internal portion or external portion of the primary element 30, around its outlet end, and another portion of the assembly, could be used. Various types of radial seal systems, adaptable for air cleaners which include componentry having certain features as described herein, are shown for example in PCT Publication WO 89/01818 at 259 and in U.S. Pat. No.

Figure 6:
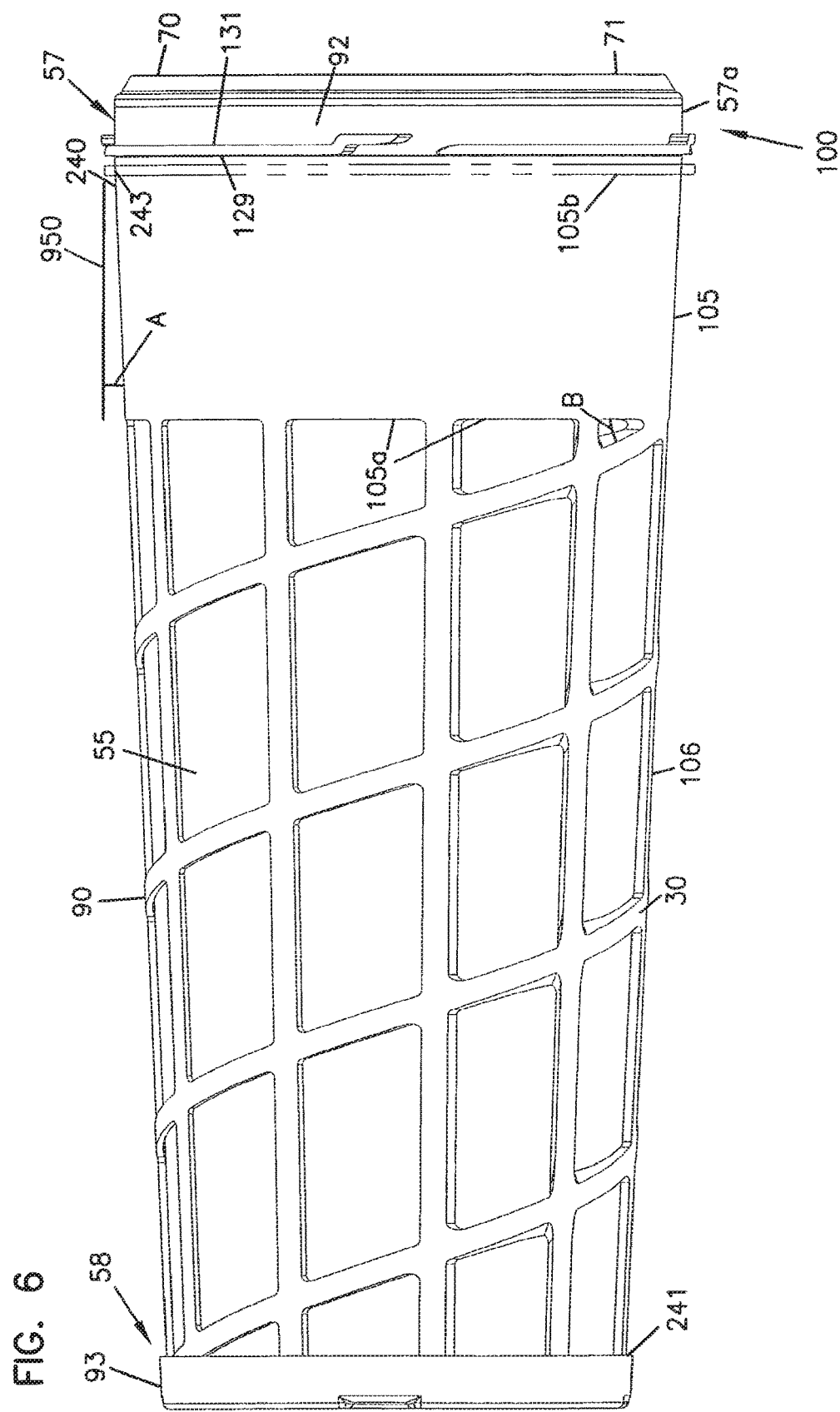
FIG. 6 is a side elevational view of a primary filter cartridge component of the assembly of FIG. 1.

5,938,804, FIG. 6 at 75; these two references being incorporated herein by reference. The types of radial seals depicted in those arrangements, could be adapted for use in a system as described herein, with appropriate modification. One radial seal is shown in the alternate embodiment of FIG. 20, discussed below.

The particular air cleaner assembly 2 depicted, however, uses a preferred axial seal between the primary filter cartridge 30 and the remainder of the air cleaner 2, to advantage. The term "axial" in this context, is meant to refer to a seal which operates upon sealing pressure in the direction of arrow 68, FIG. 3, i.e., generally in a direction parallel to the element and housing central axis 12.

More specifically, and referring to FIG. 3, end 16 of housing sidewall 9 is closed by end cover 18, with outlet 6 herein. Interior surface 69 of end cover 18, around air flow exit aperture 69a, is configured as a sealing surface. That is, it is at this surface 69 that an axial seal is formed between the primary cartridge 30 and the housing 3.

Referring to FIGS. 5 and 6, end 57 of primary filter cartridge 30 includes an end cap 57a having circular ridge, projection or rib 70 of seal material thereon, generally surrounding open central airflow exit aperture 71. Seal rib 70, FIG. 3, is pressed against surface 69, circumscribing aperture 69a, to form the axial seal. The preferred rib 70 has a somewhat triangular cross-section before the compression shown in FIG. 3.

The particular arrangement depicted in FIGS. 1-13, uses an advantageous arrangement to press the rib 70 against surface 69, forming the axial seal of the primary element 30. This is discussed in detail in Section IV below, in which a detailed discussion of the primary filter cartridge 30 is provided.

In general, because an inside radial seal of the type described in PCT Publication WO 89/01818 is not used in the preferred air cleaner assembly 2, housing 3 can be made free of any internally, axially, projecting radial seal tubes or cylindrical constructions, at end 16, if desired. Also, because primary filter cartridge 30 is free of any outer radial seals of the type described in U.S. Pat. No. 5,938,804 at 75, the housing sidewall 9 for the preferred embodiment of FIG. 3 can be made free of any otherwise necessary annular sealing surface for an outer perimeter radial seal.

III. Sealing of the Optional Safety Cartridge 31

Referring to FIG. 2, safety element or cartridge 31 includes first and second opposite ends, 80-81. First end 80 is the end inserted toward outlet 6, during assembly. End 80 includes mounted adjacent thereto and spaced therefrom, o-Ring 84. Referring to FIG. 3, when mounted in assembly 2, end 80 is pushed into annular cylindrical projection 85 of end cover 18 with o-Ring 84 providing a seal between the cartridge 31 and an annular, inside surface of end 18, specifically section 18c. The seal provided by o-ring 84 ensures that an undesired level of air does not go through outlet 6 without passage through safety element cartridge 31. It is noted that the seal provided by o-ring 84 is typically not critical, since the seal of primary filter cartridge 30 primarily protects the engine from undesired (unfiltered) air flow.

The particular mechanism by which secondary or safety cartridge 31 is secured in position, and other features of secondary cartridge 31, are described below in Section VI.

IV. Primary Filter Cartridge 30

Attention is now directed to FIG. 6, in which primary filter cartridge 30 is depicted in side elevational view. In general, the filter cartridge 30 comprises: a media and seal support structure 90; media 55; and, first and second opposite end caps 92 and 93. In general, end cap 92 is positioned at end 57 of primary element 30; and, end cap 93 is positioned at end 58. The media 55 extends completely between the end caps 92, 93. For the particular embodiment shown support 90 also extends completely between the end caps 92, 93, although in some alternate embodiments, such extension might not be complete.

The particular preferred primary filter element or cartridge 30 depicted in FIG. 6, and generally used in air cleaner 2, does not have an inner filter liner or support, extending completely between ends 57, 58, mounted as an inseparable part of cartridge 30. Rather, inner support along substantially the complete length of media 55 (except, for example, at one or both of the potted ends), is provided, optionally, by structure not mounted on and not provided as an inseparable part of, the primary cartridge 30, as described below. It will be preferred that some inner support to the media is provided, either as part of cartridge 30 or as a separate component, preferably as a separate component.

In general, end 57 is an open end, including aperture 71 therein for exit flow of air during a filtering operation. On the other hand, end 58 is a closed end, meaning that air cannot pass through end 58 covered by end cap 93, during normal operation. Features which provide for this in a preferred manner will be understood from the following discussions.

Figure 8:
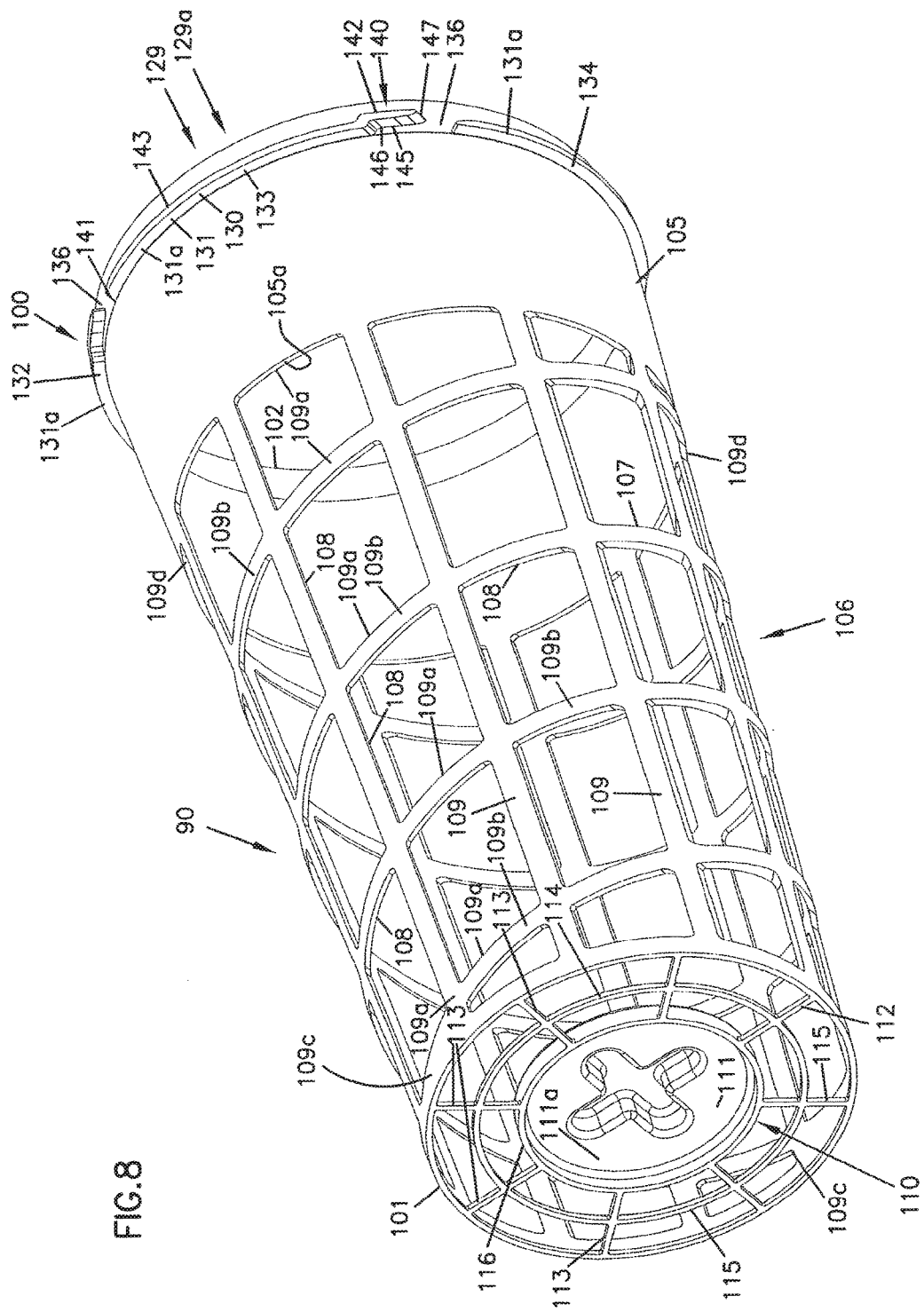
FIG. 8 is a perspective view of a component of the filter cartridge depicted in FIGS. 6-7.

The media and seal support structure 90 is depicted in FIG. 8. The support structure 90 is shown in FIG. 8, without media or end caps thereon. Thus, support structure 90 depicted in FIG. 8 is a component used to make cartridge 30, FIG. 6. In the cartridge 30, the support structure 90 is generally not separable or removable, without causing damage to the cartridge 30.

From a review of FIGS. 1-3 and 8, it will be apparent that the preferred cartridge 30 is a "non-continuously threaded" cartridge. By this it is meant that in the preferred embodiments there are no continuous threads on any portion of the cartridge 30, for threadably mounting, securing or attaching the cartridge (for example upon continuous rotation or through 360° or more of required rotation) to any portion of the air cleaner 2.

Referring to FIG. 8, the support structure 90 includes a first end 100 and a second end 101. First end 100 generally defines a circular opening 102 free of framework therein. The circular opening 102 (in the completed element 30 as aperture 71), provides for an exit region (or outlet) for filtered air. In general, end cap 92 (FIG. 6), is molded onto end 100 to provide closure to media 55 at this end. In a typical preferred embodiment, the end cap 92 also forms seal rib 70 and air outlet aperture 71. Typically, to accomplish this, end cap 92 is formed from an appropriately compressible polymeric material, such as a foamed polyurethane as described below.

Referring to FIG. 3, preferably seal rib 70 is positioned either axially aligned with edge 100a of support 90, or is positioned radially internally from overlap with edge 100a. Typically it will be positioned radially inwardly from edge 100a, with its peak no more than about 10 mm. internally of edge 100a. As a result, rib 70 is generally driven against surface 69, to form a seal, by either end 100a of support 90, or pleat ends of media 55, or both.

Referring to FIG. 8, support structure 90 includes, adjacent end 100, shield 105. Shield 105 is generally a portion of support structure 90 which is imperforate or impermeable to air flow therethrough. The shield 105 is generally sized, FIG. 3, to overlap aperture 7a where dust drop tube 7 encounters a remainder of sidewall 9. This inhibits dust, as it flows to the tube 7a, from directly impinging the media 55 in an undesirable manner, in this region. Air can get under shield 105 at edge 105a, to encounter media 55 in this region (FIG. 3).

Attention is now directed to FIG. 6. In FIG. 6, in phantom, an optional axially projecting ring or rib 105b is depicted. Such a ring 105b would be a continuous ring projecting axially outwardly, as it circumscribes shield 105. Typically and preferably ring 105b is integral with a remainder of shield 105. The optional ring 105b would preferably be positioned adjacent to, but spaced from, portions of mounting structure 129 described below, to inhibit undesired levels of dust transport into that mounting structure 129. This will be described in greater detail below.

For the particular embodiment shown, the support 90 extends completely between ends 100 and 101; and, between shield 105 and end 101, FIG. 8, support 90 includes a perforate or open section 106. By this it is meant that in region 106, support 90 includes framework 107 that leaves substantial open areas 108 for passage of air there through, to encounter media. Preferably in this region 106, the framework 107 is at least 50% open, and more preferably at least 70% open. By this, it is meant that of the total area of region 106, at least 50% and more preferably at least 70% is occupied by aperture or opening, as opposed to solid framework. Preferably the imperforate shield 105 occupies at least 10% but does not occupy more than 40% percent, of the total extension (length) of support 90 between end 100 and end 101. Preferably the perforate section 106 occupies at least 20%, more preferably at least 60%, of a total axial length of support 90.

Still referring to FIG. 8, the preferred framework 107 depicted comprises a plurality of radially spaced, axial ribs 109, in this instance 10 equally radially spaced such ribs, typically 6-14 such ribs, cross connected by a circumferentially, spiral, radial rib structure 109a, in this instance two continuous spirals 109b extending from approximately points 109c (separated radially by about 180°) adjacent end 101, to points 109d (separated radially by about 180°) adjacent shield 105, each with a total radial extension of about 720°. Advantages from a spiral rib structure 109a, as opposed to a series of parallel radial ribs, relate to provision of resistance to distortion of framework 107 when placed under radial stress during sealing an unsealing of cartridge 30. An alternate way to describe the spiral turn of radial ribs 109, is that they angle, from being perpendicular to central axis 12, FIG. 3, by at least about 10°, and typically an angle within the range of 15° to 45°. This can alternatively be stated to be the acute angle B, FIG. 6.

Attention is now directed toward end 101, FIG. 8. In general, end 101 includes end framework 110 extending there across, in contrast to opening 102 at end 100. Framework 110 does not completely close end 101, but rather includes the following general features: central, impermeable region 111; and, annular open framework 112.

Still referring to FIG. 8, annular open framework 112 generally includes spokes 113 (in this instance 8 spokes, typically 3-11 spokes) extending between impermeable region 111 and end 101; and, structural, circular, rib 114 interconnecting the spokes 113. Openings 115 defined by structure 112, help provide for preferred manufacture of primary element 30, as next described.

During a preferred manufacture of primary element 30, a pre-made, molded plastic, component comprising support 90 would be provided. Pleated media would be put into support 90, through opening 102. The pleated media would be inserted sufficiently far, for an end of the media to rest upon framework 112. Recessed surface 111a in region 111 projects with the media around it, toward end 102 to define an annular media receiving trough 116 therearound, to help keep the inserted end of the media in a round shape.

End 101 of the framework 90 could then be placed into a mold, including a curable polymeric material. The polymeric material will flow through the framework 112, into the ends of the media pleats, to form a potting, as shown at end cap 93, FIG. 6. This will seal ends of the pleats closed, secure the media in place, and close openings 115. In general, the potting material and mold depth will have been selected so as to not to have the potting material reach surface 111a of recessed region 111. A typical depth of recess for surface 111a from end 101 would be at least about 3 mm. and usually not more than 7 mm., for example 4-5 mm.

Figure 4:
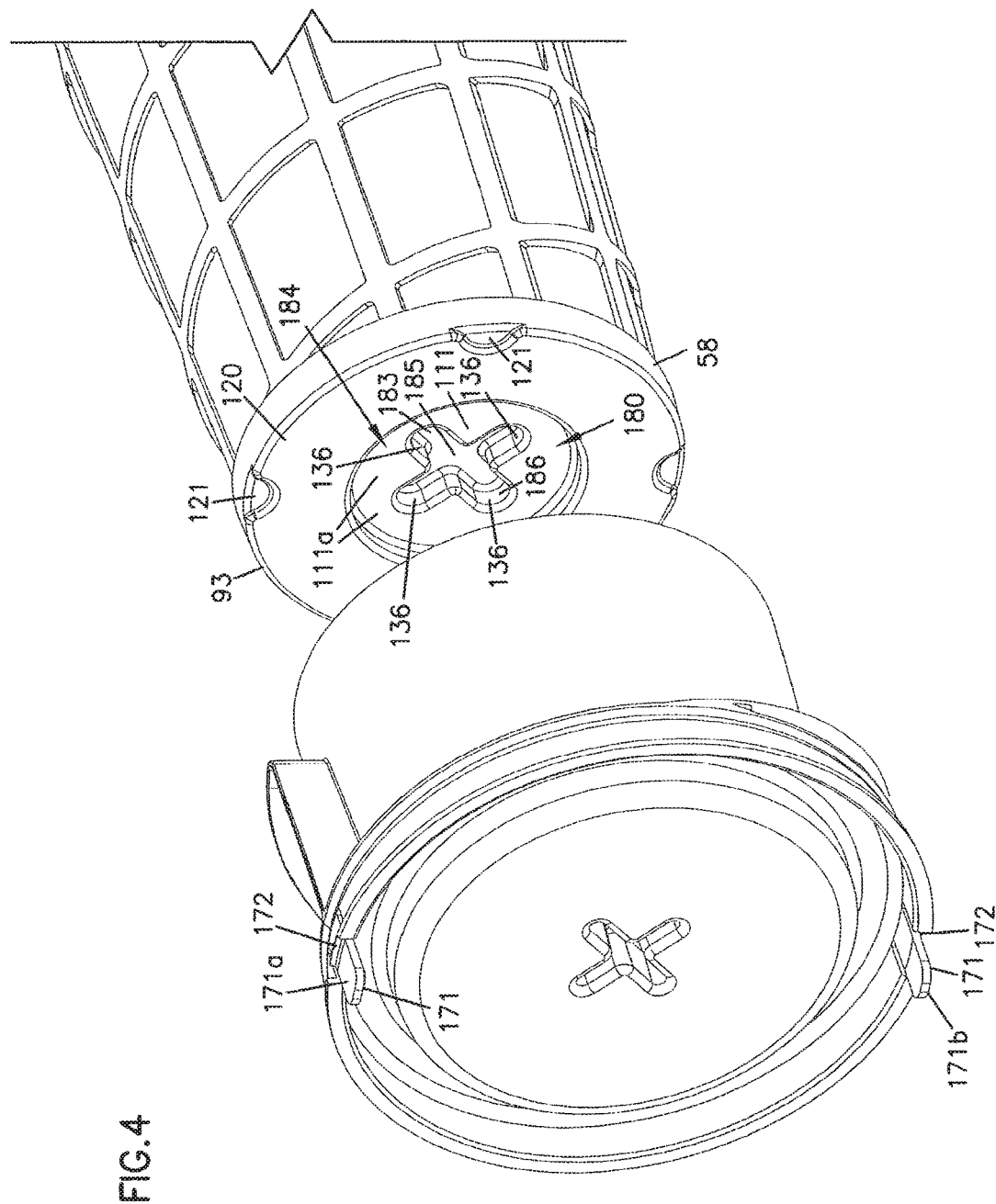
FIG. 4 is an enlarged, exploded, fragmentary outside perspective view of an end cover component and a primary filter cartridge, of the assembly of FIG. 1.

Attention is directed to FIG. 4, in which an end cap 93 formed by such a process is depicted. The potting material is generally indicated at 120. It can be seen that although region 111 has not been covered by the potting material 120, the remaining framework 112 has been. For the particular arrangements shown in FIG. 4, the molded potting material 120 is shown with annular, radially spaced, depressions 121 resulting from mold standoffs.

End cap 93, then, is a composite, closed, end cap 58, with the composite generally comprising: potting material 120 forming an annular, imperforate, ring; and, exposed surface 111 which forms a central imperforate surface in the end cap 93.

Manufacture of the element 30 could be completed, by inserting end 100 into a second mold, and molding end cap 92 thereon. The media 55 would be prevented from dropping through aperture 102, during insertion into the second mold, since it would have been anchored in place to framework 112 by the first molding process.

The primary filter cartridge 30 of the preferred embodiment includes thereon structure to provide for securement of the cartridge 30 in place and assembly 2, during use. For the particular preferred construction illustrated, the mounting structure is provided as an integral part of support 90; however alternatives are possible. The structure can be understood, in part, by review of the support 90, FIG. 8.

In FIG. 8, mounting structure 129 providing for securing cartridge 30 with seal material 70, (FIG. 3) compressed against surface 69, FIG. 3, is depicted. The particular mounting structure 129 depicted, is part of a non-continuously threaded, rotation engagement mechanism 129a, which is operated to press seal material 70 against surface 69 in part upon a rotational moment imparted filter cartridge 30. It is this operation of providing radial twist to the cartridge 30, during locking and mounting, which is facilitated by providing support 90 with spiral construction 109a. The preferred arrangement shown is configured so that a rotational motion of no more than 50°, preferably no more than 30°, most preferably 20° or less, is all that is necessary to go from an unlocked position to a locked position. This will be apparent from the following descriptions.

The engagement structure 129a in general operates with a portion of cartridge 30 engaging, upon rotation, a portion on the housing section 25. An example of a particular interaction will be understood by reviewing FIG. 8, specifically radially outwardly projecting ring 130, which operates as mounting structure 129 on cartridge 30.

Radially projecting ring 130, in the embodiment shown, is a segmented ring 131. The particular embodiment shown comprises four identical, evenly spaced, segments 131a;

however alternatives are possible. In FIG. 5, three of the segments 132, 133 and 134 are viewable. The fourth segment 135 would be positioned as shown in FIG. 5. All four are viewable in FIG. 7. Each segment 131a projects radially outwardly, from an immediately adjacent portion of support 90, by at least 2.5 mm., typically at least 3.5 mm.

Referring to FIG. 8, segmented ring 131, has a series of radially spaced gaps 136 therein. The gaps 136 are positioned between the segments 132-135 of the segmented ring 131. The gaps 136 are appropriately sized to allow at least selected portions of ring 131 to be pushed (axially) past structural features in the housing 9, for rotational engagement as discussed below. Each gap 136 is preferably at least 6 mm. wide, typically at least 7 mm. wide. Gaps on the order of 20 mm.-40 mm. are useable, for example.

Referring to FIG. 8, each ring segment 131a (such as segment 133), includes first and second opposite ends 140 and 141. End 141 is typically a blunt end; and, end 140 comprises a short segment at 142 axially offset (from a remainder 143 of the segment 131) toward end 100. A result is formation of a receiving area 145 along a surface 146 of segment 142 facing toward end 101 (or away from end 100). Receiving area 145 is positioned to engage (upon radial receipt) structure in the housing 9, discussed below, to ensure appropriate sealing between the primary element 30 and the housing 9, during operation. It is noted that tip 147 of section 140 comes to a rounded point, with surface 145 being a cam surface and recessing from tip 147 toward end 101 in extension toward section 143. It is also noted that each of the ring segments 132-135 is oriented with its offset section corresponding to section 142, FIG. 8, on one side of a gap 136, and with a blunt end, corresponding to end 141 of the next adjacent ring segment, positioned on the other side of the corresponding gap 136. In the instance shown, and from the end view from end 101, each segment 131 "points" in clockwise arc, with end 141 being considered the front end.

Figure 9:
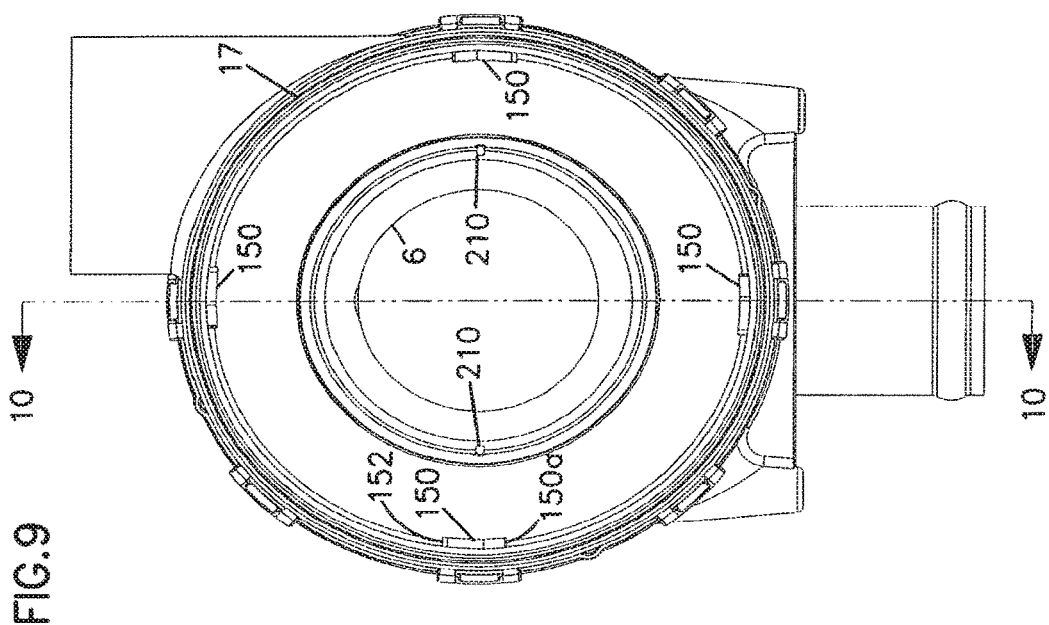
FIG. 9 is an end elevational view of a housing component of the assembly depicted in FIG. 1, shown with an end cover component removed and with certain internal componentry viewable.
Figure 7:
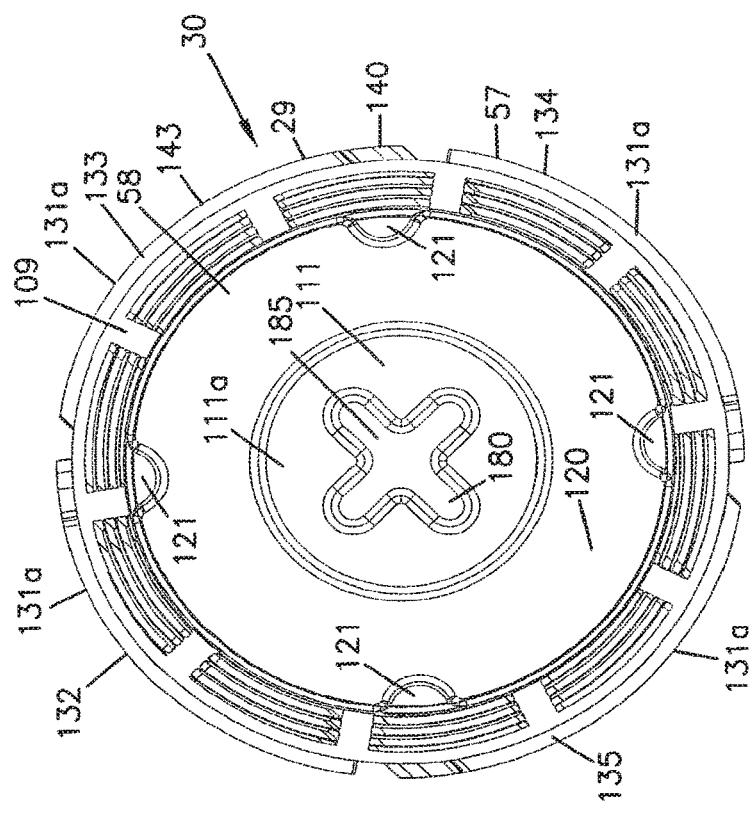
FIG. 7 is an end view of the filter cartridge depicted in FIG. 6 looking toward end 58.
Figure 10:
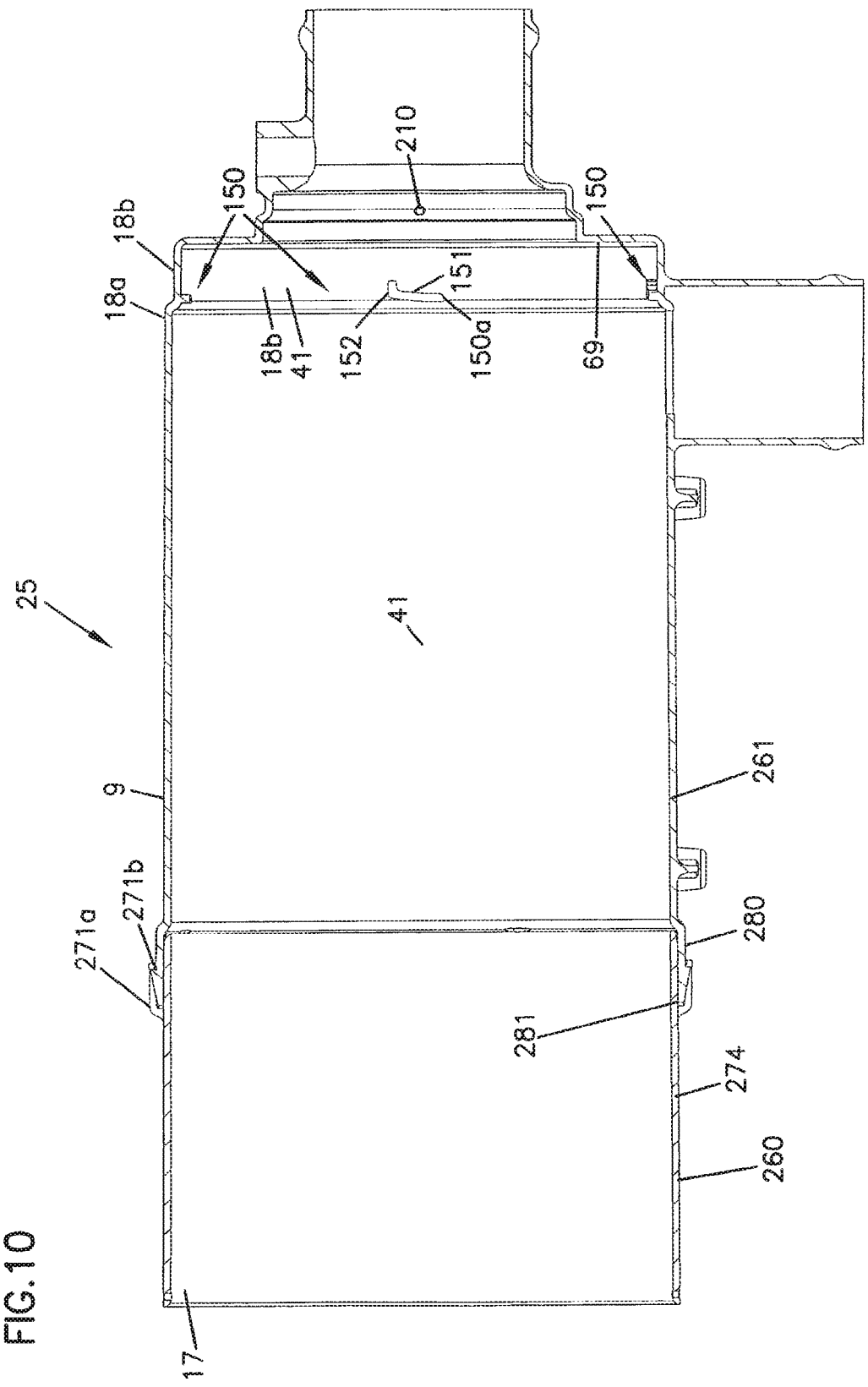
FIG. 10 is a side cross-sectional view of the housing component of FIG. 9 taken generally along line 10-10, FIG. 9.

Attention is now directed to FIG. 10. In FIG. 10 a cross-sectional view of portion 25 of the housing 9 is depicted. In FIG. 10, holder structure 150 is shown. From FIGS. 9 and 10, it will be apparent that for the particular embodiment shown there are four, evenly spaced, holder structures 150, one corresponding to each gap 136, in ring 130.

Each holder structure 150 is positioned adjacent an inside surface 41 of housing 9 at region adjacent section 18b (at a joint area between sections 18a and 18b) of the housing sidewall 9. Each holder structure 150 is sized to pass through a gap 136, FIG. 8; further, surface 151, which is directed toward outlet 6, is shaped as a cam to slant toward outlet 6 in recess from tip 150a. Finally, holder 150 includes end stop 152 thereon at an end opposite tip 150a.

From the viewpoint of FIG. 9, i.e., looking toward end 17, each of the holders "points" counter-clockwise, if it is assumed that the tip 150a is the front of each holder and that the stop 152 is the back end. Pointing this direction facilitates engagement with ring segment 131, which, as characterized above, points in an opposite direction. It is noted that if the ring segments 131 are configured to point counter-clockwise, then the holders 150 could be directed to point clockwise. (These and other alternative arrangements will be understood from the following description of operation.)

Although alternatives are possible, in the particular embodiment shown, the housing 3 would include four holders corresponding to holder 150, evenly radially spaced around an interior of surface section 18b, each pointing in the same direction. Again, the four holders 150 would generally correspond with the four gaps 136 between the four ring segments, 132-135.

Operational engagement between the primary filter cartridge 30 and the housing 3, to cause sealing between gasket 70 and surface 69 should now be apparent. In general, cartridge 30 would be inserted into the open housing 25 through open end 17, FIG. 10. The end of the element 30 inserted first, would be end 57 FIG. 6. The cartridge 30 would continue to be pushed in, with an appropriate radial orientation such that holders 150 can pass through gaps 136. This will allow gasket 70 to encounter and be pressed against surface 69, FIGS. 3 and 10. Once this extent of insertion is reached, the cartridge 30 would be rotated, (for the particular embodiment depicted clockwise), so that portions 142 of each ring segment would be aligned over surface 151 of each holder 150. The surface 145 of each section 142 and surface 151 of each holder 150, i.e., the engaging surfaces, would be shaped and sized to cause a further biasing or camming to drive cartridge 30 against surface 69 preferably with compression of rib 70, to ensure appropriate compression of the gasket material 70 to form a seal. Rotation would preferably be designed to occur until tip 147 engages stop 152.

As a result of the rotational interlock, the cartridge 30 cannot back away from surface 69 without being rotated, due to the holders 150 being positioned against surfaces 146.

Referring to FIG. 10, in general the arc length between tip 150a and stop 152, represents the rotational arc between full locking and fully unlocking of the cartridge 30. Typically, the construction will be such that the arc is no more than 70°, typically no more than 50°, and for the particular embodiment of FIG. 10, preferably no more than 40°. Most preferably, for the embodiment of FIG. 10, it is no more than 30°. Indeed, for the particular arrangement shown, this arc is on the order of only about 10° to 25°.

From the above, it will be apparent for the particular preferred embodiment shown, the primary filter cartridge 30 includes no inner support structure extending between ends 57, 58, along an inside surface of the media 55. This is advantageous, for manufacture and assembly. When the cartridge 30 is positioned for use, in an air cleaner, inner support to the media 55 is provided by structure already positioned within the housing 3.

More specifically, internal support for the media 55 is provided by a separate support structure 160, FIG. 2 for example a portion of the secondary or safety element or cartridge 31. In the event that an optional secondary or safety element 31 is not used with the system, a support structure similar to structure 160, but not having media associated therewith as a secondary filter, can be used to support media 55 along its inside.

Attention is again directed to the optional rib 105b shown in FIG. 6. Such a rib 105b, in use, would generally be positioned spaced axially toward end 93 from mounting structure 129, specifically axially toward end 93 from segment and ring 131. Preferably the spacing the optional rib 105b from the segmented ring 131, in this direction, would be by no more than 10 mm., and preferably substantially less. The continuous ring 105b would generally protect segmented ring 131 from being undesirably exposed to dust, during use.

In some alternate embodiments, it may be desirable to have framework 90 not extend continuously from end 100 to end 101; but rather to have the support 90 include shield 105, without framework from end 101; and, to have at opposite end 101 appropriate structure (such as impermeable region 111 and annual open framework 112), for forming a preferred composite end cap.

V. The End Cover 20

As indicated previously, the end cover 20 is a service cover 21 that can be removed from the remainder of the housing 25 to allow service access to the interior 23 of the housing.

For the particular embodiment shown, the end cover 20 has no air flow aperture extending therethrough. That is, it has an outside surface 20a, FIG. 1 and an inside center surface 20b, FIG. 5, with no aperture or air flow tube extending therethrough. For this reason, it can be referred to as a "closed" or "completely closed" end cover 20.

Referring to FIGS. 1, 2 and 4, assembly 2 includes a mounting and locking mechanism 170, to secure the cover 21 onto the remainder 25 of the housing sidewall 9. In general the mounting and locking mechanism 170 comprises a plurality of flexible tabs mounted on one of the housing sidewall 9 and cover 20, and a plurality of engageable recesses mounted on the other one of the housing sidewall 9 and cover 20. For the particular arrangement shown, the mounting and locking mechanism 170 generally comprises a plurality of flexible tabs 171, on end cover 21, each of which includes a radially projecting tongue 172, FIG. 4, thereon. For the particular embodiment shown, the mounting mechanism 170 comprises two tabs 171a, 171b, radially spaced 180° apart, around the circumference of cover 21. The housing and 17 includes a pair of recesses or slots 175, FIG. 1, therein, for receipt of tongues 172, when the service cover 21 is mounted.

Operation, then, is as follows: referring to FIG. 1, in order to remove service cover 21 from the remainder of housing 3, tabs 171 would be biased toward one another. This would move the projecting tongues 172 (FIG. 4) out of slots 175, releasing the cover 21 for movement relative to the housing sidewall 9. Insertion would be a reverse operation. Particular useable materials for formation of the cover 21, to provide flexible tabs 171, are discussed below. If the tongues 172 are provided with appropriately cammed surfaces on an end directed toward remainder 25 of the housing, when the cover 20 is pressed in place, it will not be necessary to bias the tabs 171 by hand during mounting, but rather the cams would cause the biasing or snap fit mounting as the cover 20 is pressed in place.

An advantage to the particular mounting and locking mechanism 170 described, it is that it comprises features integral with cover 20 and housing 9, and does not require the attachment of any additional mechanisms such as latches, hooks, etc., for operation, after cover 20 is molded.

For the particular mounting system involved, only two tabs 171 and slots 175 are used; and, each tab 171 can engage each one of slots 175. As a result, as thus far described the cover 21 could be mounted in two rotational orientations relative to sidewall 9. However, if this were possible for the particular embodiment depicted, the cover 20 could be mounted such that the orientation between the inlet 5 and the ramp 36 is not appropriate. To ensure that the cover 20 is only mountable in a single rotational position, relative to a remainder of the housing 25, an indexing arrangement can be provided. Specifically a slot and key arrangement can be used, in which one member (slot or key) is positioned on the cover; and another member (key or slot) is on the housing sidewall 9. The two members would be positioned so that the cover can only fit (slot engage key) when it is rotated to a specific pre-set orientation.

Figure 15:
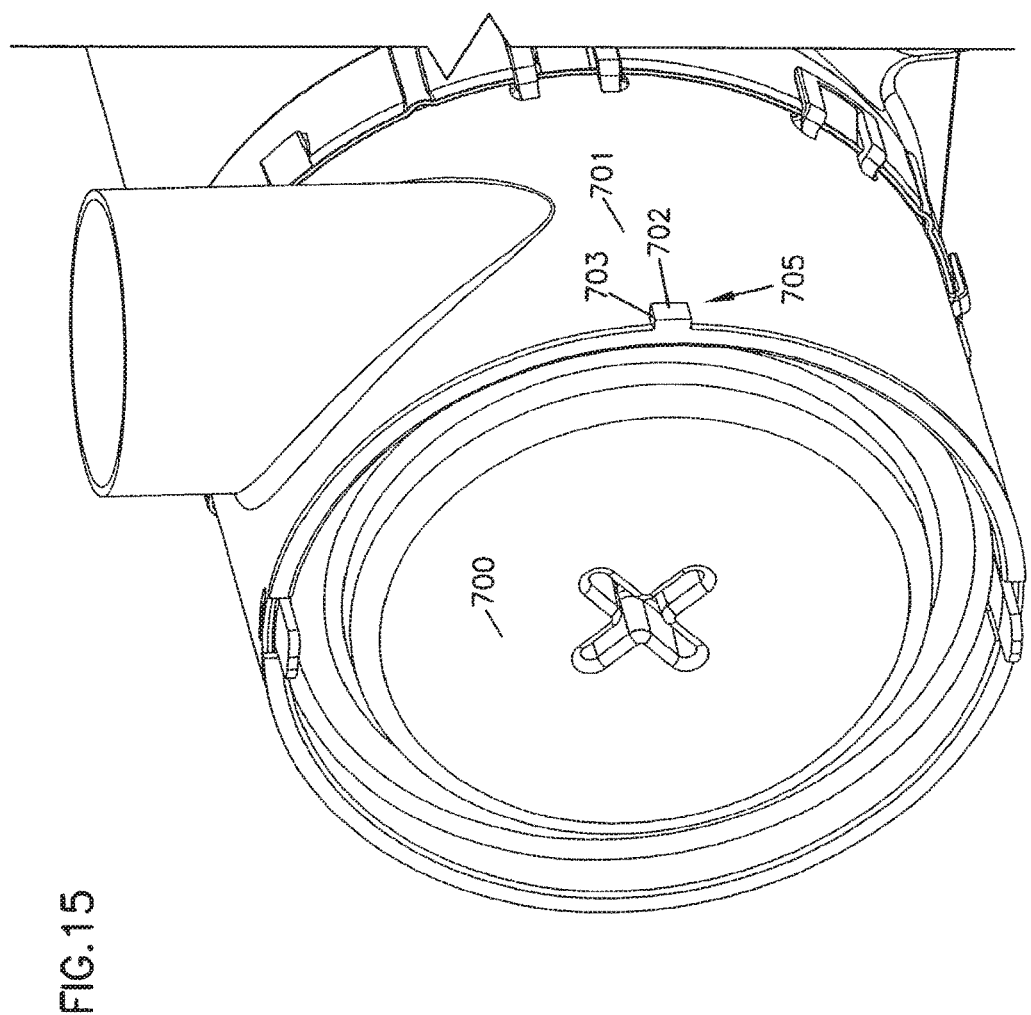
FIG. 15 is a fragmentary, perspective, view of a second alternate embodiment of an air cleaner according to the present disclosure.

An example as illustrated in the embodiment of FIG. 15, in which a cover 700 is shown mounted on a sidewall 701, with a key or pin 702 on the cover 100 received within a slot 703 on the sidewall 701. Cover 700 could only be properly mounted, if the key or pin 702 is aligned with the slot 703. Thus, the slot and key arrangement 705 depicted in FIG. 15 ensures that the cover 700 is appropriately rotationally mounted relative to the housing sidewall 701, for proper operation.

Referring again to FIG. 1, an optional handle construction 710 is shown, in phantom, on cover 20. If desired, the tabs 171 and slots 175 could be configured such that under a hand (pulling) force applied to handle 710, (i.e., under pulling of the handle 710), the cover 20 could be released from its secure position without the need to manually press tabs 171 toward one another. The handle 710 could be configured in a variety of forms. The particular handle 710 shown includes a removable or replaceable cross piece 711 extending between two mounting ears 712, 713. The ears 712, 713 could be molded integrally with a remainder of cover 20.

Attention is now directed to FIG. 5, for detail within shield 37 on cover 20. In particular, in a portion 178 inside of shield 37 which will be adjacent end 58 in use, cover 20 includes an internal ring 179 of smaller inside diameter than a remainder 179a of shield 37. The ring 179a, FIG. 3, is sized to receive end 58 therein with little or no space therebetween in use. This will help securely support the end 58 of primary cartridge 30, along end cap 93, i.e., at an end of cartridge 30 remote from outlet 6.

Referring to FIG. 6, the primary filter cartridge 30 is supported at end 57, within the housing 3 (FIG. 3), by a combination of: the mounting structure 129; and, end cap 92.

Referring to FIG. 4, attention is now directed to an engagement arrangement, for providing a preferred engagement between primary element 30 and cover 20. In particular, and referring to FIG. 4, impermeable region 111, in primary filter cartridge 30, includes recessed surface 111a in the pre-form comprising a portion of framework 90, and includes centrally positioned in surface 111a, a first member 183 of a projection/receiver arrangement 184. In particular, surface 111a includes receiver 185. Preferably, the receiver 185 is non-circular, for reasons discussed below. The particular receiver 185 depicted for the embodiment shown in FIG. 4, is an X-shaped (or "+" shaped) receiver 186 with a 90° angle between center lines of each pair of adjacent arms of the X-shape, although a variety of alternate shapes can be used. A particular advantage resulting from the X-shape to the receiver 186, is discussed below with respect to indexing and symmetry. The term "pre-form" in the context of this paragraph, refers to a structural component of the end cap made prior to potting into the end cap material.

Further, as shown at FIG. 5, cover 20 includes, along the inside surface 190 thereof, a second member 187 of the projection/receiver arrangement 184, in this instance a centrally positioned projection 191. Again, preferably projection 191 is non-round and in this instance is an X-shaped projection 192, with a 90° angle between a center line of each pair of adjacent arms of the X-shape. The projection 192 is sized and configured to project, when appropriately aligned, into receiver 185. When the air cleaner 2 is assembled, FIG. 3, projection 191 will protrude into receiver 185. In part because the projection 192 and receiver 186 are both non-round, the cartridge 30 is prevented from rotating, in use, by the projection/receiver arrangement 184, when the air cleaner end cover 20 is locked in position on housing 3.

In particular, it is important that during use, the element 30 not inadvertently rotate relative to the housing 3, to ensure that the seal between gasket material 70 and surface 69 is maintained. That is, relative rotation between element 30 and surface 69 would tend to disengage the interaction between holders 150 and ring segments 131. To inhibit rotational movement of the element 30 relative to the remainder of the housing 3, during assembly and use, projection 191 and receiver 185 are shaped, to engage upon rotation and inhibit a sufficient relative rotational movement between the cartridge 30 and a remainder of air cleaner 25, to allow the cartridge to unseal. The particular shape shown for each is an X-shape. However, with respect to this general function, all that is generally required is that the projection 191 and the receiver 185 not be circular, but rather each be non-circular and have a portion that interacts with the other and inhibits rotational movement of one relative to the other.

The particular use of a four armed cross or X-shape (or +-shape; i.e., "plus shape") for each member, relates to an indexing and symmetry function. In particular, ring 131 of primary filter cartridge 30 includes a specific number (N) of radially spaced gaps 136. As a result of this configuration, and also the same number (N) of holders 150 and the same number (N) of segments 131, cartridge 30 can be positioned within housing 3, at N specific radial orientations. When N is the number 4, and the four positions are 90° apart, each one of these N radial orientations corresponds to an arm 193 of projection 191. Since there are a total of four gaps 136, four holders 150 and four sections 131, the particular projection 191 depicted is an X-shape 192 with four arms 193 each extending at 90° relative to adjacent arms. Of course, receiver 185, FIG. 4, is similarly constructed. Thus, the element can be mounted in four rotational positions.

Such a symmetry between a number of possible rotational positions and engagements, between the primary cartridge 30 and the remainder of the housing 3, will generally be referred to as a primary cartridge/housing rotational symmetry. For the particular embodiment shown, the primary cartridge/housing rotational symmetry is four fold, meaning four rotational orientations, but not more, are possible. Of course, alternatives are possible; however, preferably at least two possible rotational positions are provided.

The extent to which the projection member 191 extends into the recess or receiver 185 (of the preform), of the projection/receiver interlock arrangement 184, is not critical, as long as the extent of projection is enough to inhibit rotation. It is anticipated that in general constructions will be made such that the amount of projection into the receiver 185 from surface 111a will be at least 3 mm., typically at least 5 mm., and generally on the order of 6 mm. to 10 mm.

Of course the first member of the projection receiver arrangement 183, could be a projection as opposed to a receiver, with the second member being the receiver instead of the projection. That is, the projection/receiver arrangement 184 could be configured with a projection extending axially outwardly from surface 111a, toward cover 20, to be received within a receiver on end cover 20. The particular arrangement depicted, however, with receiver 185 on the cartridge 30, and the projection 191 on the cover 20, is preferred.

Again, it is noted that impermeable end 111 and framework 112 (FIG. 8) are preferably formed as a pre-form, before a remainder of end cap 93, FIG. 6, is molded.

Referring to FIG. 3, it is also noted that the preferred cover 20 is circumscribed by end 17 of housing sidewall 9, when the cover 20 is properly mounted; and, the cover 20 includes no portion which slides over (or around) region 17a on an outside surface of end 17 of sidewall 9. A cover 20 configured in this manner, will sometimes be referred to by the following characterizations: "cover 20 is positioned circumscribed by a portion of housing 9, when mounted, and cover 20 includes no portion which circumscribes housing 9, when mounted," or by variants thereof. Alternative arrangements for mounting the cover 20, are described below.

VI. The Optional Safety Element 31

Figure 13:
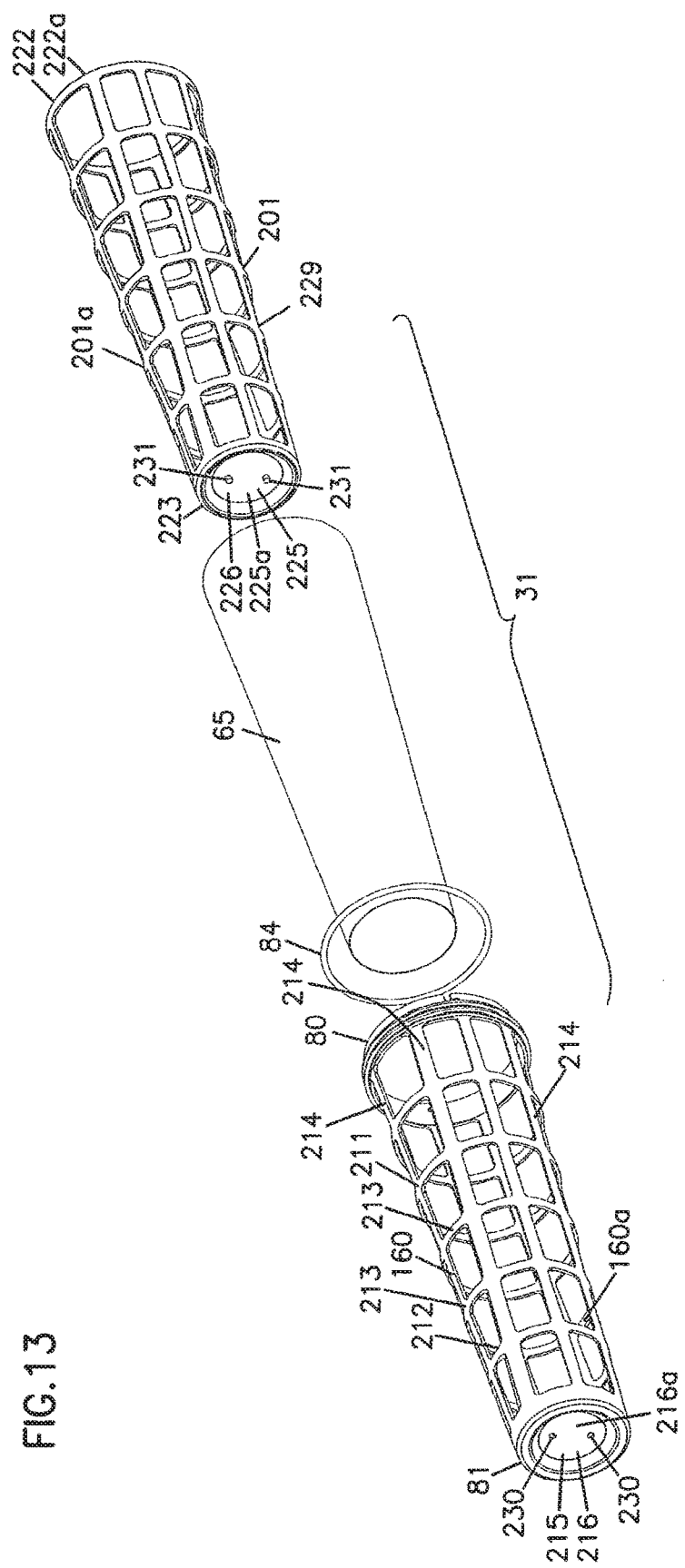
FIG. 13 is an exploded view of the safety element component of FIG. 11.

Attention is directed to FIGS. 11-13, with respect to the optional safety element 31. In general the safety element 31, FIG. 13, comprises: support 160; inner support 201; media 65; and, o-ring 84. The support 160 generally extends between first end 80 and second end 81. The first end 80 is the end first inserted into the housing interior 23, during mounting. End 80 includes o-ring 84 mounted spaced therefrom but adjacent thereto, and positioned in o-ring receiver 203. For the particular embodiment shown, end 80 includes, immediately adjacent thereto, impermeable ring surface 205 with mounting slots 206 therein. The mounting slots 206 are generally L-shaped (or J or hook shaped), FIG. 12, and are positioned to engage posts 210 within housing 3, FIG. 9, upon an appropriate engagement and twist. The posts 210 project radially inwardly. (An alternate embodiment is described below which does not use a slot 206/post 210 engagement mechanism.)

For the particular arrangement shown in FIGS. 11-13, there are two slots 206 and two posts 210, each member of each pair being positioned rotated 180° from the other around an inside of housing 3. The posts 210 are on surface 18c. Thus, outer support 160 is configured to have two rotational positions relative to the housing 3, during installation. The symmetry between support 160 and the housing 3 will generally be referred to as support 160/housing symmetry or by variants thereof. Symmetry with two possible positions, but not more, will be referred to as two-fold support 160/housing symmetry.

Referring again to FIG. 13, support 160 comprises framework 211 with apertures 212 therein. Preferably support 160 is at least 50% open and more preferably at least 70% open, in extension between end 80 and end 81. In general use, safety cartridge 31 does not have a substantial twisting and pressure applied thereto, simply to operate interaction between slots 206 and posts 210. That is, the rotation to operate interaction between posts 210 and slots 206 is relatively easy. Thus, the support framework 211 does not have spiral radial extensions, but rather uses parallel hoops 213 (in this instance five hoops) interconnecting axial extensions 214.

End 80 generally defines an open circular interior 80a, through which air can pass during use. End 81, on the other hand, is closed by cover 215. For the particular embodiment shown, cover 215 includes a recessed center 216, configured as described below.

For the particular safety element depicted in FIGS. 11-13, the media 65 comprises a wrap or similar construction of non-pleated, non-woven, material. It is positioned generally between inner support 201 and support 160. Referring to FIG. 13, the inner support 201 is generally framework having first and second opposite ends 222, 223, with an open or porous support structure 229 extending therebetween. Preferably the porous structure 229 is at least 50% open and more preferably at least 70% open, over this extension. For the particular embodiment shown the support structure 229 is a series of radially spaced axial extensions 229a supported by parallel, spaced, hoops 229b, in this instance five hoops, not counting end 229c.

For the particular embodiment shown, end 222 of inner support 201 defines an open circular opening 222a, for passage of air therethrough during use; whereas end 223 is closed by end cover 225. The preferred end cover 225 depicted, includes a recessed center portion 226.

The particular components 160, 201 depicted in FIG. 13, are configured for engagement. In particular, media 65 can be positioned around an outer surface 201a of inner support 201. This assembly could then be projected into an interior 160a of support 160, until end cover 225 engages end cover 215, FIG. 12.

For the particular arrangement shown, cover 215 includes a pair of apertures 230 therein, sized and shaped to receive posts 231, on cover 225, for an interlocking engagement. Interference (snap) fit, heat staking or other construction methods can alternatively be used. Preferably in the immediate area where the components 160, 701 directly engage for interlock, there is no media 65 positioned between them.

It is noted that cover 215 is sized and recessed for a telescoping fit or projecting fit, into a recess 225a defined by cover 225. This, in part, accommodates recess 216a in support 60 which in turn accommodates the projection/receiver arrangement 184, when air cleaner 2 is assembled, FIG. 3.

Attention is still directed to FIG. 3, with respect to complete assembly. It is noted that recess 185 of the primary filter cartridge 30 projects (in the preferred embodiment shown) partially into recess 216a defined by the cover 215. As a result, each of the primary element 30 and the safety element 31 are inhibited from coming loose and moving in a direction toward cover 20, during assembly and use.

In those instances in which it is desirable not to utilize optional secondary or safety filter 31, it may be desirable simply to install support 160 with no media 65 or support 201 associated therewith, into housing 3. The support 160 would still operate, then, as inner support for the primary filter cartridge 30.

In general, the apertures 230 and posts 231, FIG. 13, can be viewed as a projection/receiver arrangement 233, FIG. 12, for the safety element cartridge 31. The projection/receiver arrangement 233 could be configured, alternatively, with the projection on the outer support 160 received within receivers on the inner support 201, or in further alternate arrangements, if desired. In general terms, then, the inner support 160 includes a first member of projection/receiver arrangement 233, and the inner support 201 includes a second member of such an arrangement.

IX. The Outer Surface Shape of the Components 30, 31

Referring to FIG. 6, it is noted that the primary element 30 has an outer surface shape, which is generally conical. More specifically, region 240, FIG. 6, of outer support 90 is a wide end and has a first diameter D1, and region 241 is a narrow end and has second diameter D2 with:

(a) D1 greater than D2; and
(b) a dimensional decrease in cross-sectional diameter being generally even in extension between points 240 and 241.

Typically and preferably diameter D1, a largest diameter adjacent end 57, is at least 10% larger than diameter D2, a diameter adjacent a smallest end 58. Typically and preferably the diameter D1 is at least 10 mm. larger than the diameter D2. Such a shape may sometimes be referred to as frusto-conical, since the conical shape does not taper to a point.

This generally conical shape, which includes shield region 105 and open region 106, provides for advantage. First, the narrow end at 241, allows for an outside diameter that accommodates some of the space taken by the ramp 36 and shield 37 of the precleaner 35, without a larger diameter being needed for air cleaner housing sidewall 9. On the other hand, the larger diameter D1 at region 240 allows for a relatively large exit aperture 102 and thus reduction in restriction to exit air flow while maintaining a relatively large amount of media 55. Also, referring to FIG. 3, the increase in diameter of shield section 105 in extension between points 242 and 243, helps direct dust or other particles into aperture 7a of down tube 7.

In general, referring to FIG. 12, the particular preferred safety filter cartridge 31 depicted has an analogous conical shape with a diameter D3 at region 250 greater than diameter D4 at region 251 and an even taper and decrease in diameter therebetween. This will ensure that support member 160 of the safety filter cartridge 31 is positioned adjacent internal pleat tips of media 55 in cartridge 30, for support there along.

X. Jointed Housing Construction

Attention is directed to FIG. 1. In particular, the housing 3 depicted has a sidewall 9 which is a segmented sidewall 260. By "segmented" in this context, it is meant that the sidewall 9 includes at least two sections 261, 262 which are not formed integrally with one another, in a single molding, but rather which are separately made and are mechanically secured along a joint or seam 263, to form sidewall 9.

For the particular embodiment shown, the segmented housing 260 includes, in first section 261, the following: end 16; outlet tube 6; and, down tube 7. In segment 262, the housing 260 includes: inlet tube 5; and, end 17 for mounting cover 20.

Engagement between segments 261 and 262, at joint 263, is provided through an interlock mechanism 270. In general the interlock mechanism 270 includes a plurality of projections 271; and, a plurality of receivers 272, in this instance flexible latches or u-shaped hoops 273. The hoops 273 are sized to snugly snap fit over the posts 271, when section 262 is pressed toward section 261. For the particular embodiment shown, each of the posts or projections 271 is generally rectangularly shaped and each of the latches or hoops 273 has a similarly shaped aperture therein, to facilitate snug fit.

For the particular embodiment shown, the projections 271 are evenly radially spaced around outer surface 272 of segment 261; and, the flexible latches or hoops 273 are evenly radially spaced around outer surface 274 of section 262. Alternate constructions are of course possible. For example, the specific locations could be reversed. The particular embodiment shown, however, is preferred.

For the arrangement shown, the central aperture of each latch or hoop 273 has a perimeter size of about 12 mm. wide, with the post or projections 271 having a similar width. Each post 271 has a length of about 11 mm., with a cam shape from tip 271a to sharp edge 271b, FIG. 10.

Referring to FIG. 1, for the particular arrangement depicted, section 261 includes an enlarged (in diameter) rim section 280 adjacent end 281, to receive a portion of surface 274 therein, and to circumscribe that portion, during assembly. This is also shown in FIG. 10.

In a preferred embodiment, at least six radially spaced posts 271, and six radially spaced latches 273, are used. Typically and preferably the number of each will be about eight to fourteen.

Advantages from the segmented housing construction will be understood by reference to FIG. 1. In particular, segment 261 will be mounted or oriented, on a vehicle, such that drop tube 7 is pointed generally downwardly. This facilitates operation of dust evacuation through evacuator valve 32.

The inlet tube 5 will generally need to be directed, for various equipment, toward a preferred location for an inlet tube to be connected. For different vehicles, it may be desirable to have a different orientation (radially) between the center line 11 or direction of tube 5, and tube 7 from that shown in FIG. 1. The segmented housing allows for section 262 to be mounted on section 261, in at least 2 and preferably more selected rotational orientations.

The particular segmented housing 260 depicted in FIG. 1, is organized to permit four possible rotational orientations, each 90° spaced from one another. Indexing between the four arrangements is provided by indexing arrangement 290. In general, the indexing arrangement 290 comprises a rib/detent arrangement in which ribs are used in one member of the two housing pieces, and detents are used on another member of the two housing pieces, to index line for joining.

The indexing arrangement 290 for the arrangement shown, comprises four ribs 291 which extend axially and project radially outwardly from surface 274, each of which engage an associated detent or receiver 292 in section 272 of segment 261. Four evenly spaced interference fitting ribs and detents, index four possible rotational orientations of the segment 262 relative to segment 261, for sliding engagement and activation of the snap fit locking mechanism 270.

In general, the snap fit locking mechanism 270 should be selected so as to make disconnection relatively difficult. This is because it is not anticipated that, typically, once assembled and installed, air cleaner 2 would be reconfigured for a different rotational relationship between segment 262 and segment 261.

Another possibility allowed or accommodated by a segmented housing 260, is having a single mold for segment 261, while having alternate molds for segment 262, for example to vary overall housing axial length or to accommodate, in a custom manner, a different cartridge 30.

Figure 14:
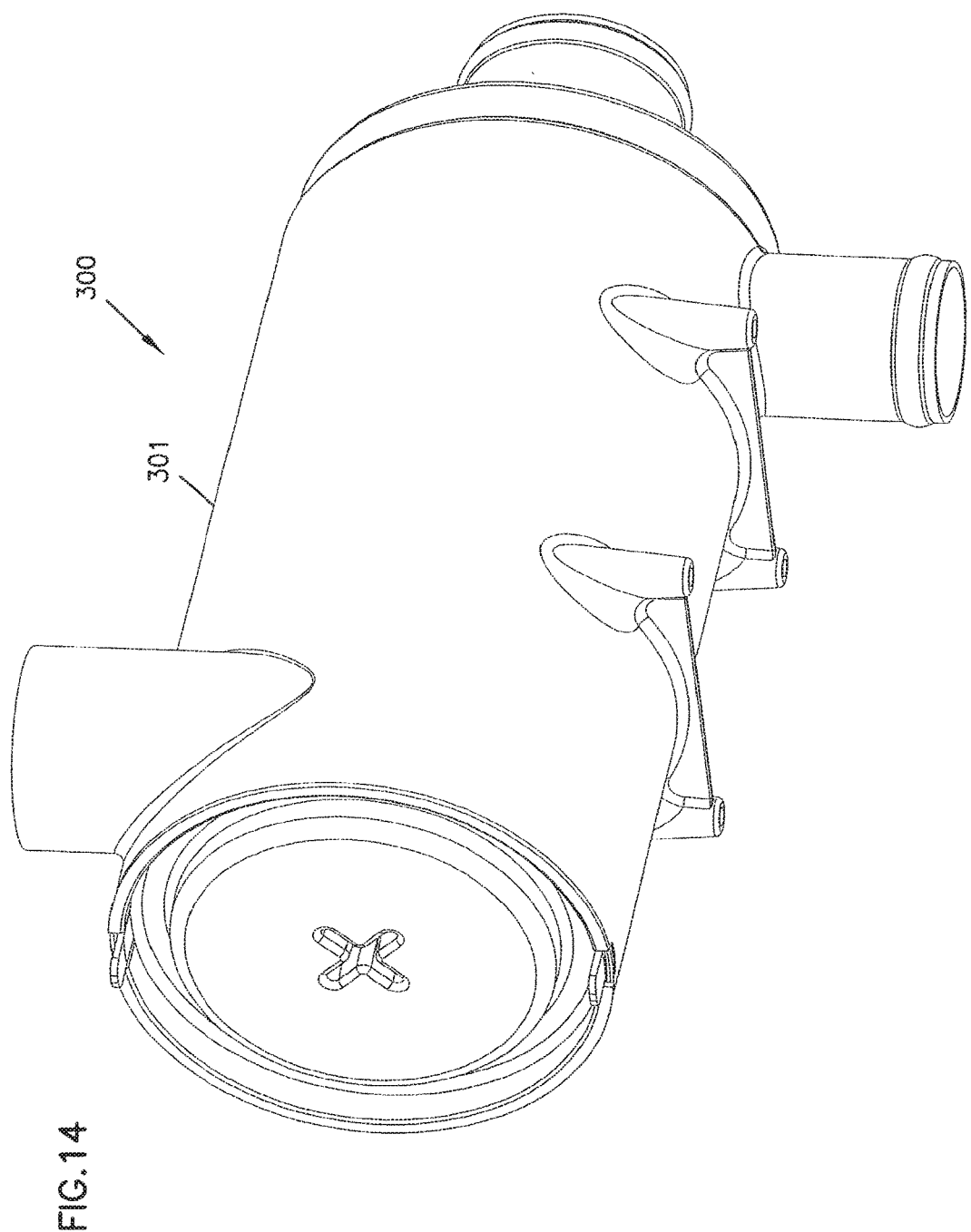
FIG. 14 is a side perspective view of an alternate embodiment of an air cleaner according to the present disclosure.

Of course the segmented housing is optional. In FIG. 14, there is depicted a housing 300 which is not segmented. The housing 300 may be in accord with the description given about for FIGS. 1-13, except for the absence of the segmented housing.

XI. Selected Alternate Embodiments

A. An Alternate Mounting Approach for the Safety Element, FIGS. 16-19

For the embodiment of FIGS. 1-13, the safety element 31 was mounted by a twist mount involving interaction between slots 206 and posts 210. An alternate arrangement is shown, in FIGS. 16-18.

Figure 16:
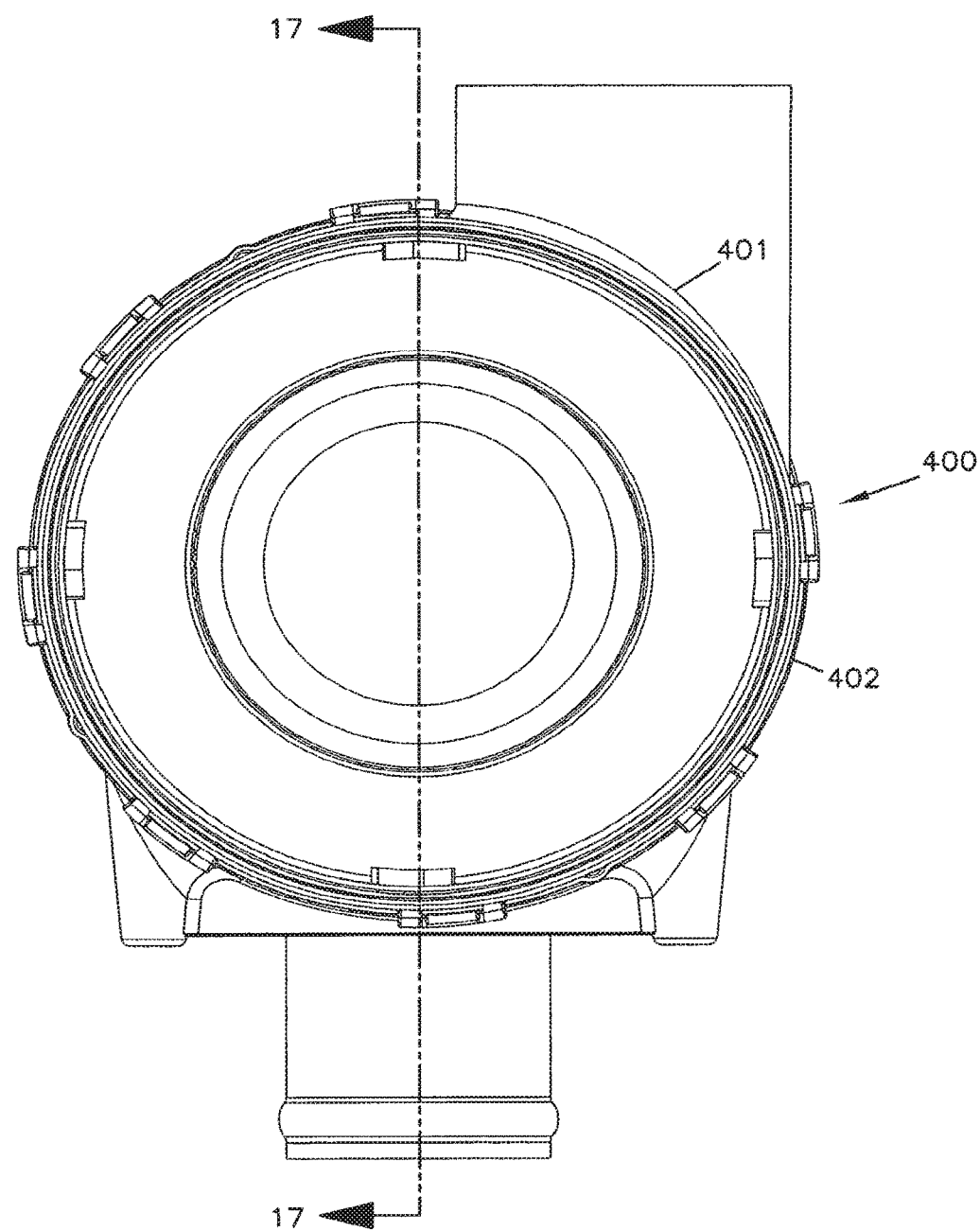
FIG. 16 is an end view of a portion of a third alternate embodiment of an air cleaner according to the present disclosure.

In FIG. 16, an end view in air cleaner 400 according to the alternate embodiment is shown. The end view of FIG. 16 is generally analogous to the end view of FIG. 9. The parts used in air cleaner assembly 400 may be generally as described above the embodiment of FIGS. 1-13, or even as characterized in alternate embodiments, except as described herein in connection with the mounting of the safety element.

In general, the air cleaner assembly 400 includes a housing 401 having an outer sidewall 402. In FIG. 16, the air cleaner assembly 400 is shown with an end cover removed. However, the end cover may be generally analogous to end cover 20, FIG. 1.

Figure 17:
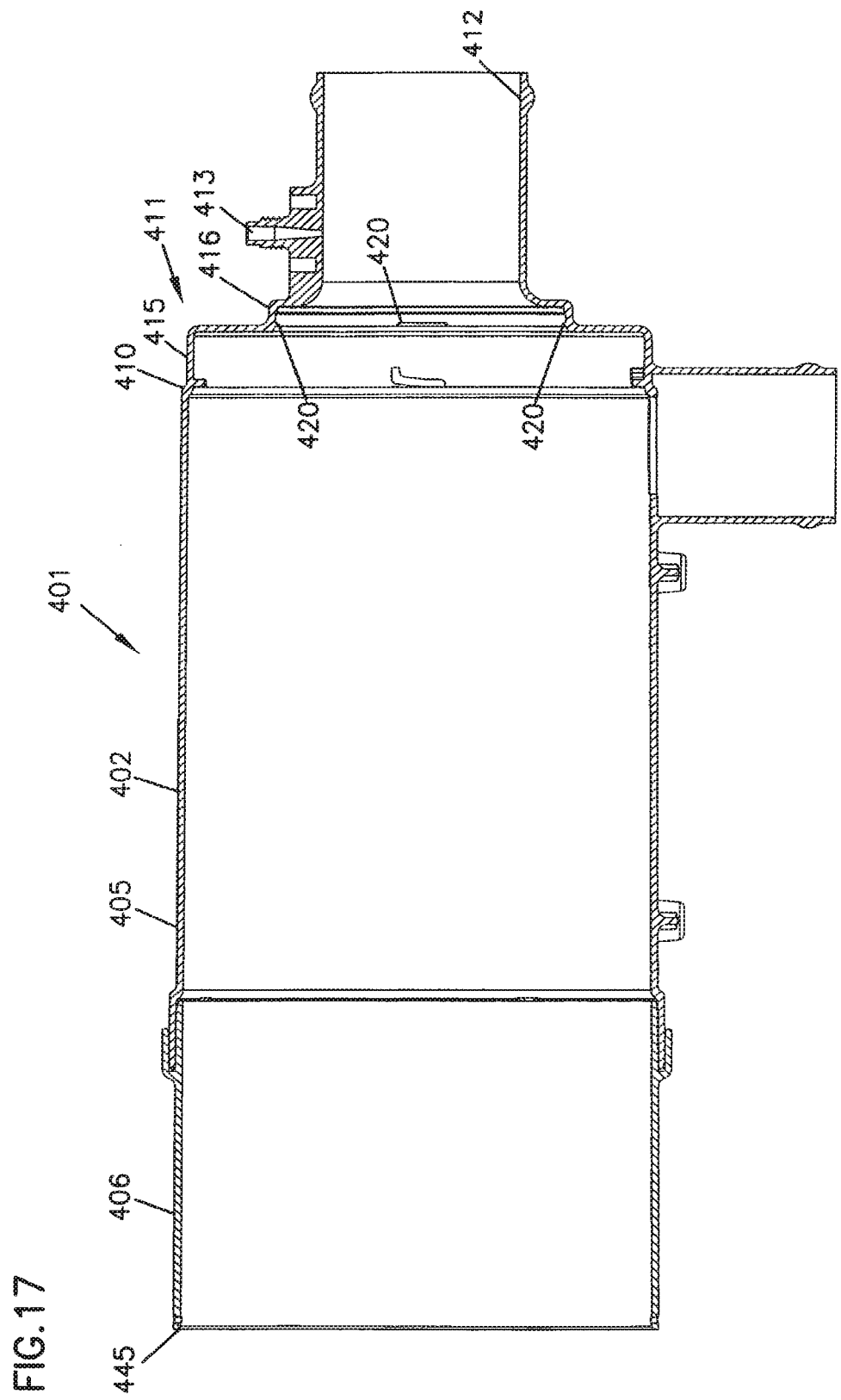
FIG. 17 is a side, cross-sectional view taken generally along line 17-17, FIG. 16.

Attention is now directed to FIG. 17, which is a cross-section taken along line 17-17, FIG. 16. Referring to FIG. 17, the sidewall 402 is a jointed sidewall having segments 405 and 406. The segments 405 and 406 may be generally as described above in connection with segments 261, 262, FIG. 1. It is noted that end 410 of the sidewall 402 is closed by a stepped cover 411 having outlet 412 projecting therefrom. The outlet 412 includes a tap 413 for a pressure sensor or similar arrangement.

More specifically, cover 411 is stepped at first step 415 and second step 416. In use, the safety element is sealed to second step 416.

Unlike the arrangement of FIGS. 1-13, there are no posts positioned in the step 416, for securing a safety element in place. Rather adjacent region 416, immediately between step 416 and 415, are provided several space protrusions 420. For the arrangement shown, there would be four protrusions 420, equally radially spaced around an inner most edge of step 416. The operation of these protrusions 420 will be understood from further description below.

Figure 18:
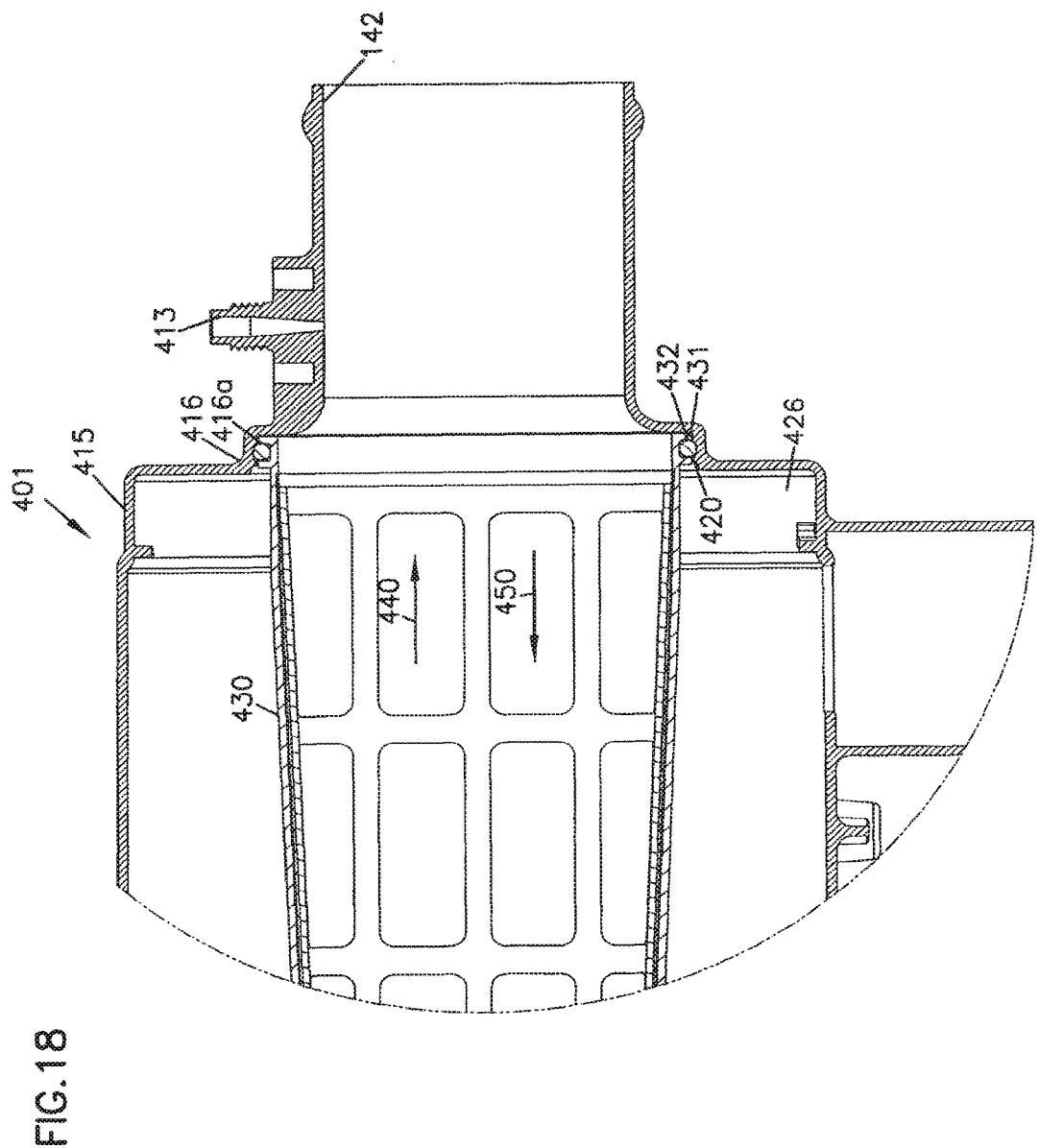
FIG. 18 is an enlarged, fragmentary view of a portion of the arrangement shown in FIG. 17, with a safety element mounted therein.

Attention is now directed to FIG. 18 which depicts a fragmentary view of a portion of the housing 401 depicted in FIG. 17, but with the safety element 430 mounted therein. The safety element 430 maybe generally as characterized above for safety element 31, except for mounting mechanism thereon, described herein. In particular, safety element 430 does not include any slots analogous to slots 206. Rather safety element 430 only includes an o-ring receiver 431 with 432 therein.

During assembly, safety element 430 would be pressed toward step 416 in the general direction of arrow 440, as the safety element is inserted into open end 445, FIG. 17, of the housing 401. The safety element would continued to be pushed in the direction of arrow 440 until the o-ring 432 is sealed against an inner surface 416a of step 416. In order to accomplish this sealing, the o-ring 32 would need to be pushed passed protrusions 420. The protrusions, then, will act to cause an interference fit, prohibiting the likelihood that the safety element 430 would not intentionally become dislodged from its mounting, FIG. 18, by movement of the safety element in the direction of arrow 450. The protrusions 420, then, in combination with the outside diameter of the o-ring 43, causes a lock fit of the safety element 430 in place, without requiring a twist motion.

Of course the mounting approach described with respect to FIG. 16-18 could be applied with a non-jointed housing, if desired.

B. A First Alternate Cover Mount

Figure 19:
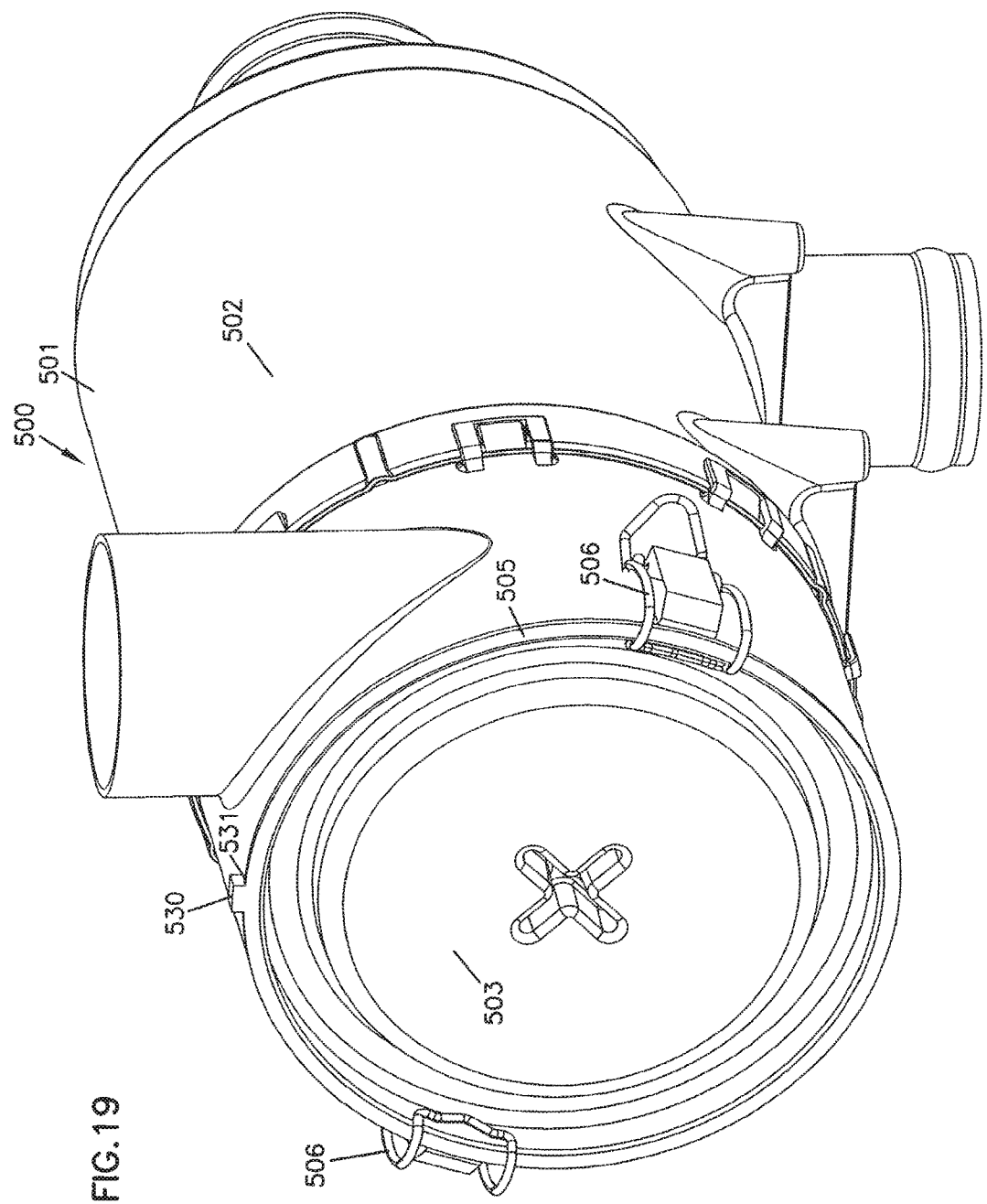
FIG. 19 is a perspective view of a fourth alternate embodiment of an air cleaner according to the present disclosure.

An alternate cover mount is shown in FIG. 19. Referring to FIG. 19 air cleaner assembly 500 is depicted, comprising a housing 501, having an outer sidewall 502 and a cover 503 mounted thereon. Except for the approach of mounting, the cover 503 may be generally similar to cover 20, FIG. 1, including options described.

In particular, cover 503 is mounted onto end 505 of housing sidewall 502, by over center wire latches 506. This is opposed to using a latch mechanism such as the integral latch mechanism described for the embodiment of FIGS. 1-13.

It is noted that the arrangement of FIG. 19 includes a pin or key 530 positioned on the cover, to be received within a slot 531 at end 505 of sidewall 502, to ensure appropriate radial orientation of cover 503 relative to sidewall 502 during mounting. That is, cover 503 for the arrangement shown, can be mounted in only one radial orientation.

C. An Alternate Mounting Arrangement for the Primary Element, FIG. 20

In the embodiment of FIGS. 1-13, the primary element 30, is mounted using a rotation lock mechanism 129, as described. As a result, the primary element 30, is sealed with an axial seal as described.

An alternate approach, which utilizes a radial seal mechanism, is possible, as previously indicated. One such arrangement is shown in FIG. 20.

Figure 20:
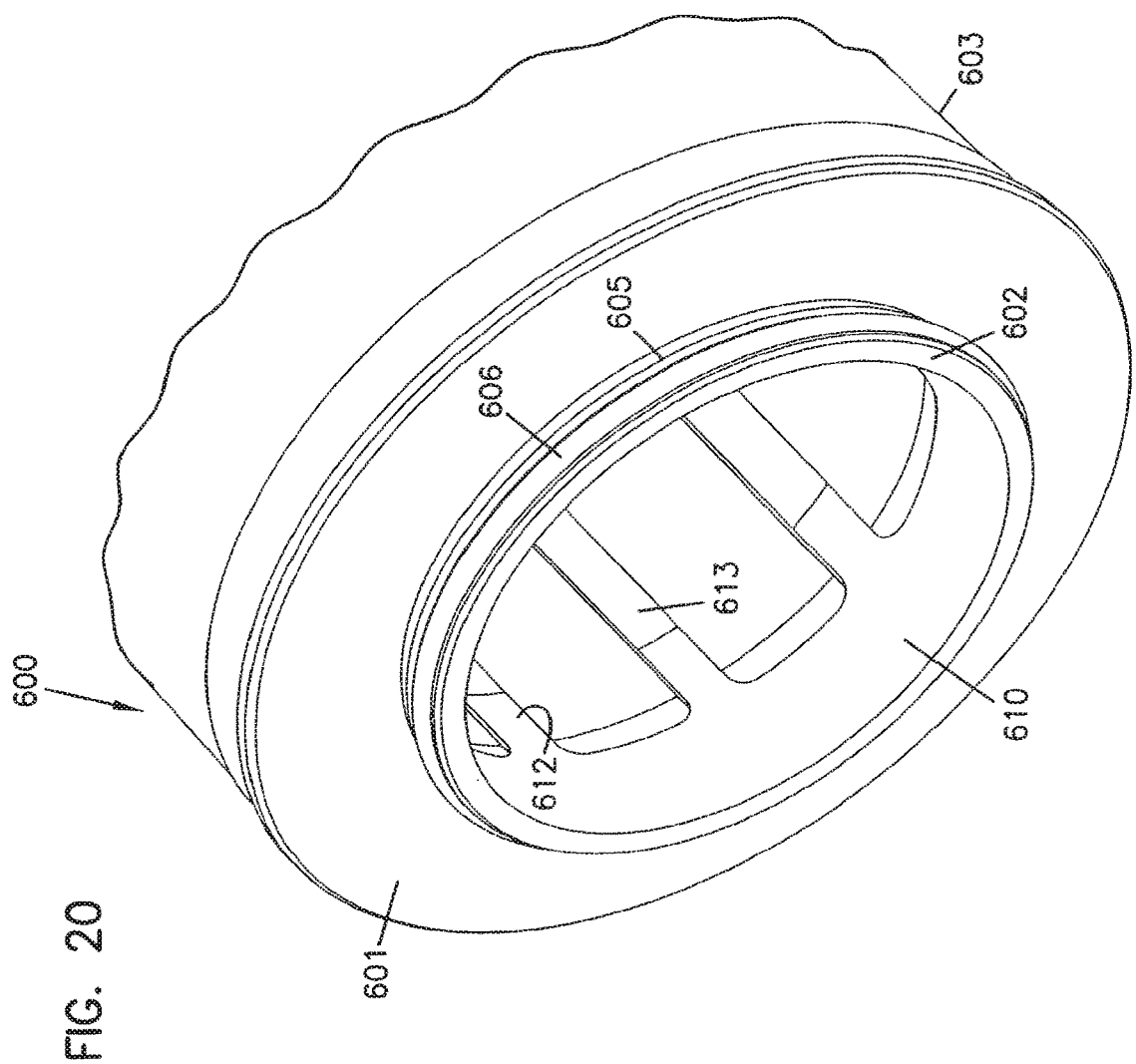
FIG. 20 is a fragmentary, perspective view of a portion of an alternate primary element usable in an air cleaner according to the present disclosure.

Referring to FIG. 20, a fragmentary perspective view of an alternate primary element 600, is shown. In FIG. 20, the portion of the element 600 viewable, is the end cap 601 that would correspond to the end cap that is inserted furthest into the housing, during use. In particular, end cap 601 is the exit end for filtered air.

End cap 601 is provided with a central axial protrusion 602 thereon, that projects axially away from a remainder 603 of the primary element 600. The axial protrusion 602 includes an o-ring mount 605 with an o-ring 606 positioned thereon. With such an arrangement, the primary element 600 could be mounted by insertion past the protrusions 420, FIG. 18, in place of the safety element. That is, primary element 600 could be mounted analogously to safety element 430, FIG. 18. That result would be a radial seal formed by o-ring 606, as opposed to an axial seal arrangement.

During normal mounting, the filter element 600 of FIG. 20, would not be twisted or rotated. Thus it may be preferable to manufacture primary element 600 without outside framework extending completely between the opposite ends. Rather, while shields may be at positions adjacent each end (or at least the outlet end) to facilitate use, it may be desirable to leave cross hatch open framework extending between the ends out, since it would not be needed to translate rotational motion and provide for support. This is a matter of choice, depending upon other features in the construction.

A safety element could be mounted in association with arrangement such as FIG. 20, by providing a structural location in region 610, to allow for the safety element to be mounted. It is noted that for the particular arrangement of FIG. 20, internal (optional) open framework 612 is shown extending axially along inside 613 of the element 600. The open framework 612 could extend from end to end, of the element 600.

D. An Alternate Primary Element with a Precleaner Mounted Directly Thereon

Figure 21:
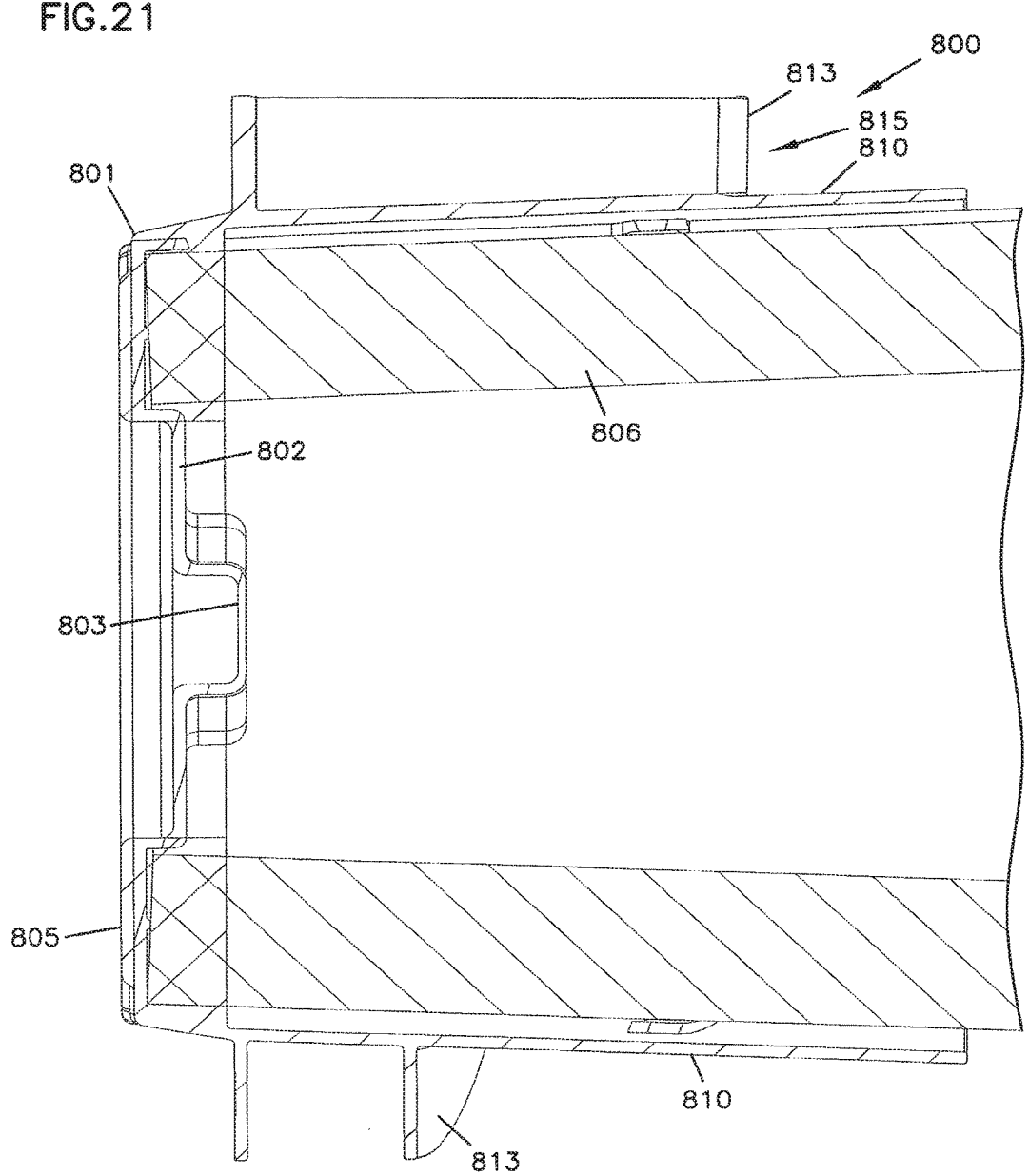
FIG. 21 is a fragmentary, cross-sectional view of an alternate primary filter element according to the present disclosure.

For the embodiment of FIGS. 1-13, the precleaner 35 was mounted directly on the cover 20. As indicated previously, alternate embodiments are shown. In particular, attention is directed to FIG. 21, in which a primary filter element 800 is depicted, in fragmentary, cross-sectional view. In particular, a closed end 801 of the primary filter element 800 is depicted. Closed end 801 is shown having framework 802 extending there across, with the receiver 803, for engagement with the cover. The framework 802 is shown secured in place by end potting 805. This closes the end of media 806. As thus far described, the arrangement is generally analogous to the primary element 30 of FIGS. 1-13. However, for element 801, shield 810 and ramp 813 are shown non-permanently as part of the primary filter element 800, thus are not mounted on the cover. FIG. 21 is presented simply to indicate an alternate arrangement in which a precleaner 815, comprising of shield 810 and ramp 813 are used. In this alternate embodiment, the precleaner 815 is mounted directly onto the primary element 800, as opposed to the cover.

The remainder of the assembly utilized with respect to precleaner 800 may be generally analogous to that described for the embodiment of FIGS. 1-13, or for the alternate embodiments described.

Of course as a still further alternate, the cover 20, precleaner (135, 815) and element (30, 200) could be made permanently connected to one another. Possible modifications to accomplish this will be apparent from the general teachings herein.

E. A Further Alternate Mounting Arrangement for the Cover, FIGS. 22 and 23

Figure 22:
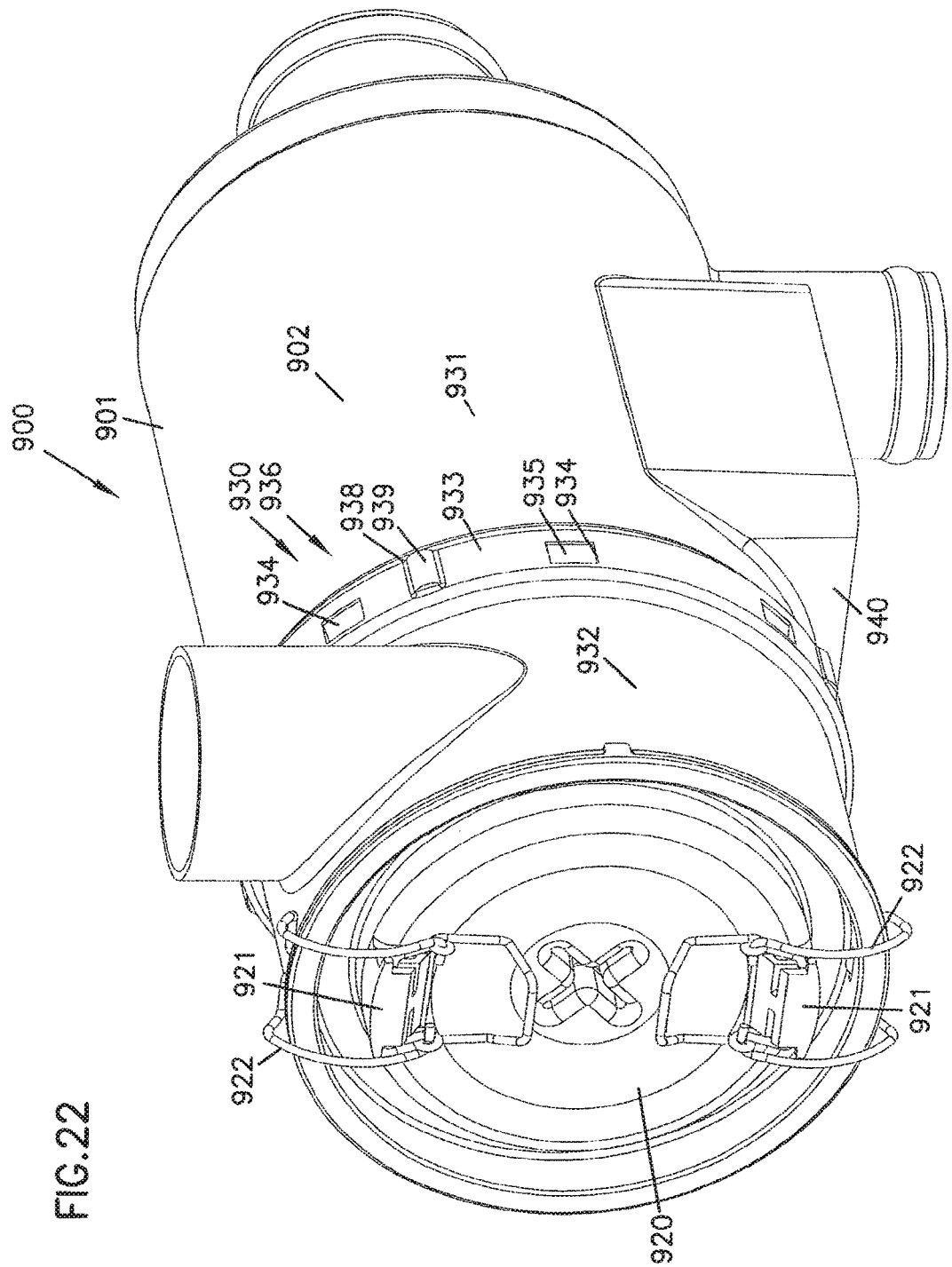
FIG. 22 is a perspective view of a further alternate air cleaner housing according to the present disclosure; and, FIG. 23 is a fragmentary, cross-sectional view of a portion of FIG. 22.

Attention is now directed to FIG. 22 in which an air cleaner assembly 900, comprising a housing 901 with a side wall 902 having a cover 920 mounted thereon, as shown. The air cleaner 900 may be generally described for the embodiments above, except as characterized in this section. In particular, cover 920 includes, molded thereon, wire latch mounts 921. Cover 920 further includes wire latches 922, snap fit mounted to the mounts 921. As a result, when disengaged, the latches 922 remain secured to the cover 920, when the cover 920 is removed from the remainder of the housing 901. When this function is conducted, the wire latches 922 double as handles, to facilitate handling the cover 920.

Figure 23:
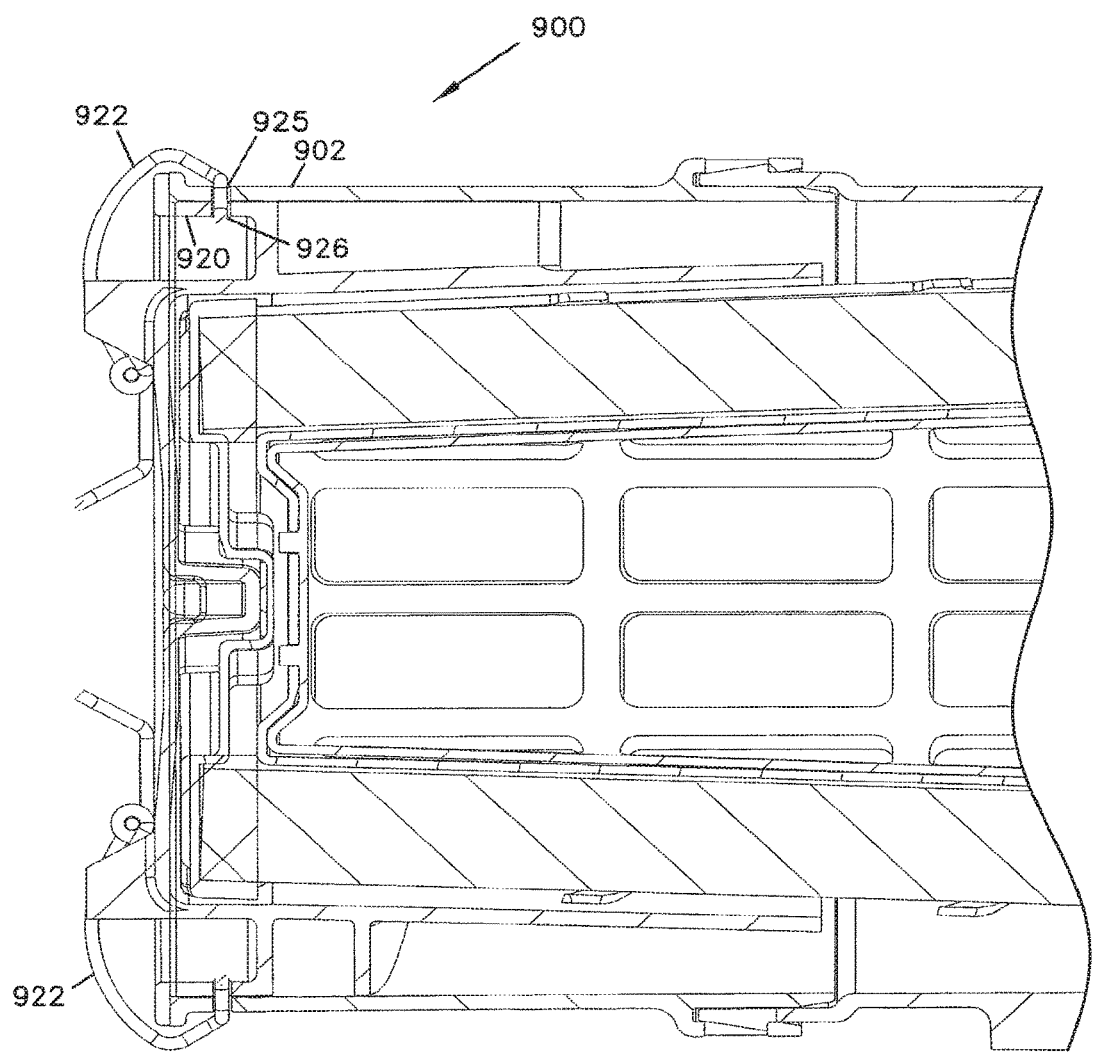

The wire latches 922 shown, are configured to engage over a lip or similar structure of the housing 901, to project through slots 925, 926 in the housing sidewall 902 and cover 920 respectively, FIG. 23, to provide for a secure engagement.

Referring to FIG. 22, it is noted that analogously to the arrangement of FIG. 1, the arrangement of FIG. 22 is a jointed housing 930, having two sections 931 and 932. The connection between the sections 931 and 932 is a modification, from the arrangement of FIG. 1, but uses the same general principles. In particular, section 932 includes a skirt 933 thereon, which overlaps and circumscribes a portion of section 931. The skirt 933 includes apertures 934 therein radially spaced. Each aperture 934 is sized to engage a projection 935 on section 931, for lock engagement. Thus, an interlock mechanism 936 is provided comprising a projection (935) and receiver (934) arrangement.

A radial locater or indexed jointed mechanism arrangement using receiver 938 in skirt 933, which overlaps a pin 939 on segment 931, is also provided, similarly to the arrangement of FIG. 1.

It is also noted that the mounting mechanism 940 for the arrangement 900 of FIG. 22, differs in detail from the analogous arrangement for the embodiment of FIG. 1. However, its overall operation is similar.

XII. The Embodiment of FIGS. 24-27

Figure 24:
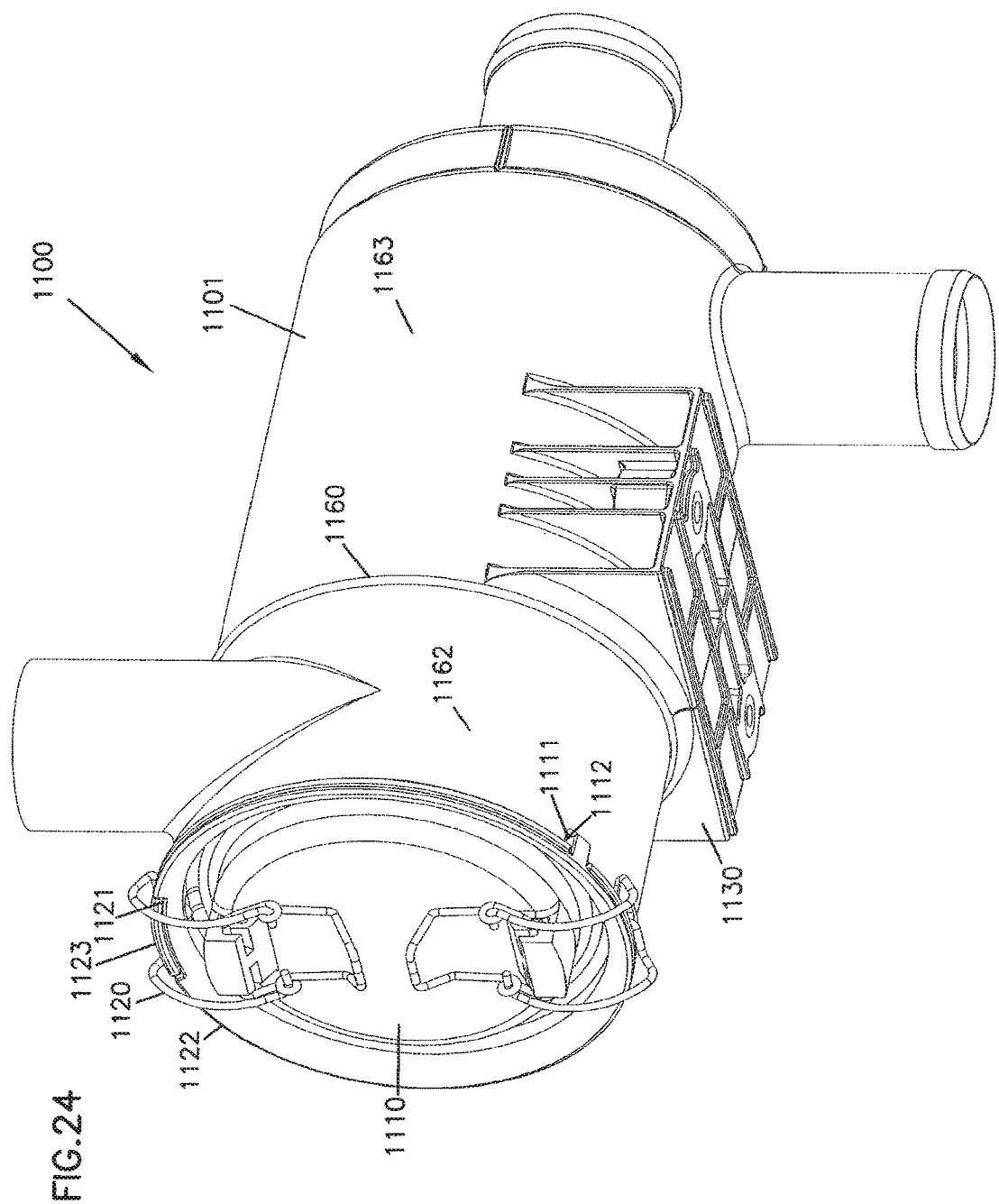
FIG. 24 is a schematic, perspective view of a further alternate air cleaner according to the present disclosure.

An improved embodiment is depicted in FIGS. 24-27. In FIG. 24, air cleaner assembly 1100 is depicted comprising a housing 1101. The housing 1101 is generally analogous to housing 901, FIG. 22, except as characterized in this section. It is noted that the housing 1101 of FIG. 24 is schematic.

Referring to FIG. 24, access or service cover 1110 differs from cover 920, in that no central recess is present. Further, access or service cover 1110 includes a notch 1111 associated with a key or pin 1112, at a different location, than the embodiment of FIG. 22. Also, underneath latch 1120 access or service cover 1110 includes a notch or slot 1121, in outer rim 1122 for receipt of pin, key or projection 1123 on the remainder of the housing 1101. Thus, slot 1121/key 1123, along with slot 1111/key 1112, provide for preferred rotational indexing between the cover 1110 and the remainder of the housing 1101.

Still referring to FIG. 24, mounting arrangement 1130, for securing the housing 1101 to a vehicle or the equipment, is also modified from the embodiment of FIG. 22.

Figure 25:
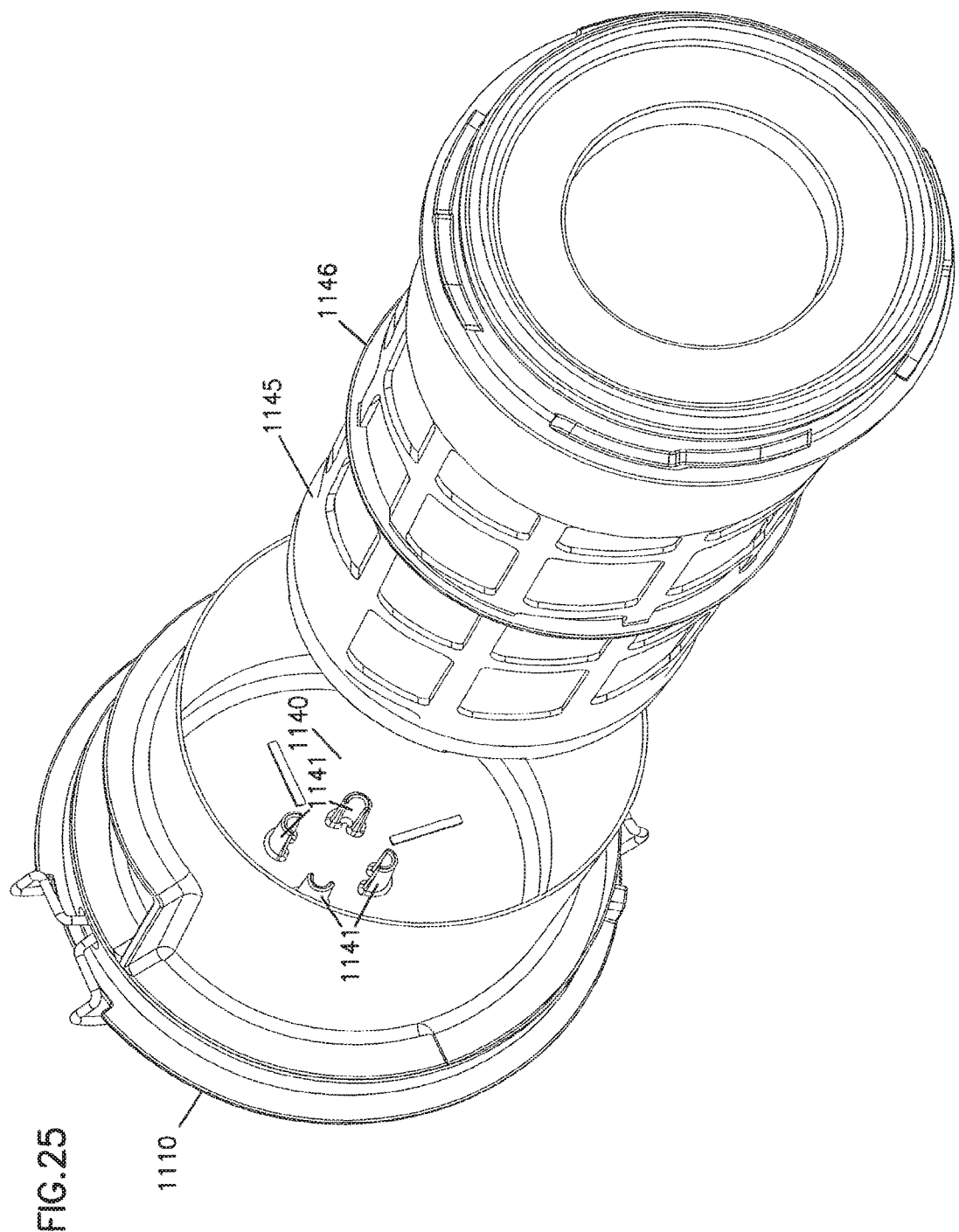
FIG. 25 is an exploded, schematic, perspective view depicting a cover member and a primary air filter element cartridge of the assembly of FIG. 24.

Attention is now directed to FIG. 25. Here the inside surface 1140 of cover 1110 is viewable. It is noted that instead of having an "X" or plus-shaped ("+" shaped) projection, as shown for previous embodiments, the cover 1110 includes, along internal surface 1140, a projection arrangement comprising four posts 1141 arranged as the corners of an "X" or plus-shape, to be received within a non-circular, preferably "X" or plus shaped recess, not shown, in the primary or main filter cartridge 1145. With respect to this feature, cartridge 1145 may have an "X" or plus shaped receiver analogous to the cartridge depicted in FIG. 4. The posts 1141 each have curved outside surfaces, approximately as half of a cylinder, or cone to facilitate engagement. The four posts 1141 allow for four possible rotational positions of the cartridge 1145. Of course fewer posts (1, 2 or 3) could be used to accomplish the same type of effect, if properly positioned.

Figure 26:
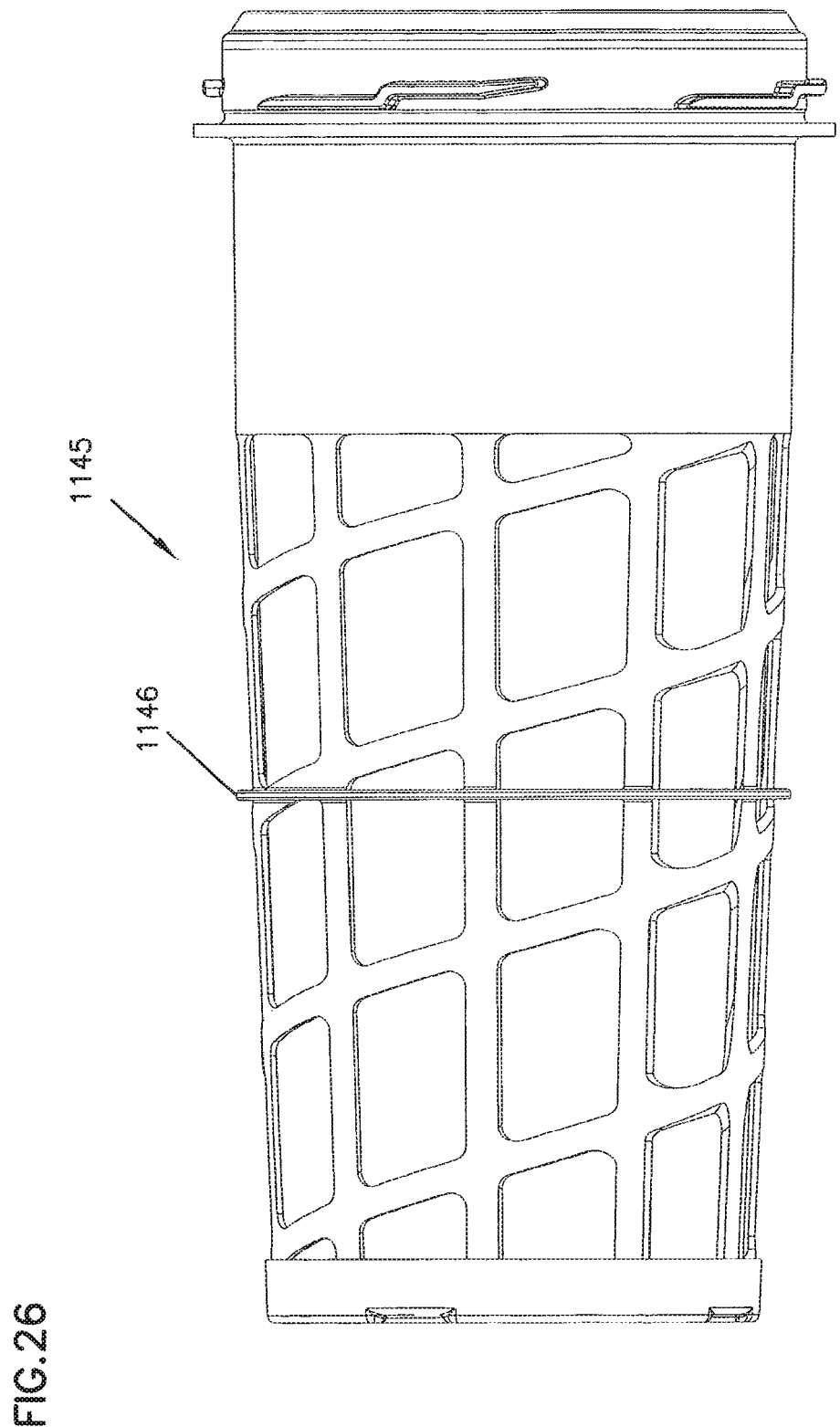
FIG. 26 is a side elevational view of the primary filter element cartridge depicted in FIG. 25.

Still referring to FIG. 25, primary cartridge 1145 also includes central circular rib 1146 thereon. The rib 1146, as seen in FIG. 26, would preferably extend completely around cartridge 1145 at a central location, and in a direction generally orthogonal to a central axis of the cartridge 1145. The rib 1146 provides a projection that can be engaged by equipment, during manufacture. It is not expected that rib 1146 will provide significant function, in the assembled and operating air cleaner. However, it will add some strength to the open frame work around the outside of primary cartridge 1145.

Figure 27:
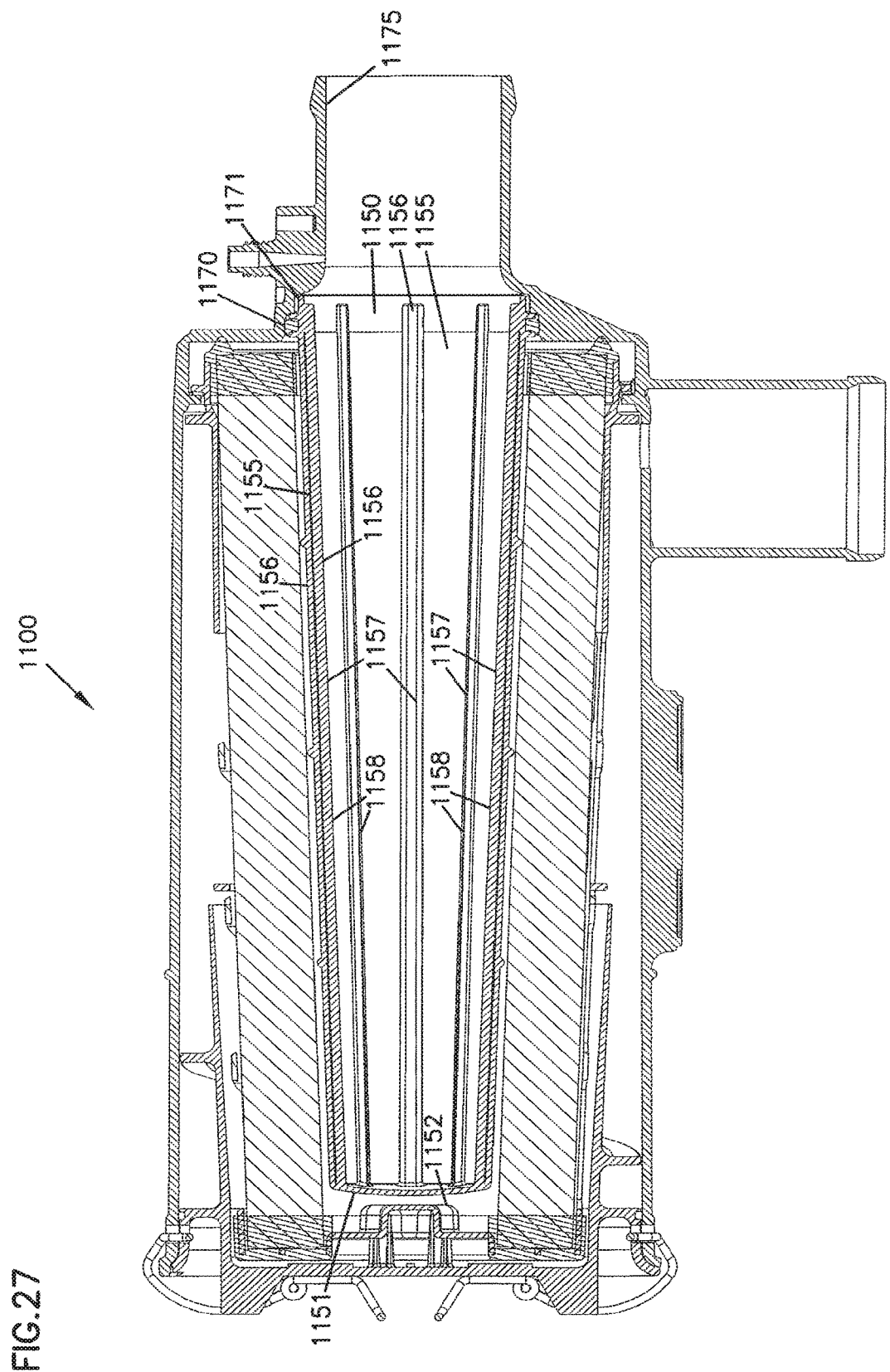
FIG. 27 is a side, cross-sectional view of the assembly depicted in FIG. 24.

In FIG. 27, a cross-sectional view of the air cleaner assembly 1100 is shown. From a review of FIG. 27, it can be seen that a secondary or safety filter 1150 for the assembly 1100 is constructed shorter than the safety filter depicted in FIG. 2 at 31. Thus, at end 1151 filter 1150 does not include a receiver, to engage protection 1152 in the primary filter cartridge 1145.

In FIG. 27, an improved alternative for securing the media in a secondary or safety filter 1150 is also provided. In particular, in safety filter 1150, the media 1155 is secured within the framework 1156, during molding. That is, the media 1155 is positioned in the mold, and the plastic framework 1156 is molded but with the media 1155 in place. Thus, as shown, the spaced axial ribs 1157 of the safety filter 1150 each have central portion where the conical media 1155 passes through them to extend between them over the openings 1158. Of course, if it desired to use the framework of the safety filter 1150 without the media 1155, the same molded configuration can be used, but without the media present.

Referring to FIG. 24, it is noted that the housing 1101 does not include a rotational joint at seam 1160. It has been determined that during manufacture, the mold for housing 1101 can be constructed such that the portion in which region 1162 is molded, can be made rotatable relative to the portion in which region 1163 is molded. Thus, variations in rotational orientation between the air inlet and the dust ejector outlet can be accommodated during the molding process, by using a method involving a mold which has two parts rotatably moveably relative to one another. Seam 1160 is positioned with a joint between the two mold segments would be located.

Referring to the cross section of FIG. 27, it is noted that the safety element 1150 includes o-ring seal 1170; and, an extension 1171 positioned axially toward outlet 1175 for a remainder of the safety element 1150. Extension 1171 can facilitate mounting and engagement.

In other manners, the assembly 1100 may be constructed in accord with the descriptions and variations presented herein, in association with other embodiments. Also, the improvements described for assembly 1100 can be applied in the other embodiments.

XIII. The Embodiment of FIGS. 28-33

A further improved embodiment is depicted in FIGS. 28-33. The air cleaner assembly 1100 depicted in these Figs., and the subcomponents thereof, may be generally analogous to the arrangements depicted in FIGS. 24-27 and in other previous Figs., discussed above. Focus in this section will be with respect to certain specific preferred features. It will be understood, that, in general, components similarly positioned and depicted in the figures provide for analogous operation to those of previously described figures.

Figure 28:
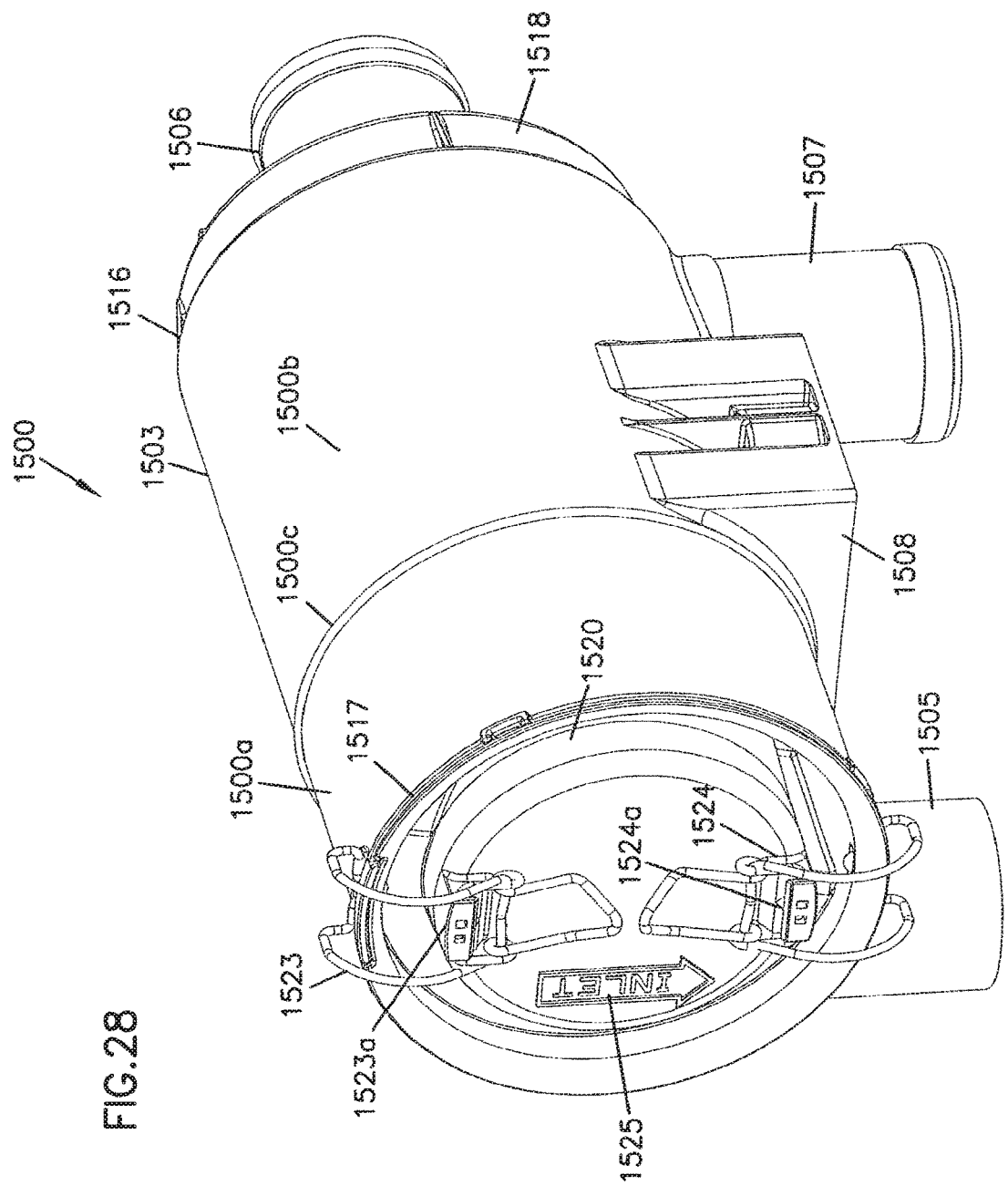
FIG. 28 is an inlet end perspective view of further embodiment of an air cleaner according to the present disclosure.

In FIG. 28 an assembly 1500 is depicted, including a housing 1503 having an air inlet 1505, an air outlet 1506, and dust ejector drop tube 1507. The assembly 1500 also includes optional mounting structure, legs or supports 1508 thereon, to facilitate mounting. As with other embodiments, the assembly could alternatively be mounted by a separate mounting band or bracket.

Referring to FIG. 28, the housing 1503 has first and second opposite ends 1516 and 1517. End 1516 is closed by a cover portion 1518 having outlet tube 1506, in this instance an axial outlet tube, projecting therefrom. Referring to FIG. 28, for the embodiment shown cover 1518 is integral with (i.e., is not separable from), end 1516.

End 1517, the other end, is generally an open, service, end closed by openable cover 1520. The cover 1520 is removable, for service access to an interior of housing 1503.

The cover 1520 is secured in place by latches 1523 and 1524, mounted on mounts 1523a and 1524a, respectively. The cover 1520 is rotationally indexed, by a rotational index or indexing arrangement, so that it can only be secured in place at one orientation. For the cover 1520, indicia 1525 is provided, to indicate a convenient orientation of the cover 1520 during servicing. In particular, the indicia 1525 chosen, is an arrow that points in the direction of the inlet 1505.

For the particular assembly 1500 depicted, portion 1500a of the housing is secured to portion 1500b, at seam 1500c. Portion 1500a is non-rotatable relative to portion 1500b. However the mold from which the two portions are formed, can be provided with a rotatable joint at a portion corresponding to 1500c, so that the two pieces 1500a and 1500b can be molded as a single unit, with any preferred rotational orientation of section 1500a relative to section 1500b, that is desired. Rotation is generally selected so that the inlet tube 1505 has an orientation preferred for particular equipment which the air cleaner 1500 is to be used. For the particular example shown in FIG. 28, the inlet tube 1505 projects in a direction parallel to the arrow of indicia 1525, and in a general direction parallel to the direction of dust drop tube 1507, although alternatives are possible.

Figure 29:
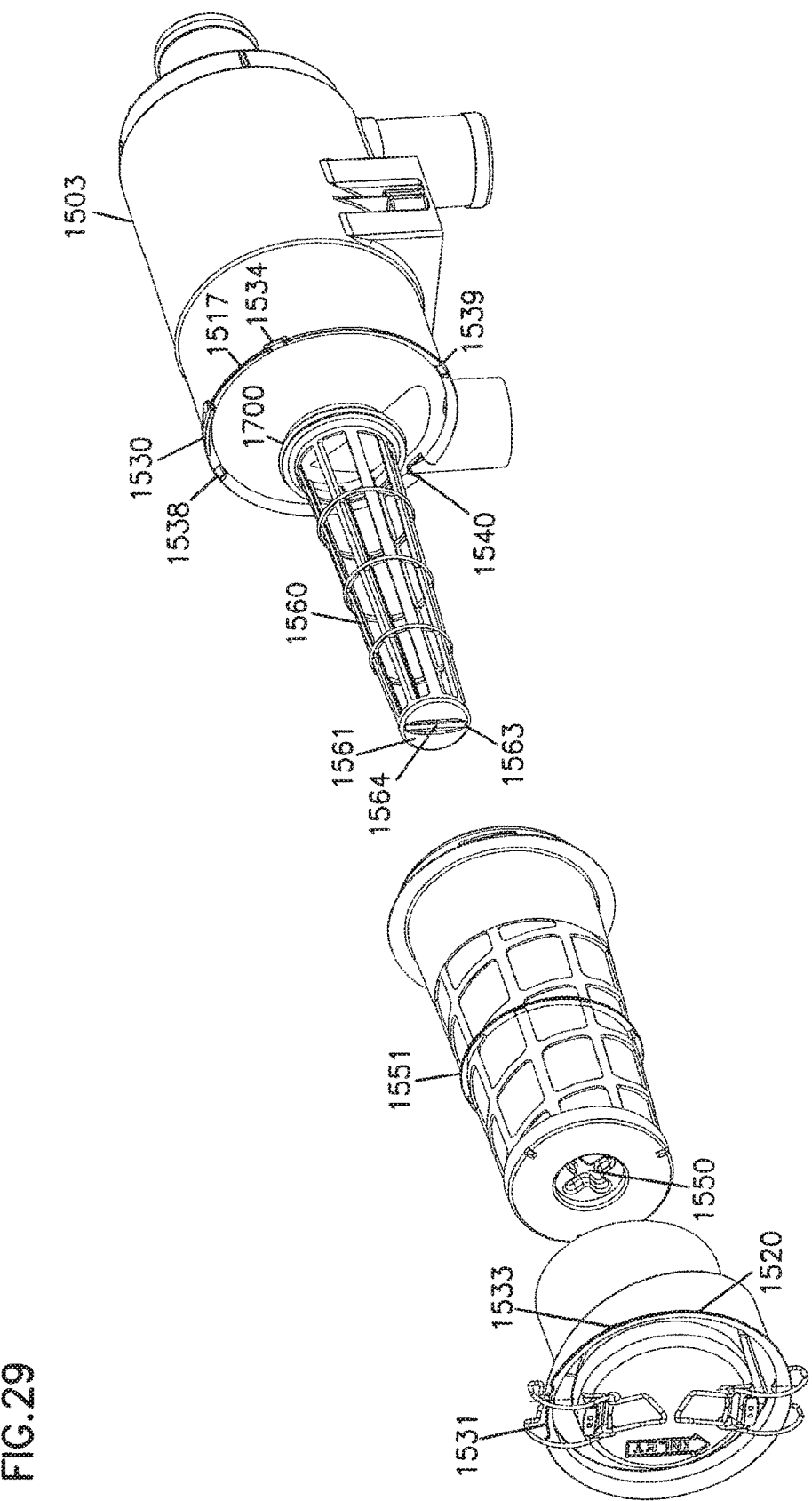
FIG. 29 is an exploded perspective view of the arrangement depicted in FIG. 28.

Rotational indexing of the cover 1520 on the housing 1528, can be provided by a variety of structures. Referring, for example, to FIG. 29, at open end 1517 housing 1503 is provided with outer key or projection 1530 which, during assembly, is received within receiver or slot 1531 on cover 1520. Also, on cover 1520 a key or projection 1533 is provided, which is received within receiver or slot 1534 on housing 1503. Further the cover 1520 includes thereon keys or projections 1536 and 1537, FIG. 30, received within slots or receivers 1538 and 1539, respectively, FIG. 29, during assembly. Finally receiver or slot 1540 is shown, FIG. 29, to receive a similar key or projection to projections 1533, 1537, and 1536, appropriately rotationally positioned on cover 1520, FIG. 29, but not viewable.

Figure 30:
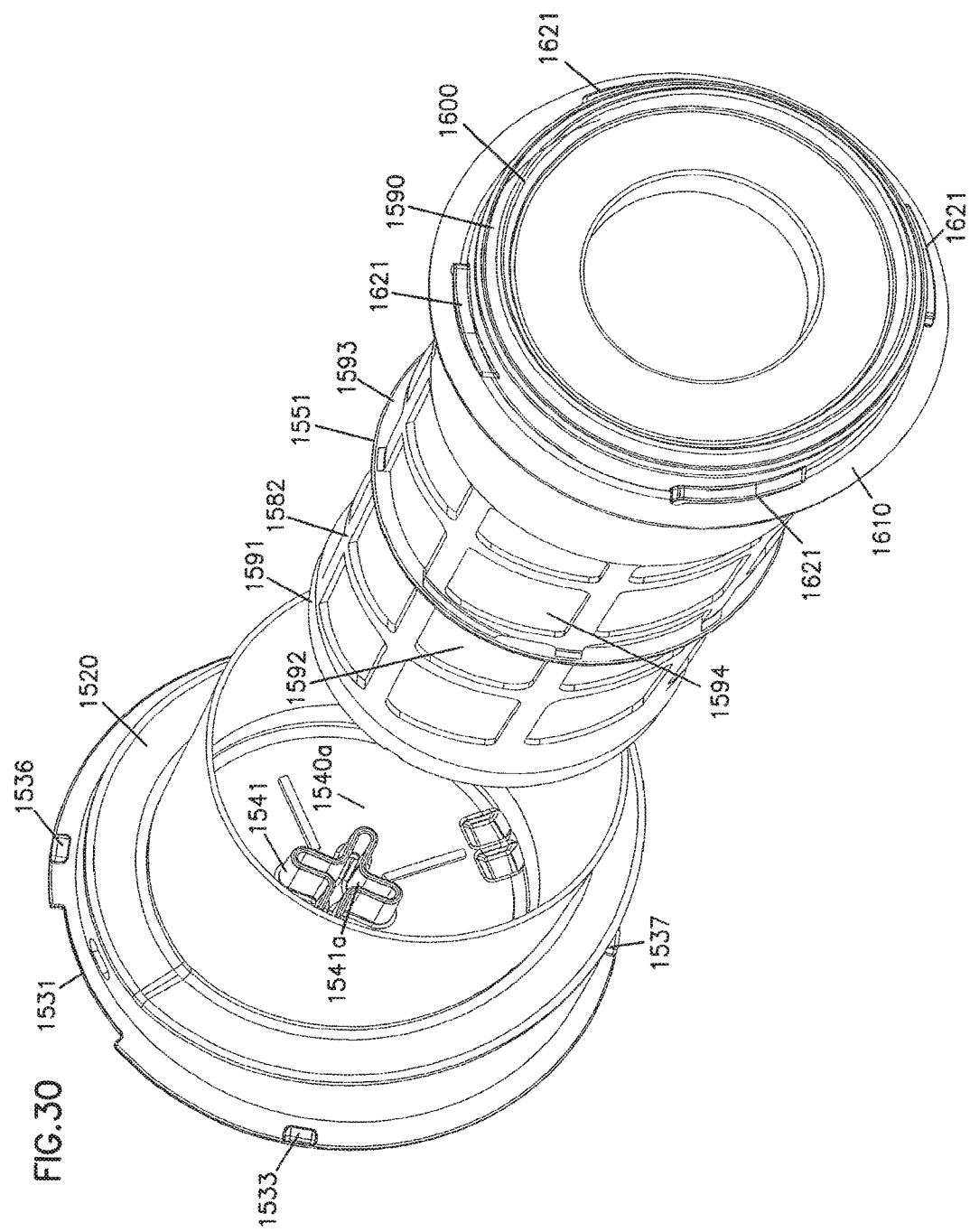
FIG. 30 is a perspective view of two of the components depicted in FIG. 29, from a view point toward an inside surface of an inlet end cover.

Attention is directed to FIG. 30, which shows an inside surface 1540 of cover 1520. Projecting centrally, internally, cover 1520 includes a plus (or "+") shaped projection 1541, which, in use, is received within a plus (or "+") shaped receiver, 1550 on a primary filter element 1551, in use.

Referring to FIG. 30, the plus (or "+") shaped projection 1541 depicted, has a generally hollow interior 1541a and is open in direction toward an interior of air cleaner 1500.

Of course engagement between the plus (or "+") shaped projection 1541 and the plus (or "+") shaped receiver 1550, prevents rotation of primary element 1551, after assembly and in operation. The plus (or "+") shape allows for four possible rotational orientations between the cover 1520 and the primary element 1551, although alternatives are possible.

As indicated previously for other embodiments described, preferably a projection analogous to projection 1541 is provided on an inside surface 1540 of the cover 1520, to engage an appropriately shaped receiver on an end of the primary filter element 1551. The particular "+" shape chosen, is an example. Preferably the shape chosen will be one that does not allow rotation of the element 1551 relative to the cover 1520, once engagement occurs. Thus, preferably the projection is not round, and the receiver is not round.

Attention is directed to FIG. 29. For the particular embodiment shown, positioned to be received projecting inside of primary filter element 1551, is support structure 1560. The support structure may be a component of a secondary filter element, or it may simply comprise framework to support an interior of media contained within primary filter element 1551. Thus, support structure 1560 may be analogous to structure of safety element 1150, described above in connection with FIGS. 24-27.

A difference between support structure 1560 and the previously depicted support structure, is provided at closed end 1561, FIG. 29. In particular, at closed end 1561, central recess 1563 is depicted, in extension across end 1561.

In general, it is anticipated that structure 1560 will be injection molded. A convenient location for introduction of plastic into the injection mold, is in center 1564 of end piece 1561. Such a molding operation will leave a small projection or burr of plastic at center 1564. Shaping the mold to form recess 1563, ensures that the burr or projection of plastic at center 1564 is contained within the recess 1563. This means that as an operator's hand is pressed against end 1561, burr 1564 is recessed, and provides less discomfort to the operator during installation.

Figure 32:
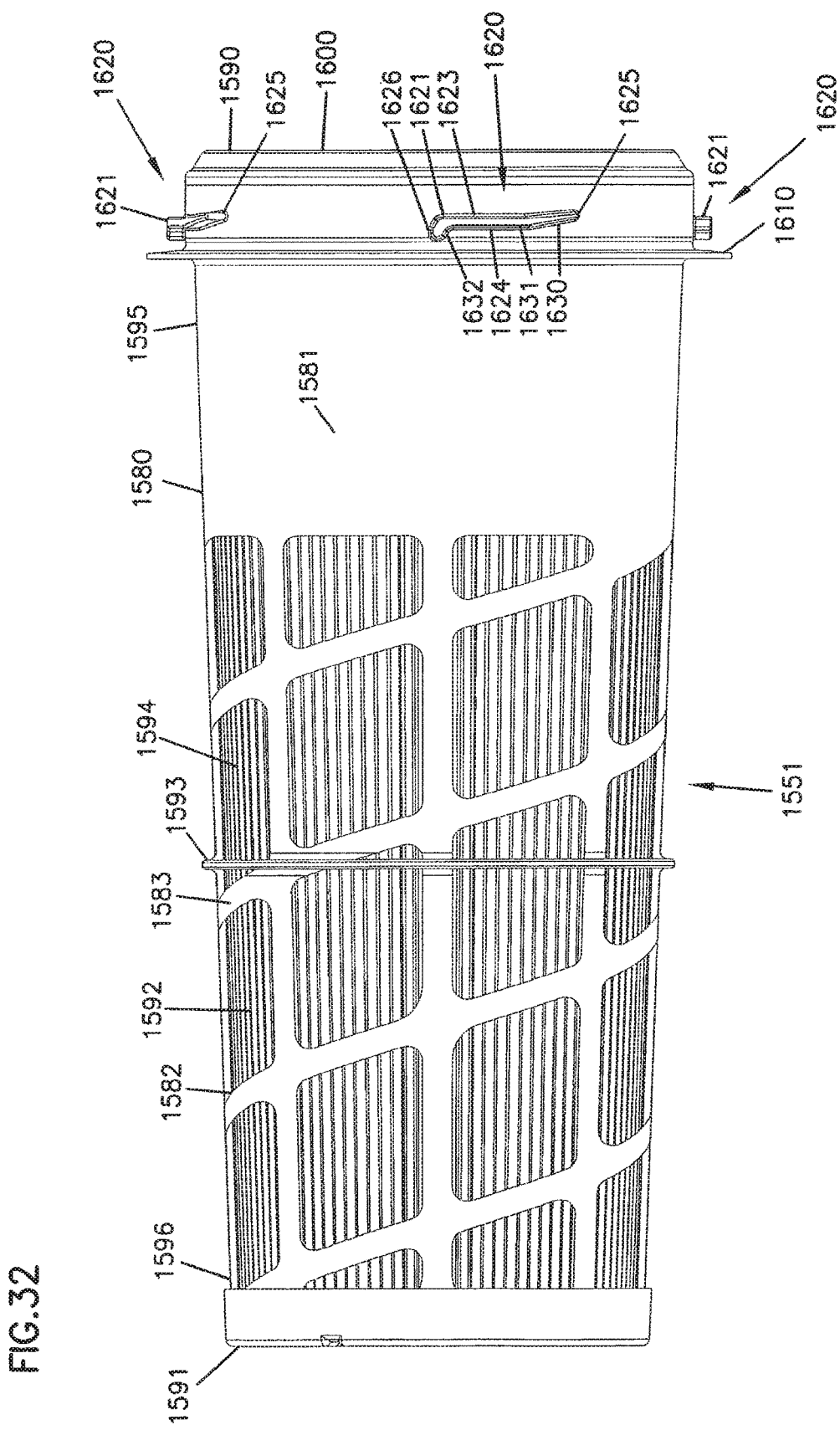
FIG. 32 is a side elevational view of primary filter element component usable in the assembly of FIGS. 28-31.

Attention is now directed to FIG. 32, in which the serviceable primary filter element of 1551 is depicted in side elevation. In general, it has componentry similar to the embodiment described above in connection with FIGS. 24-27. That is, it includes an outer support structure 1580, preferably having an imperforate shield region 1581 and a porous, perforated or open region 1582, around which framework 1583 is provided. The element includes open end 1590, closed end 1591, and media 1592 extending therebetween. Optional central circular projection 1593 is to facilitate machine handling, during certain manufacturing steps.

The media 1592 may comprise a variety of types of media. For the example shown the media 1592 is pleated media 1594.

The particular primary filter element 1551 depicted, has a conical shaped portion, thus at region 1595, the media 1592 is provided with a slightly larger outside diameter, than at end region 1596, analogously to previously described embodiments. The conical shape may be as previously described, for other embodiments.

At end 1590, a compressible axial seal gasket ring 1600 is depicted. The ring 1600 may be similar to ring or rib 70, FIG. 5, preferably comprising a compressible polyurethane foam and preferably having a hardness of no greater than 30 Shore A.

Primary filter element 1551 also includes optional dust shield 1610 thereon, as a circular outwardly projecting ring spaced from end 1590. This is analogous to structure shown in the embodiment of FIGS. 24-27.

Mounting structure 1620 is positioned on framework 1580 at a location between shield 1610 and end 1600.

The mounting structure 1620 comprises spaced projections 1621, configured to operate analogously to spaced projections in the previous embodiments. Projections 1621, however, have a somewhat different shape, as viewable in FIG. 32, from the arrangement of FIG. 26.

In particular, projection 1621 includes opposite surfaces 1623, 1624 extending between ends 1625 and 1626.

Surface 624 is configured to engage a projection or holder structure in a housing, during a twist lock operation to secure element 1551 in place, analogously to the operation described above for other embodiments.

Surface 1624, then, is preferably provided with a cam surface 1630, which recesses (in extension from tip 1625) toward dust ring 1610 or end 1591, from end 1590. The cam surface 1630 ends at surface portion 1631 which itself terminates at stop 1632. Thus, during operation, element 1551 will be pushed into the housing, until tip 1625 passes a holder, lug or projection analogous to projections 140, FIG. 9. Rotation of element 1551 will bring tip 1625 around the projection, for engagement between cam surface 1630 and the projection. Continued rotation will bring the projection along surface 1631 until stop 1632 is encountered by the holder, lug or projection in the housing.

Unlike the arrangement of FIG. 26, projections 1620 do not have tails extending radially around surface 1640, toward a next adjacent projection. This leaves a larger (relative) gap between end 1626 and a tip 1625 of a next adjacent projection 1620. Preferably at an angular spacing of at least 20°, more preferably at least 35°-70°, is provided, for convenient assembly.

Figure 33:
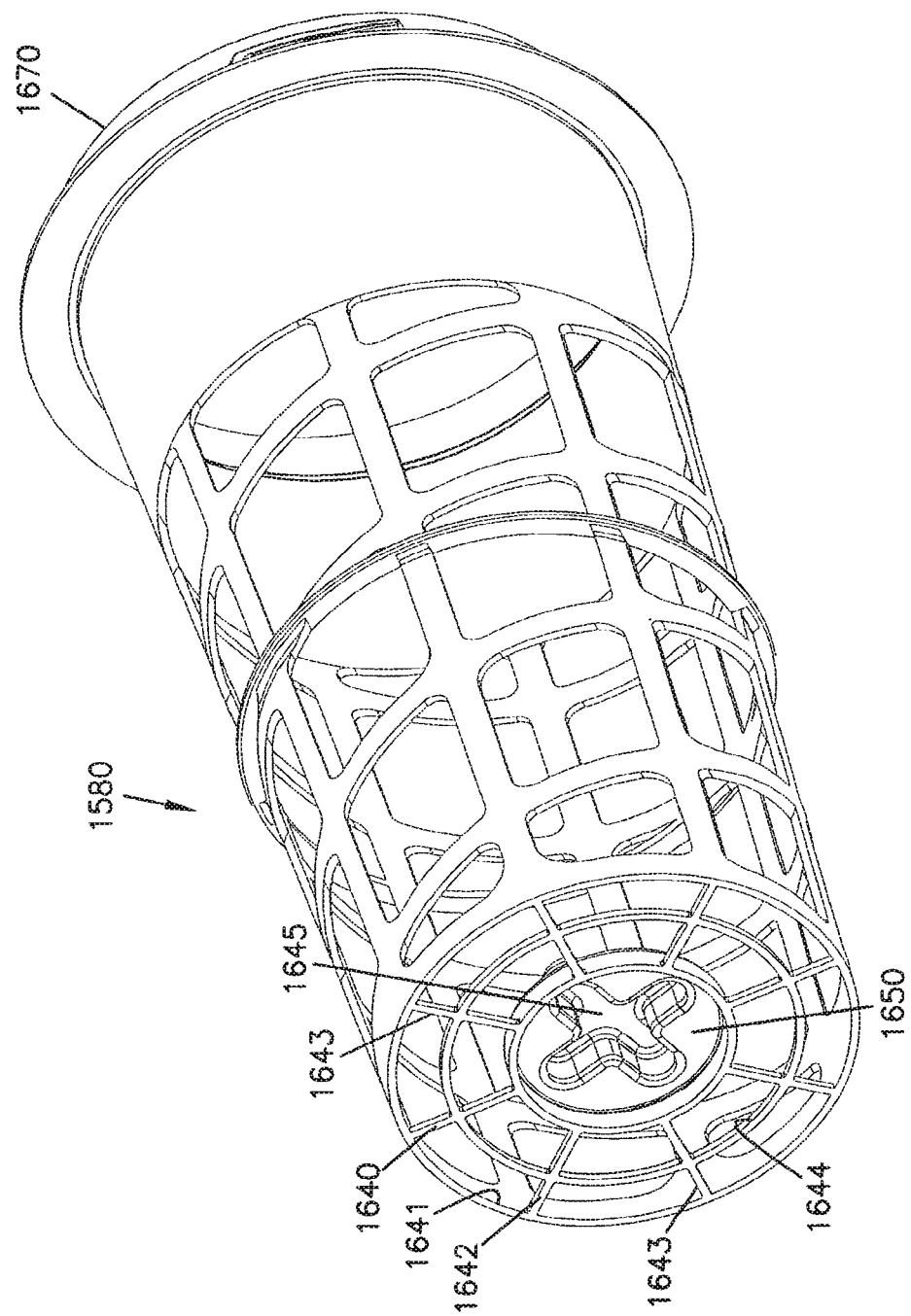
FIG. 33 is a perspective view of an outer framework component useable in the primary filter element depicted in FIG. 32.

In FIG. 33, framework 1583, for forming primary filter element 1551 is depicted. The framework 1583 of FIG. 33 could be analogous to the framework depicted in FIG. 26.

Still referring to FIG. 32, in general mounting structure 1620, then, comprises a portion of a non-continuously treaded rotational interlocking arrangement, when used in association with appropriate projection or holder arrangement on a housing. Further, the mounting structure 1620 comprises a segmented ring of projections or segments 1621, each of which is radially spaced from a next adjacent one; and, each of which is preferably integral with (i.e., molded as part of) framework 1580. The number of projections, generally indicate the number of rotational orientations possible for the primary element 1551, in a housing 1503, FIG. 28.

In FIG. 33, outer framework or outer support structure 1580 usable to form primary filter element analogous to element 1551, FIG. 32, is depicted. The framework 1580 may be used, in assembly, analogously to the discussed above for FIG. 8.

With respect to FIG. 33, attention is directed to end 1640, to be covered by an end cap, in use. End 1640 has an open (or perforate) portion 1641 generated by framework 1642, in particular radial pieces 1643 and central piece 1644.

In a central region end 1640 includes closed (imperforate) portion 1650 having central receiver or recess 1645 therein. The particular central recess 1645 depicted, has a plus (or "+") shape, for receiving a projection on the cover in use.

In use of framework 1580, to manufacture an element, pleated media would be positioned inside the framework 1580, with an end engaging framework 1642. Potted end caps would be formed at the opposite ends 1640, 1670, with the end cap or potting at end 1670 being open, and defining the axial seal 1600, FIG. 32. The media will be supported along an inside adjacent framework 1642, by surrounding central portion 1650, which projects into the open center of the framework 1580.

At end 1640, the material will be potted into end cap material (or potting), to cover the opened area 1641, without covering the central portion 1650 and recess 1645. The result would be structure analogous to that shown and discussed above, for example with respect to FIG. 4.

Figure 31:
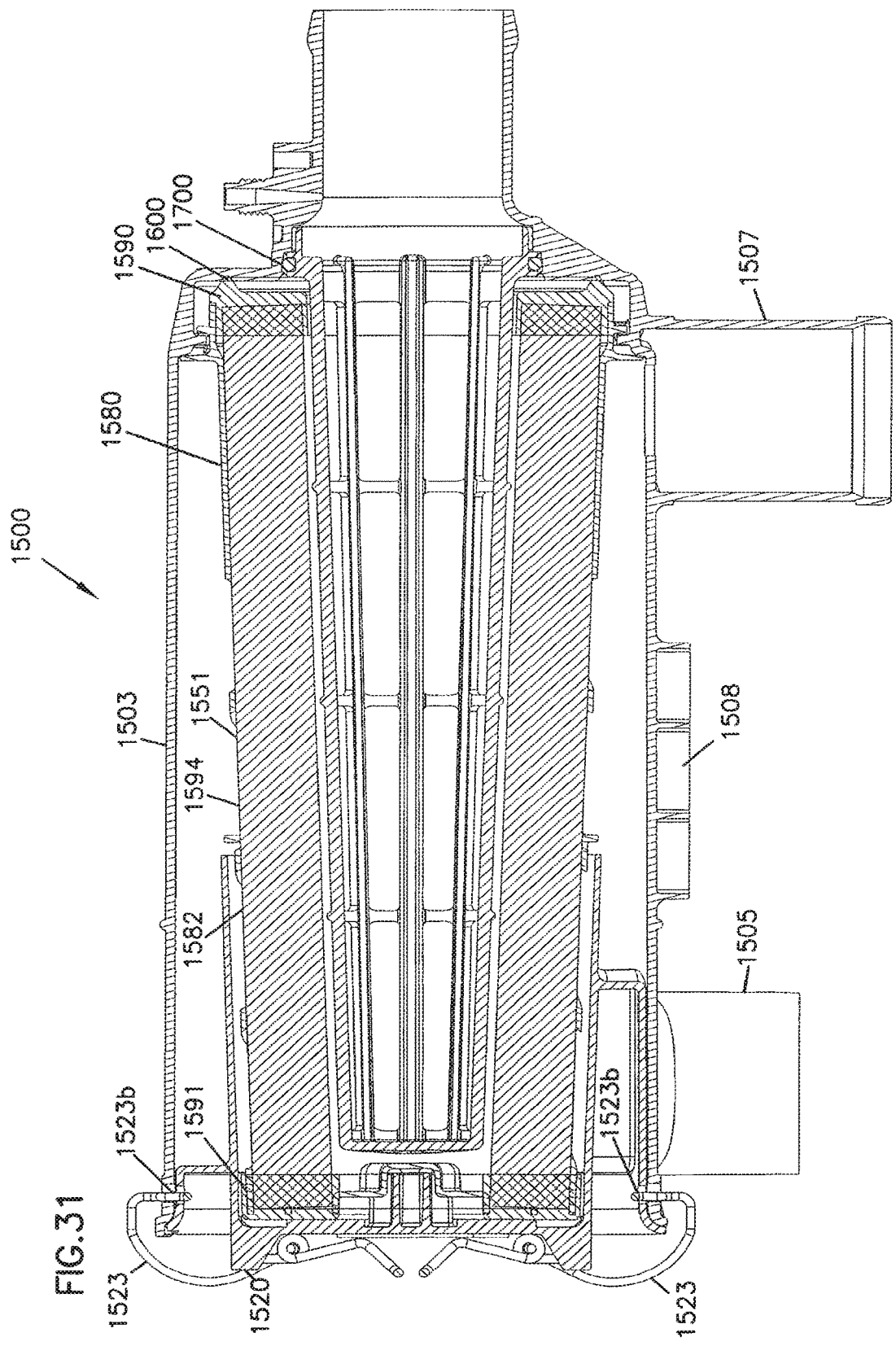
FIG. 31 is a side, cross-sectional view of the assembly depicted in FIG. 28.

For convenience, in FIG. 31 a cross-sectional view of assembly 1500, FIG. 28, is depicted. This view is analogous to the view of FIG. 3. In it, primary element 1551, support 1560, housing 1503 and cover 1520 are viewable.

Above it was mentioned that the inner support 1560, could comprise a support of a secondary filter, for example as described above for other embodiments.

Attention is now directed to FIG. 31. In FIG. 31, it can be seen that when latched, the latches 1523 each include a projection 1523b, which extends through both a portion of the housing 1503 and a portion of the cover 1520, during latching. This is analogous to the arrangement shown above, in FIG. 27.

Referring to FIG. 29, it is noted that inner support 1540 includes o-ring 1700 thereon, for sealing, radially, in the housing, during use. This sealing is depicted in FIG. 32.

XIV. Materials and Construction

Principles according to the present disclosure can be implemented in a variety of sizes, shapes and configurations of equipment, and using a variety of materials. However, the principles were developed for application in preferred arrangements and configurations, and with certain preferred materials.

For example, in general the configurations shown will be particularly advantageous for use as an air cleaner for a vehicle having an air flow demand, at rated operation, the order of about 1,500 cubic feet per minute (cfm) or less, typically about 300 cfm or less; i.e., on the order of 43 cubic meters or less, typically about 9 cubic meters or less. These types of air cleaners are generally found on equipment that uses small gas or small diesel engines.

The typical air cleaners used in such applications, would have an overall outside diameter of the housing, on the order of at least 130 mm., typically 130-170 mm.; and a housing sidewall length of at least 300 mm. typically from 300 mm. to 600 mm. (i.e., distance between ends 16 and 17), FIG. 1. The outer support 90 of primary filter cartridge 30, would have a largest outside diameter D1, of at least 120 mm., and smallest outside diameter D2 on the order of about 110 mm. or less, with a conical angle or taper (i.e., angle A, FIG. 6, where dotted line 950 is parallel to central axis 12, FIG. 3) between the ends, extending at an angle on an order of at least 1° typically within the range of 2° to 4°, and with an overall length of at least 100 mm. and typically 110-150 mm. The aperture 102, FIG. 8, would have a diameter of at least 115 mm., typically 118 mm. to 125 mm.

In general, dimension materials for the rib 70 and the interlock arrangement 129, should be selected to provide for a compression of rib 70 of at least 0.5 mm., typically 1-2 mm., in use. The desirable material for rib 70, and indeed end cap 92, is a foamed polyurethane preferably to be selected to have a hardness, Shore A, of no greater than about 30, and preferably no greater than about 22, most preferably below 20.

Preferably with such arrangements, the polyurethane formulation chosen provides for a high foam, very soft, molded end cap.

Preferably the formula chosen will be such as to provide end caps (parts molded from the polyurethane) having an as molded density of no greater than 28 lbs./cubic foot (about 450 kilograms/cubic meter), more preferably no more than 22 lbs./cubic foot (355 kilograms/cubic meter), typically no greater than 18 lbs/cubic foot (290 kilograms/cubic meter) and preferably within the range of 13 to 17 lbs/cubic foot (208-275 kilograms/cubic meter).

Herein the term "as molded density" is meant to refer to its normal definition of weight divided by volume. A water displacement test or similar test can be utilized to determine volume of a sample of the molded foam. It is not necessary when applying the volume test, to pursue water absorption into the pores of the porous material, and to displace the air the pores represent. Thus, the water volume displacement test used, to determine sample volume, would be an immediate displacement, without waiting for a long period to displace air within the material pores. Alternately stated, only the volume represented by the outer perimeter of the sample need be used for the as molded density calculation.

In general, compression load deflection is a physical characteristic that indicates firmness, i.e. resistance to compression. In general, it is measured in terms of the amount of pressure required to deflect a given sample of 25% of its thickness. Compression load deflection tests can be conducted in accord with ASTM 3574, incorporated herein by reference. In general, compression load deflection may be evaluated in connection with aged samples. A typical technique is to measure the compression load deflection on samples that have been fully cured for 72 hours at 75° F. or forced cured at 190° F. for 5 hours.

Preferred materials will be ones which when molded, show a compression load deflection, in accord with ASTM 3574, on a sample measured after heat aging at 158° F. for seven days, on average, of 14 psi or less, typically within the range of 6-14 psi, and preferably within the range of 7-10 psi.

Compression set is an evaluation of the extent to which a sample of the material (that is subjected to compression of the defined type and under defined conditions), returns to its previous thickness or height when the compression forces are removed. Conditions for evaluating compression set on urethane materials are also provided in ASTM 3574.

Typical desirable materials will be ones which, upon cure, provide a material that has a compression set of no more than about 18%, and typically about 8-13%, when measured on a sample compressed to 50% of its height and held at that compression at a temperature of 180° F. for 22 hours.

In general, the compression load deflection and compression set characteristics can be measured on sample plugs prepared from the same resin as used to form the end cap, or on sample cut from the end cap. Typically, industrial processing methods will involve regularly making test sample plugs made from the resin material, rather than direct testing on portions cut from molded end caps.

Urethane resin systems useable to provide materials having physical properties within the as molded density, compression set and compression load deflection definition as provided above, can be readily obtained from a variety of polyurethane resin formulators, including such suppliers as BASF Corp., Wyandotte Mich., 48192.

One example usable material includes the following polyurethane, processed to an end product having an "as molded" density of 14-22 pounds per cubic foot (224-353 kilograms/cubic meter). The polyurethane comprises a material made with I36070R resin and I3050U isocyanate, which are sold exclusively to the assignee Donaldson by BASF Corporation, Wyandotte, Mich. 48192.

The materials would typically be mixed in a mix ratio of 100 parts I36070R resin to 45.5 parts I3050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70-95° F. The mold temperatures should be 115-135° F.

The resin material I36070R has the following description:
(a) Average Molecular Weight
 1) Base polyether polyol=500-15,000
 2) Diols=0-10,000
 3) Triols=500-15,000
(b) Average functionality
 1) total system=1.5-3.2
(c) Hydroxyl number
 1) total systems=100-300
(d) Catalysts
 1) amine=Air Products 0.1-3.0 PPH
(e) Surfactants
 1) total system=0.1-2.0 PPH
(f) Water
 1) total system=0.2-0.5%
(g) Pigments/dyes
 1) total system=1-5% carbon black
(h) Blowing agent
 1) water.

The 13050U isocyanate description is as follows:
(a) NCO content—22.4-23.4 wt %
(b) Viscosity, cps at 25° C.=600-800
(c) Density=1.21 g/cm³ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

The material selected for the media may be varied, depending on the anticipated environment of use and availability of various pleatable substrates.

Conventional media available from such suppliers as Hollingsworth and Vose of East Walpole, Mass. can be utilized. It is anticipated that in typical arrangements, pleats 85 in the order of ⅜ inch to 3 inches (0.9 cm to 7.6 cm) in depth, with a pleat population, around the inner diameter, of about 10 to 14 per inch at the larger diameter end (15 to 20 per inch at the smaller diameter end) with a conical unit being used.

The principal structural component of the primary filter cartridge 30, i.e., support 90, will generally be made from a rigid plastic such as a glass filled nylon (for example 33% glass filled nylon 6/6, 1.5 mm. thick). Such a component could generally be made by a plastic molding operation, for example injection molding.

Support structure 160, which operates as either an inner support for the primary filter cartridge 30 or as both an inner support for the primary filter cartridge 30 and an outer support for a optional safety cartridge 31, will generally be formed from a rigid plastic similar to that used for support 90 formed using a similar molding process. The media 65 or the safety filter cartridge 31 is a matter of preference for the particular application, and it would typically be non-pleated media with a side coated with a selected surface modifier, such as a tackifier.

Preferably both the primary filter cartridge and the secondary filter cartridge at least 98%, by weight, metal free, most preferably 100% metal free.

The housing sidewall segments 261 and 262 (or for the embodiment 300 of FIG. 14, sidewall segment 301), are preferably molded from plastic materials such as a glass filled nylon (for example 33% glass filled nylon 6/6, 2 mm. thick). For these components an injection molding process could be used. Preferably each of the components (except where possibly reinforced by a metal grommet to receive bolts for connection to other components such as a truck frame and/or the latches) is at least 98%, by weight, metal free, preferably 100% metal free. Metal grommets might be utilized, for example, inside of mounting legs 8 or tap 6a.

Cover 20 for the particular preferred embodiment shown, is sized and shaped so that it can be molded from plastic materials. It is anticipated that in general the precleaner 35, comprising shield 37 and ramp 36, would be premolded for example from glass filled nylon or polypropylene by an injection molding process, and would then be attached to a remainder of the cover 20, for example by heat staking, with an adhesive or with a snap (mechanical) fit.

The remainder of the cover 20, would preferably be molded from the same material as used for housing segments 261, 262, in an injection molding process. The latches 171 could be molded integrally with cover 20 in such a process. The cover 20 is preferably at least 98% metal free, most preferably 100% metal free.

The inlet tube 5 would typically have an inside diameter on the order of about 50 to 200 mm., for example about 60 mm., and the outlet tube 6 would have an inside diameter of about the same. The down tube 7 would have an inside diameter on the order of about 45 to 55 mm., for example about 51 mm.

Typically and preferably the ramp 36 would extend through a rotation of about 150°-280° from end 400 to end 401, FIG. 5, and would extend longitudinally along sidewall 9 over a distance of at least as wide as the diameter of the entrance to tube 5, preferably slightly more.

The above dimensions, materials and specific described shapes, are meant to be exemplary only, and are not intended to be limiting unless specifically characterized as such in a claim. It will be apparent from the above, however, how the various techniques and improvements described herein can be applied in a wide variety of contexts and specific applications.

The Applicant(s) specifically reserve the right to later claim embodiments and features currently disclosed but not claimed in the following claims.

What is claimed is:

1. An air filter cartridge comprising:
 (a) first and second, opposite, end caps;
 (b) pleated filter media: extending between the first and second end caps and surrounding a central axis to define an open interior;
  (i) the pleated media having a tapered outer perimeter in extension between the first and second end caps; and,
  (ii) the pleated media having a larger perimeter adjacent the first end cap than adjacent the second end cap;
 (c) the first end cap having an air flow aperture therethrough;
  (i) the first end cap including a housing seal member thereon; and,
 (d) the second end cap being closed and having a receiver recess portion projecting toward the first end cap and defining an open receiver facing a direction away from the first end cap;
  (i) the receiver recess portion having a non-circular shape in cross-section in a plane perpendicular to the open interior and the central axis.

2. An air filter cartridge according to claim 1 wherein:
 (a) the receiver recess comprises a plurality of radially outwardly directed portions.

3. An air filter cartridge according to claim 2 wherein:
 (a) the receiver recess comprises a plus-shaped recess.

4. An air filter cartridge according to claim 2 including:
 (a) a liner extending between the first and second end caps.

5. An air filter cartridge according to claim 1 wherein:
 (a) the media has a conical angle of at least 1°.

6. An air filter cartridge according to claim 1 wherein:
 (a) the housing seal member on the first end cap is a radially directed housing seal member.

7. An air filter cartridge according to claim 6 wherein:
 (a) the radially directed housing seal member is radially outwardly directed.

8. An air filter cartridge according to claim 1 wherein:
 (a) the first end cap is molded-in-place with the housing seal member molded integral therewith.

9. An air filter cartridge according to claim 1 including:
 (a) a liner extending between the first and second end caps.

10. An air filter cartridge according to claim 9 wherein:
 (a) the liner is surrounded by the pleated filter media.

11. An air filter cartridge according to claim 9 wherein:
 (a) the liner comprises a portion of a preform also having the receiver recess thereon.

* * * * *